United States Patent
Imaizumi et al.

[11] Patent Number: 6,047,087
[45] Date of Patent: Apr. 4, 2000

[54] IMAGE PROCESSOR

[75] Inventors: Shoji Imaizumi, Shinshiro; Shigeru Moriya, Toyokawa; Junji Nishigaki, Aichi-Ken, all of Japan

[73] Assignee: Minolta Co., Ltd., Osaka, Japan

[21] Appl. No.: 09/121,914

[22] Filed: Jul. 24, 1998

Related U.S. Application Data

[62] Division of application No. 08/646,118, May 7, 1996, Pat. No. 5,838,455.

[30] Foreign Application Priority Data

| May 11, 1995 | [JP] | Japan | 7-113050 |
| Jun. 8, 1995 | [JP] | Japan | 7-141882 |
| Jun. 13, 1995 | [JP] | Japan | 7-146141 |
| Jun. 16, 1995 | [JP] | Japan | 7-150080 |

[51] Int. Cl.$^7$ .............................. G06K 9/36; G06K 9/46
[52] U.S. Cl. .................................................. 382/232
[58] Field of Search .................. 382/166, 232, 382/237, 251, 235

[56] References Cited

U.S. PATENT DOCUMENTS

| 4,797,729 | 1/1989 | Tsai . |
| 4,979,031 | 12/1990 | Tsuboi et al. . |
| 5,119,182 | 6/1992 | Tsuboi et al. . |
| 5,293,252 | 3/1994 | Kim et al. . |
| 5,341,442 | 8/1994 | Barrett . |
| 5,361,147 | 11/1994 | Katayama et al. . |
| 5,367,629 | 11/1994 | Chu et al. . |
| 5,491,761 | 2/1996 | Kim . |
| 5,585,944 | 12/1996 | Rodriguez . |
| 5,861,960 | 1/1999 | Suzuki et al. ........................ 382/166 |

FOREIGN PATENT DOCUMENTS

| 4-144485 | 5/1992 | Japan . |
| 4-145765 | 5/1992 | Japan . |
| 4-157975 | 5/1992 | Japan . |
| 4-220076 | 8/1992 | Japan . |
| 4-236568 | 8/1992 | Japan . |

*Primary Examiner*—Phuoc Tran
*Attorney, Agent, or Firm*—Burns, Doane, Swecker & Mathis, LLP

[57] ABSTRACT

In an image processor, image data of red, green and blue are converted to image data of lightness and chromaticities, and they are divided into pixel blocks. Then, image data of each block are compressed to data having 4 gradation levels smaller than 256 levels of the image data by generalized block truncation coding. Then a capacity of image memory can be decreased. An attribute of the image data is decided for each block according to the compressed data. The attribute can be corrected by taking attributes of adjacent blocks into account. Edition of image data such as edge emphasis can be performed according to the attributes. The compressed data are further compressed by deleting data which can be specified according to the attribute.

5 Claims, 52 Drawing Sheets

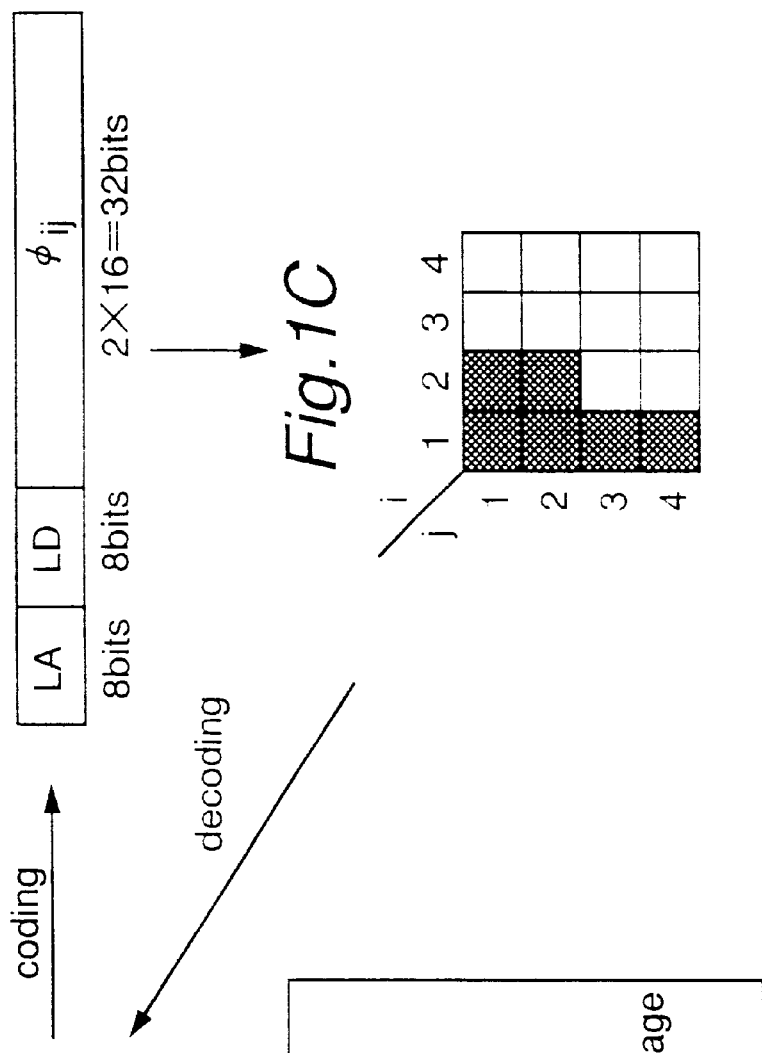

Decoding of recompressed codes

IMAGE PROCESSOR

This application is a divisional, of application Ser. No. 08/646,118, filed May 7, 1996, now U.S. Pat. No. 5,838,455.

BACKGROUND OF THE INVENTION

1. Field of the Invention

The present invention relates to an image processor which compresses image data and stores the compressed data in an image memory.

2. Description of the Prior Art

An image processor provided in a digital copying machine or the like reads a document image and stores the image data in an image memory. Then, an edition/operation of the image data is performed on the image data stored in the image memory. For example, automatic exposure is performed for correcting density distribution of an image of a document to be reproduced on a sheet of paper according to an attribute of the image of the document. The image processor may also perform edition of the image such as color change or frame edition. The attribute of image may be decided in real time, for example, by sampling image data and performing fast speed operation of the sampled image data at the same time as reading the image. It may also be decided by using image data stored in a memory device, for example, in the unit of a pixel matrix. It is also proposed to decide attribute in a pixel matrix including a pixel of interest.

Recently, generalized block truncation coding (GBTC) is proposed for compressing image data of a document. In generalized block truncation coding, image data is divided into pixel blocks having a predetermined matrix size, and various data such as an average data, gradation width index and code data are obtained for each block of the image data. These data reflect pixel data and gradation width of pixels in a block. Generalized block truncation coding is also proposed to be used for image data of L*a*b* colorimetric system. In an example, 8-bit image data in a 4*4 pixel block are converted to gradation width index LD, the average data LA and 2-bit code data $\Phi_{ij}$. When the data is decoded, the code data $\Phi_{ij}$ is converted to one of four values of 256 gradation levels specified by the gradation width index LD and the average data LA. The decoded data includes an error somewhat if compared with the image data before coding because the number of the gradation levels becomes smaller. If a color of a pixel at an edge of a document is reproduced, the reproduced color is different from the original color. However, if data of L*a*b* colorimetric system are used, even though the decoded data includes an error, lightness and chromaticities are changed only somewhat, and the reproduced color is not different at an edge of a document image.

In JPEG (Joint Picture Experts Group) standard which uses Huffman code data obtained by using discrete cosine transformation of image data, a compression ratio of data varies with a type of document. The compression ratio may be better than that of generalized block truncation coding (GBTC) in some documents, but the image data may not be compressed actually for some documents. Then, it is difficult to set an appropriate storage capacity to be provided in the image processor. On the other hand, an advantage of GBTC is that the compression ratio of GBTC is constant, and it is easy to determine a storage capacity therefor.

Attributes of an image can be decided not in correspondence to image data of red, green and blue, but to data determined by generalized block truncation coding. Therefore, it is an advantage that attributes can also be determined according to coded data obtained by generalized block truncation coding of an amount much smaller than the image data. However, there are problems to be solved when attributes of an image are decided by using the data obtained by coding the image data.

In an image processor where the attribute is decided in real time, sampling and sampling speed have problems. The number of sampled image data and the content of processing are limited by operation speed. On the other hand, in an apparatus where the attribute is decided according to the image data stored in a storage device, a large storage capacity and a long processing time are needed. Further, if the attribute of image data for a block including the pixel of interest is decided, many line buffers are needed to use information on adjacent pixels in a broad range of blocks.

It is also a problem that the compression ratio of generalized block truncation coding is not so high if compared with that of JPEG standard though it is constant as mentioned above. Then, it is preferable that the storage capacity of an image memory is decreased further.

Further, in an image processor using GBTC, the type of a document is decided before coding the image data or after decoding the code data. Operation such as automatic exposure or edition such as color change is also performed before coding the image data or after decoding the code data. Then, a hardware circuit for fast speed operation is needed to decide the attribute of image, and a storage device of a large capacity for storing all the image data is needed.

There is also a problem on discrimination of a character image area in a document image. A character image area can be discriminated by detecting a sharp change in gradation at an edge portion of a character. However, the change may be decided erroneously due to a decrease in resolution caused by the read precision of image data, aberration of a lens and the like and to a blur of color around an edge portion of a character image. In order to prevent erroneous decision, a complicated device is needed, and a circuit for the processing has a large scale. This situation also holds for an image processor using generalized block truncation coding.

SUMMARY OF THE INVENTION

An object of the present invention is to provide an image processor which can determine an attribute of image data precisely with a smaller amount of data on a document image.

Another object of the present invention is to provide an image processor which can compress and process image data efficiently.

A further object of the present invention is to provide an image processor which can decide an attribute of image correctly.

In an image processor of the invention, a compression device compresses image data to data having gradation levels smaller than that of the image data. For example, the data are obtained by generalized block truncation coding, and they comprise an average lightness, average chromaticities, a lightness width, chromaticity widths and code data for each of the lightness and chromaticities. The image data are compressed in the unit of a block of a predetermined pixel matrix. An attribute of an image is determined for each pixel block according not to the image data, but to the compressed data. The image data of red, green and blue are converted to data of lightness and chromaticities before the compression. Preferably, the lightness width of a block of interest is corrected as a maximum lightness width among adjacent blocks, and the decision device decides according to the lightness width if the image in the block is a character image or not. Preferably, data which can be specified according to the attribute are deleted further to reduce an amount of the data. In an example, the attribute of image data is written to one or more lower bits in one of data of the average lightness, average chromaticities, a lightness width and chromaticity widths.

An advantage of the present invention is that a capacity of an image memory for storing image data becomes small.

Another advantage of the present invention is that image edition can be performed by using data of a much smaller amount than the image data.

A third advantage of the present invention is that an attribute of image can be determined more precisely.

A fourth advantage of the present invention is that an image can be recovered more precisely.

BRIEF DESCRIPTION OF THE DRAWINGS

These and other objects and features of the present invention will become clear from the following description taken in conjunction with the preferred embodiments thereof with reference to the accompanying drawings, and in which:

FIG. 1A is a diagram for explaining blocking on image data of a document, FIG. 1B is a diagram of compressed data by generalized block truncation coding, and FIG. 1C is a diagram for explaining compression of image data;

DETAILED DESCRIPTION OF THE PREFERRED EMBODIMENTS

Figure 2B:
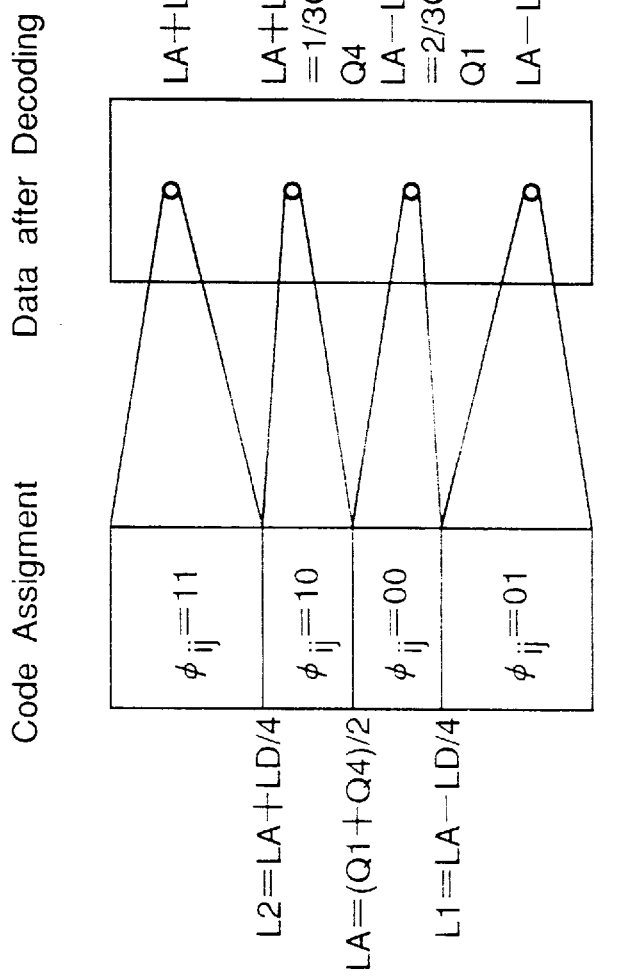
FIG. 2B is a diagram for code assignment and data after decoding.

Referring now to the drawings, wherein like reference characters designate like or corresponding parts throughout views, embodiments of the invention are explained.

GENERALIZED BLOCK TRUNCATION CODING

The principle of generalized block truncation coding (GBTC) is explained first. Image data of a document is divided into blocks. Then, by using a feature that pixels in the same block are similar to each other, coding parameters are determined from the pixel data in a block of interest, and appropriate gradation level is assigned to image data in a block according to the coding parameters.

FIGS. 1A–1C are a diagram for explaining a coding flow in generalized block truncation coding. As shown in FIG. 1A, a document image is divided into blocks, and the size of each block is 4*4 pixels $X_{ij}$ where i and j denote column and row. Then, image data for each block are coded as explained later according generalized block truncation coding by using parameters determined for each block. Then, as shown in FIG. 1B, the 8-bit image data (of 256 gradation levels) of 16 pixels (16 bytes) are compressed to 6-byte code data consisting of a 1-byte average data LA, a 1-byte gradation width index LD and 2-bit code data $\Phi_{ij}$ (four gradation levels) for 16 pixels. The data LA and LD are determined according to parameters determined from the image data in each block. Thus, as shown in FIG. 1C, an amount of data coded is 6 bytes, or the image data are compressed to ⅜ of the amount thereof. The coded data shown in FIG. 1B are decoded by using the parameter data LA and LD. In the embodiments explained below, the block size is 4*4 matrix. However, the invention is not limited to blocks of 4*4 pixels, and blocks of, for example, 3*3 pixels or 6*6 pixels may be used. Further, in the embodiments explained below, the number of gradation levels of the code data is four, but it may be two or eight. As will be explained below, it is a feature of the invention that the data LA and LD are used to decide attribute of image data and to perform various image processing according to the decision.

Figure 2A:
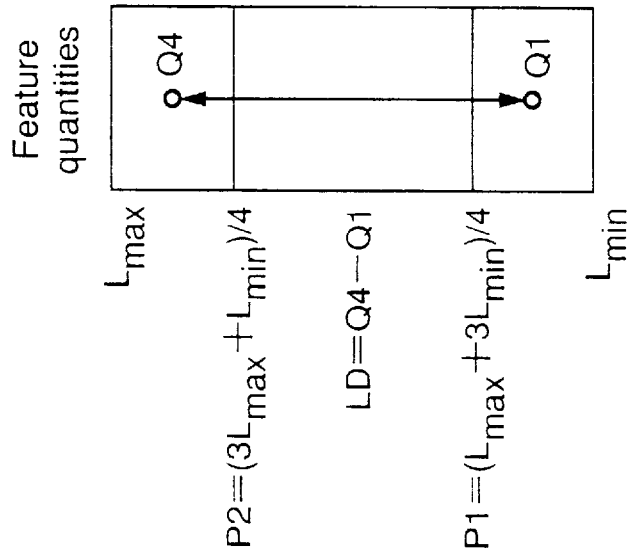
FIG. 2A is a diagram for explaining characteristic data on image data for generalized block truncation coding.
Figure 3:
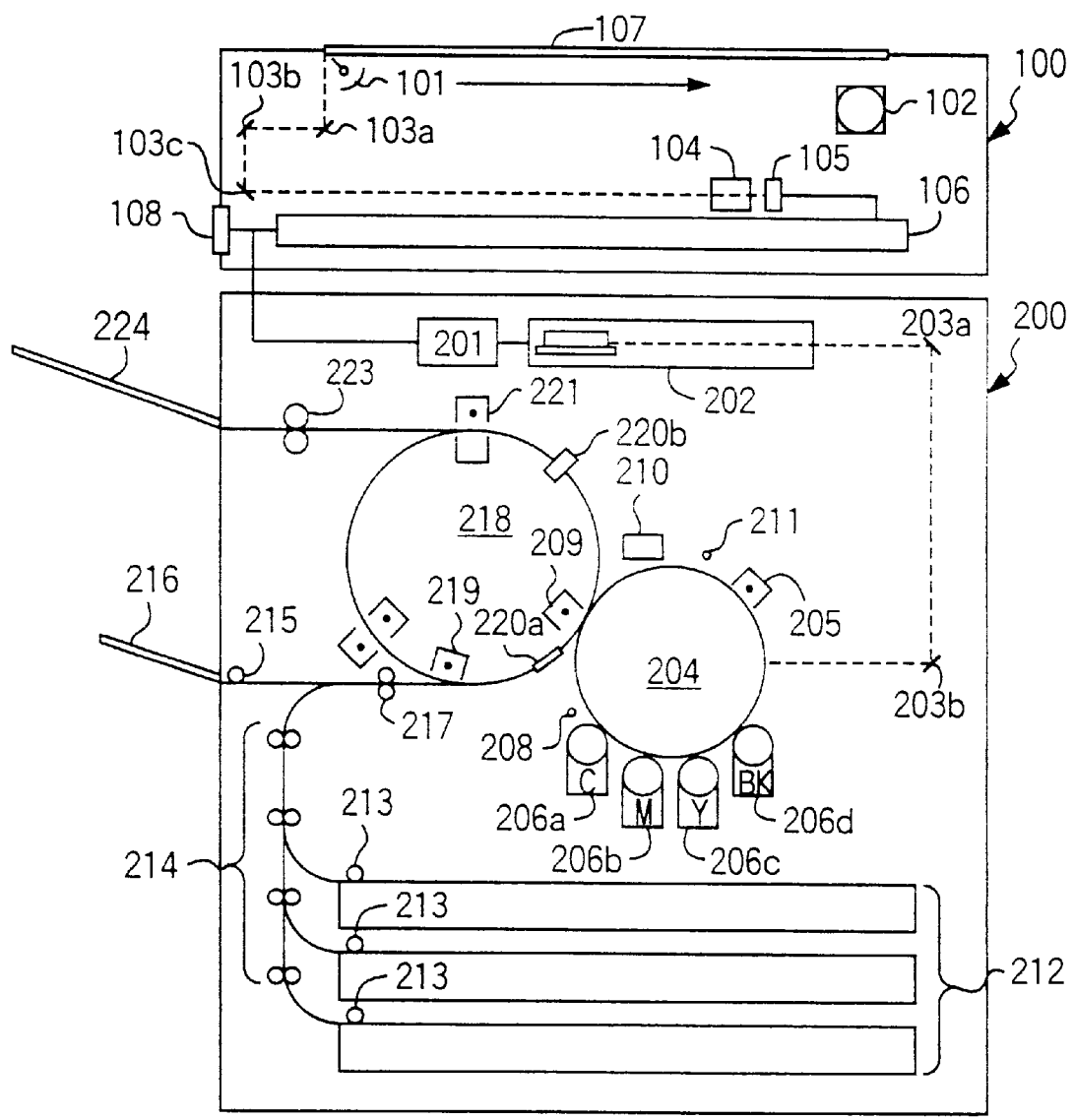
FIG. 3 is a sectional view of a digital color copying machine.

FIGS. 2A and 2B are diagrams for explaining coding and decoding of generalized block truncation coding. Each block of 4*4 pixels includes 16 8-bit image data, where a maximum $L_{max}$ and a minimum $L_{min}$ denote a maximum and a minimum of the image data of the block. As shown in FIG. 2A, the image data are divided into three groups by using parameters P1 and P2 larger than P1, both determined appropriately according to the image data in the block. The parameters P1 and P2 are determined as follows in this example:

$$P1=(L_{max}+3*L_{min})/4, \qquad (1)$$

and $$P2=(3*L_{max}+L_{min})/4. \qquad (2)$$

Next, a first average Q1 is obtained on the image data of a group of the pixels having a pixel data lower than P1, while a second average Q4 is obtained on the image data of a group of the pixels having a pixel data larger than P2. Then, an average information LA and gradation width index LD are determined as follows:

$$LA=(Q1+Q4)/2, \qquad (3)$$

and $$LD=Q4-Q1. \qquad (4)$$

Next, levels L1 and L2 for quantization are determined as follows:

$$L1=LA-LD/4, \qquad (5)$$

and $$L2=LA+LD/4. \qquad (6)$$

Then, the image data in the block are quantized as 2-bit codes $\Phi_{ij}$ by using the three levels, L2, LA and L1. FIG. 2B shows code data $\Phi_{ij}$ for a pixel data $X_{ij}$ for i-th column and j-th row where i, j=1, 2, 3 or 4.

TABLE 1

Code data $\phi_{ij}$

| Range of 1-byte data $X_{ij}$ | 2-bit code data $\phi_{ij}$ |
|---|---|
| $X_{ij} \leq L1$ | $\phi_{ij} = 01$ |
| $L1 < X_{ij} \leq LA$ | $\phi_{ij} = 00$ |
| $LA < X_{ij} \leq L2$ | $\phi_{ij} = 01$ |
| $L2 < X_{ij}$ | $\phi_{ij} = 11$ |

Table 1 shows the code assignment in detail for 2-bit code $\Phi_{ij}$ for 1-byte data $X_{ij}$. The data obtained by generalized block truncation coding comprises 2-bit code data $\Phi_{ij}$ of 16 pixels (4 bytes), a 1-byte gradation width index LD and a 1-byte average data LA (FIG. 1B).

TABLE 2

Conversion of data $\phi_{ij}$ to $Y_{ij}$

| 2-bit code data $\phi_{ij}$ for image data $X_{ij}$ | Gradation data after conversion |
|---|---|
| $\phi_{ij} = 01$ | $Y_{ij} = LA - LD/2 = Q1$ |
| $\phi_{ij} = 00$ | $Y_{ij} = LA - LD/6 = 2/3 Q1 + 1/3 Q4$ |
| $\phi_{ij} = 10$ | $Y_{ij} = LA + LD/6 = 1/3 Q1 + 2/3 Q4$ |
| $\phi_{ij} = 11$ | $Y_{ij} = LA + LD/2 = Q4$ |

As shown in FIG. 2B, when the code data is decoded, the gradation width index LD and the average information LA are used. That is, a code data $\Phi_{ij}$ assigned for a data $X_{ij}$ is converted to 8-bit gradation data $Y_{ij}$ as shown in Table 2. Then, the image data $X_{ij}$ of 256 gradation levels are converted to data $Y_{ij}$ of four levels in the 256 levels. Therefore, the decoded data will include errors with respect to the original image data. However, the errors are not obvious according to human visual characteristics, and image deterioration is not observed for a half-tone image practically. In the decoded data, the parameters Q1 and Q2 are recovered from the average data LA and the gradation width index LD included in the coded data.

STRUCTURE OF DIGITAL COLOR COPYING MACHINE

Next, a digital color copying machine including the image processor of the embodiment is explained. The digital color copying machine consists of an image reader 100 which reads a document image and a printer 200 which reproduces the document image read by the image reader 100.

In the image reader 100, when a document put on a platen glass 107 is read, it is illuminated with a lamp 101 and a light reflected from the document is guided by mirrors 103a, 103b and 103c through a lens 104 to be focused on a linear CCD sensor 105. The lamp 101 and the mirror 103a are moved by a scanner motor 102 along a subscan direction in correspondence to magnification power in order to scan the document over a whole face thereof. The mirrors 103b and 103c are moved simultaneously at a speed v/2 along the same direction. The light detected by the CCD sensor 105 is converted to multi-level electric signals of red, green and blue for each pixel, and the signals are converted by a read signal processor 106 to 8-bit gradation data of cyan (C), magenta (M), yellow (Y) or black (BK), and they are sent to an external output port 108 and to the printer 200.

In the printer 200, an image data correction section 201 performs gradation correction (or gamma correction) for the gradation data Y, M, C and Bk according to characteristics of a photoconductor and the like. Then, a printer exposure section 202 converts the gradation data to an analog data for driving a laser diode, and the laser diode emits a laser beam according to the drive signal.

The laser beam generated according to the gradation data propagates through mirrors 203a and 203b onto a photoconductor drum 204 which is rotated clockwise. The drum 204 is illuminated by an eraser lamp 211 and is charged uniformly by a sensitizing charger 205 before exposure with the laser beam. As the photoconductor drum 204 is subjected to exposure, an electrostatic latent image is formed thereon. One of the development units 206a, 206b, 206c and 206d of cyan, magenta, yellow and black is selected to develop the latent image on the photoconductor drum 204 with toners. Another eraser 208 provided before a transfer position discharges excess charges of a toner image produced by development, and the toner image is transferred by a transfer charger 209 onto a sheet of paper wound on a transfer drum 218.

The transfer drum 218 is rotated at the same speed as the photoconductor drum 204 counterclockwise. A reference plate 220a is provided inside the transfer drum 218 in order to synchronize the position of the paper sheet and the transfer position, and a position sensor 220b generates a reference signal when the plate 220a crosses the sensor 220b when the transfer drum 218 is rotated. The paper sheet is carried from one of cassettes 212 by a roller 213 along a path and is carried by rollers 214 onto timing rollers 217. A paper sheet is supplied from a paper tray 216, and it is supplied by a roller 215 to the timing rollers 217. The timing rollers 217 supply the paper sheet towards the transfer drum 218 in synchronization with the reference signal, and the paper sheet is absorbed electrostatically by an absorption charger 219 onto the drum 218 to be kept at a prescribed position.

The above-mentioned printing process is repeated four times for forming a full color image. Then, the paper is separated from the transfer drum 218 by a discharge charger 221, and it is carried to the fixing unit 223 to fix the toner image. Then, it is discharged onto the tray 224.

IMAGE SIGNAL PROCESSING

Figure 4:
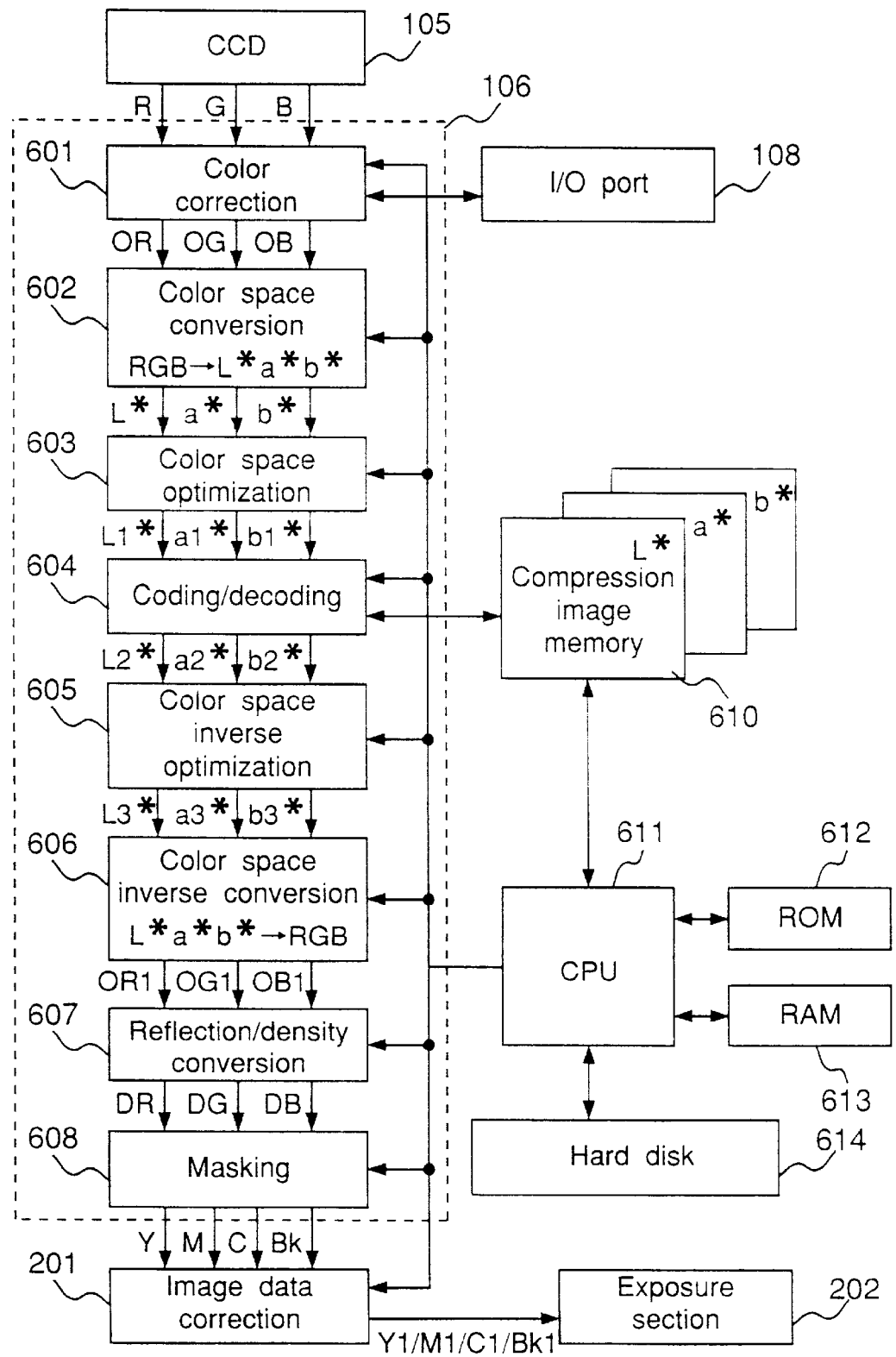
FIG. 4 is a block diagram of a read signal processor.

FIG. 4 shows signal processing in the read signal processor 106. The read signal processor 106 is controlled by a central processing unit (CPU) 611 connected to a read only memory 612, a random access memory 613, a compression image memory 610 and a hard disk 614. In the read signal processor 106, first, a color correction section 602 receives image data R, G and B or red, green and blue from the CCD sensor 105 and performs shading correction on the image data. Further, it converts the image data to standard image data OR, OG and OB specified in NTSC and high density television standards for the ease of data manipulation. Then, the standard image data OR, OG and OB are sent to a color space conversion section 602. They may be sent through an input/output port 108 to the external so that an external equipment can receive the standard image data OR, OG and OB. Standard image data OR, OG and OB may also be received from an external equipment through the input/output port 108. In this case, the copying machine operates as a printer.

Figure 5:
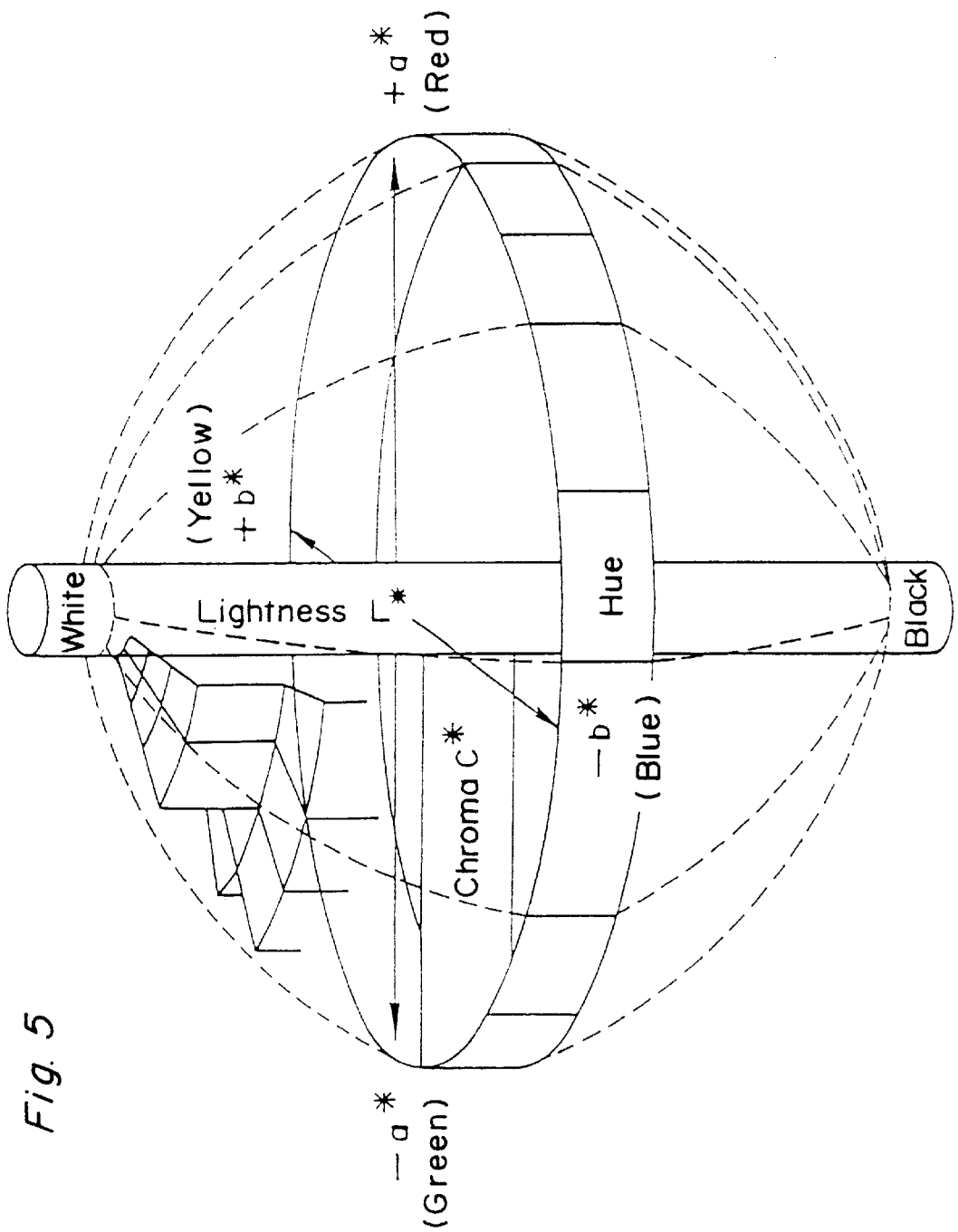
FIG. 5 is a stereoscopic diagram of a L*a*b* chromaticity diagram.

The color conversion section 602 converts the standard image data OR, OG and OB to data of XYZ colorimetric system and converts the data of XYZ colorimetric system further to data of $L^*a^*b^*$ colorimetric system. FIG. 5 shows a color space of $L^*a^*b^*$ colorimetric system. Lightness of 0 (black) to 255 (white) is expressed with $L^*$, and hue and chroma are expressed with a $a^*$ and $b^*$. The chromaticity components $a^*$ and $b^*$ represent a direction of a color; component $a^*$ represents colors between red and green while $b^*$ represents colors between yellow and blue.

A reason for converting the standard image data OR, OG to data of $L^*a^*b^*$ colorimetric system is explained below. In the generalized block truncation coding explained above, each 8-bit image data in a pixel block of 4*4 matrix is converted to a 2-bit code data $\phi_{ij}$, and when the data is decoded, the code data $\phi_{ij}$ is converted to one of four values in 256 gradation levels specified by the gradation width index LD and the average information LA. Thus, the decoded data includes an error to some degree if compared with the original image data. For example, if a color of a pixel at an edge of a document is reproduced according data including errors, the reproduced color may be different from the original color. However, if data of $L^*a^*b^*$ colorimetric system are used, even through the decoded data includes an error more or less, lightness and chromaticity change somewhat, but the reproduced color is not changed at an edge of a document image. Therefore, the image data OR, OG and OB are converted to data of $L^*a^*b^*$ colorimetric system. It is to be noted that any colorimetric system such as $L^*u^*v^*$, $YC_rC_b$, or HVC may be used as far as it converts image data or red, green and blue to hue, chroma and lightness.

Next, an optimization section 603 converts a distribution of the lightness and chromaticity components according to the maximum and minimum of each data. In the coding and decoding for generalized block truncation coding, division operations are performed may times as shown in Eqs. (3)–(6) and Table 2. Then, if a difference between two values is small, the difference is vanished during the operation, so that reproducibility of the image date worsens. Then, because the optimization section 603 converts a distribution of the lightness and chromaticity components according to the maximum and minimum of each data, a range of data is expanded to a range between a maximum and minimum allowed for the data. In this embodiment, the lightness and chromaticity components $L^*$ $a^*$ and $b^*$ are subjected to operations based on tables shown in FIGS. 6A, 6B and 6C. Thus, the lightness component $L^*$ is converted to have a distribution between 0 and 255, while the chromaticity components $a^*$ and $b^*$ are converted to have a distribution between $-127$ and 128 for each document.

This conversion of the optimization section 603 is explained further in detail. First, as to each of $L^*$, $a^*$ and $b^*$, a maximum $L^*_{max}$, $a^*_{max}$ or $b^*_{max}$ and a minimum $L^*_{min}$, $a^*_{min}$ or $b^*_{min}$ are determined. Then, the lightness component $L^*$ is subjected to a following operation to obtain lightness component $L1^*$:

$$L1^* = 255*(L^*-L^*_{min})/(L^*_{max}-L^*_{min})-127. \qquad (7)$$

Figure 6A:
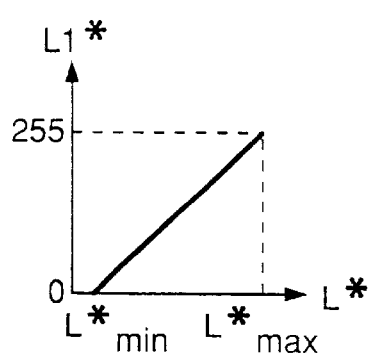
FIG. 6A is a diagram of tables for converting a distribution of lightness component L* for each document to 0–255.

This conversion is based on a table shown in FIG. 6A. Thus, the lightness component $L^*$ distributed between $L^*_{max}$ and $L^*_{min}$ is converted to have a distribution between 0 and 255.

Similarly, the chromaticity component $a^*$ is subjected to a following operation to obtain chromaticity component $a1^*$:

$$a1^* = 255*(a^*-a^*_{min})/(a^*_{max}-a^*_{min})-127. \qquad (8)$$

Figure 6B:
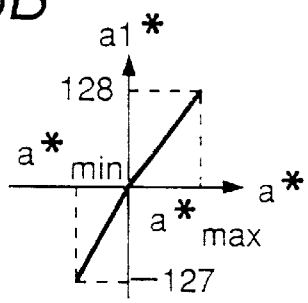
FIGS. 6B and 6C are diagrams of tables for converting a distribution of chromaticity components a* and b* for each document to −127 to 128.

This conversion is based on a table shown in FIG. 6B. Thus, the chromaticity component $a^*$ distributed between $a^*_{max}$ and $a^*_{min}$ is converted to have a distribution between $-127$ and 128.

Further, the chromaticity component $b^*$ is subjected to a following operation to obtain chromaticity component $b1^*$:

$$b1^* = 255*(b^*-b^*_{min})/(b^*_{max}-b^*_{min})-127. \qquad (9)$$

Figure 6C:
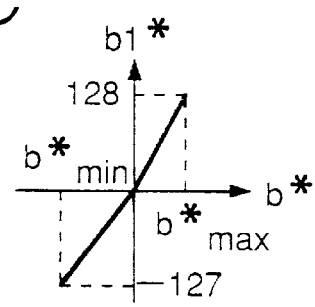

This conversion is based on a table shown in FIG. 6C. Thus, the chromaticity component $b^*$ distributed between $b^*_{max}$ and $b^*_{min}$ is converted to have a distribution between $-127$ and 128.

The maxima $L^*_{max}$, $a^*_{max}$ and $b^*_{max}$ and the minima $L^*_{min}$, $a^*_{min}$ and $b^*_{min}$ are stored in the hard disk 614, and they are used for inverse optimization explained below.

A coder/decoder 604 performs generalized block truncation coding. As will be explained later in detail, it decides attributes of image in the unit of block and compresses the code date (that is, gradation width index LD, average data LA and code data $\phi_{ij}$) further according to the attributes. There are five image types including black uniform image, color uniform image, black bi-level image, black multi-level image and full color image in the image processing of the embodiment. The data compressed again and three flags, uniform image flag f1, color/black image flag f2 and bi-level/multi-level image flag f3, for denoting the attribute are stored in the compression image memory 610. When the data is decoded, the coder/decoder 604 reads the compression data and the flags f1, f2 and f3 from the compression image memory 610 and decodes the data first to the code data (that is, gradation width index LD, average information LA and code data $\phi_{ij}$). Then, the code data are decoded according to generalized block truncation coding to output data of lightness component $L2^*$ and chromaticity components $a2^*$ and $b2^*$.

Figure 7A:
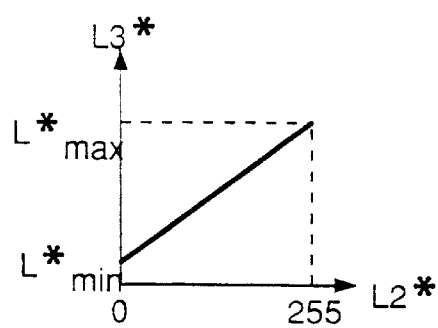
FIGS. 7A, 7B and 7C are diagrams of tables for converting a distribution of decoded L2*, a2* and b2* for each document to $L^*_{max}$−$L^*_{min}$, to $a^*_{max}$−$a^*_{min}$ and to $b^*_{max}$−$b^*_{min}$.
Figure 7B:
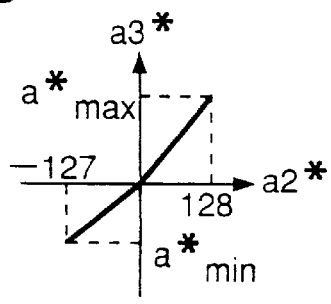
Figure 7C:
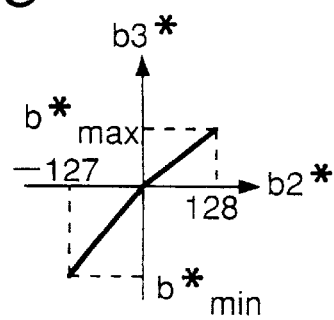

A color space inverse optimization section 605 reads the maxima $L^*_{max}$, $a^*_{max}$ and $b^*_{max}$ and the minima $L^*_{min}$, $a^*_{min}$ and $b^*_{min}$ from the hard disk 614, and recovers distributions of the lightness component $L2^*$ and the chromaticity components $a2^*$ and $b2^*$ to ranges of $L^*_{max}$ to $L^*_{min}$, $a^*_{max}$ to $a^*_{min}$, $b^*_{max}$ to $b^*_{min}$. These processing are based on tables shown in FIGS. 7A, 7B and 7C. That is, the lightness component $L2^*$ is subjected to a following operation to recover lightness component $L3^*$ having the original distribution between $L^*_{max}$ and $L^*_{min}$:

$$L3^* = (L^*_{max}-L^*_{min})/255*L2^*+L^*_{min}. \qquad (10)$$

The chromaticity component $a2^*$ is subjected to a following operation to recover chromaticity component $a3^*$ in a range between $a^*_{max}$ and $a^*_{min}$:

$$a3^* = (a^*_{max}-a^*_{min})/255*(a2^*+127)+a^*_{min}. \qquad (11)$$

Further, the other chromaticity component $b2^*$ is subjected to a following operation to recover chromaticity component $b3^*$ in a range between $b^*_{max}$ and $b^*_{min}$:

$$b3^* = (b^*_{max}-b^*_{min})/255*(b2^*+127)+b^*_{min}. \qquad (12)$$

A color space inverse conversion section 606 converts the data $L3^*$, $a2^*$ and $b3^*$ recovered by the inverse optimization section 605 to standard image data OR1, OG1 and OB1 of red, green and blue. A reflection/density conversion section 607 converts the image data OR1, OG1 and OB1 of red, green and blue on reflected light obtained by the inverse conversion section 606 to density data DR, DG and DB of red, green and blue. A masking section 608 converts the density data DR, DG and DB received from the reflection/density conversion section 607 to image data of cyan C, magneta M, yellow Y and black Bk for printing.

The image data correction section 201 performs gradation (gamma) correction on the image data C, M, Y or Bk, and the data is output to the printer exposure system 202.

OPERATIONAL PANEL

Figure 8:
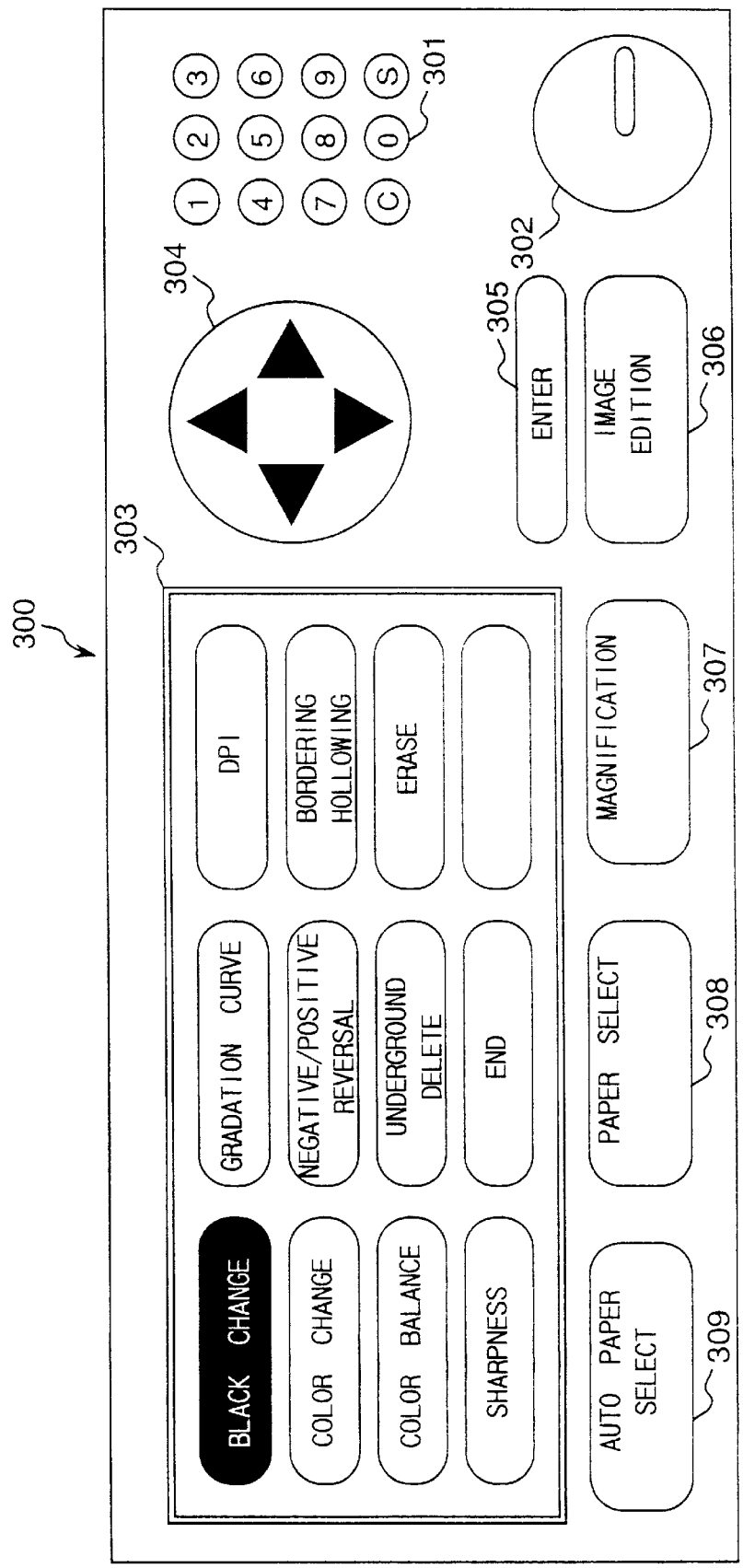
FIG. 8 is a front view of an operational panel.

FIG. 8 shows an operations panel 300 of the digital copying machine. The operational panel 300 comprises ten-keys 301, a key 302 for starting copy operation, a display device 303 for setting a mode and displaying copy statuses, a cursor key 304 for selecting a mode displayed in the display device 303, a key 305 for setting a mode displayed in the display device 303, an enter key 306 for selecting and setting an image edition mode, a key 307 for setting a magnification power, a key 308 for selecting a paper size, and a key 309 for setting automatic paper selection mode.

Edition/operation of image can be performed according to the attributes of the image decided in the unit of 4*4 pixel block. When the enter key 306 is pushed, items including nine edition modes shown in Table 3 are displayed in the display device 303, as shown in FIG. 8. A mode among the nine items is selected by the cursor key 304, and a display of the selected item is high-lighted. The selected mode is set by pushing the enter key 305. When a mode is set, mode flags are set as shown in Table 3. That is, a mode flag MF1–MF9 in correspondence to the mode is set, and other mode flags MF13–MF58 relevant to an image type (black uniform image, color uniform image, black bi-level image, black multi-level image and full color image) are set.

For example, when black change is set, flags MF1 and MF51 for a full color image are set. In this case, the gradation width index LD, the average information LA and code data $\phi_{ij}$ for a full color image are all written as "0" in edition/processing as will be explained below. Edition modes of black change, color change, erase, negative/positive conversion, underground deletion and dpi (dots per inch) conversion are performed on the gradation width index LD, the average information LA and code data $\phi_{ij}$ obtained by generalized block truncation coding. Because an amount of the coded data obtained by generalized block truncation coding is reduced than that of the original image data, a storage capacity for edition/processing can be decreased. On the other hand, as to edition modes of sharpness processing, gradation curve correction and bordering/hollowing, they are performed after the image data of red, green and blue are recovered as in prior art.

Figure 9:
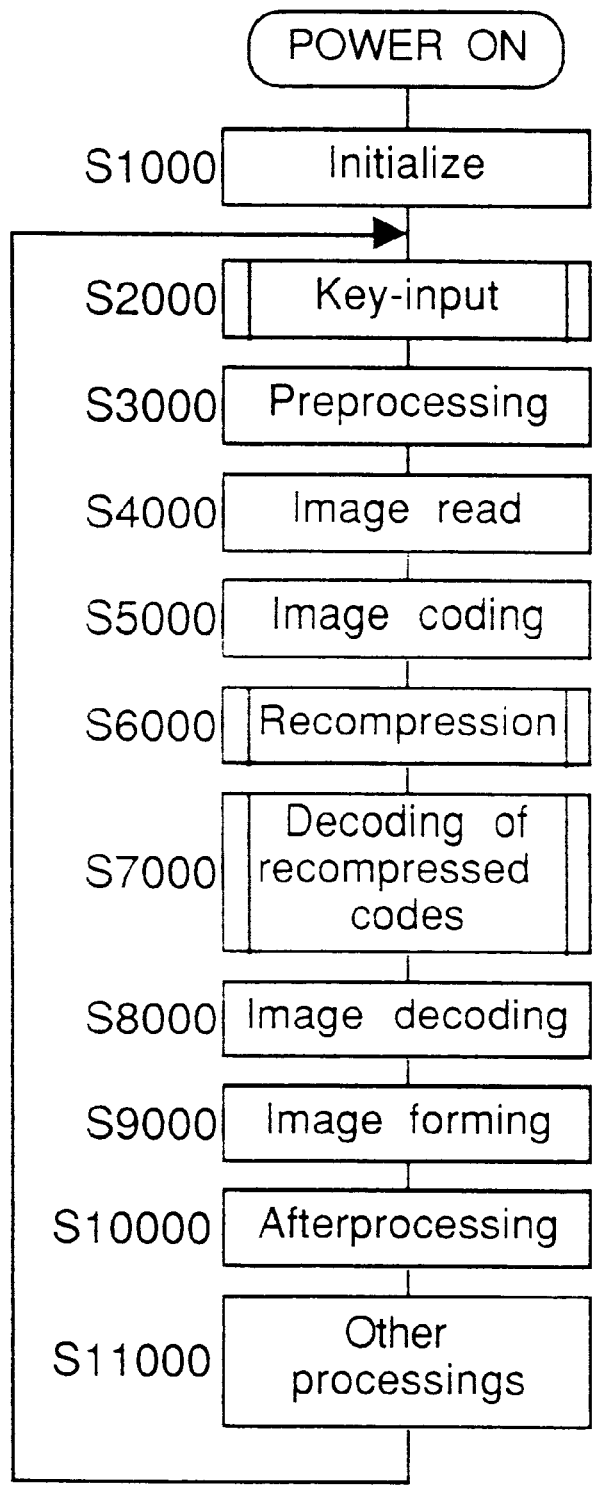
FIG. 9 is a flowchart of a main routine of copying by the copying machine.

Next, image processing of the central processing unit 611 which controls the copying machine is explained. FIG. 9 shows a main flow of copying. First, the copying machine is initialized (step S1000). Then, a key-input from the operational panel 300 is processed (step S2000, refer to FIG. 10). Then, processings such as warming up, shading correction, image stabilization processing or the like are performed which are needed before starting copying (step S3000). Then, an image on a document put on the platen glass 107 is read, and the read data are converted to standard image signals which are further converted to data L*, a* and b* of L*a*b* colorimetric system (step S4000). Next, the L*, a* and b* are subjected to generalized block truncation coding, and the obtained data are stored in the compression image memory 610 (step S5000). Then, attributes of an image of a 4*4 block including a pixel of interest is determined according to the data stored in the compression image data (gradation width index LD, average information LA and coded data $\phi_{ij}$), and the data is compressed further according to the attributes (step S6000, refer to FIG. 11). In this embodiment, the attributes include image types of black uniform image, color uniform image, black bi-level image, black multi-level image and full color image. The data after recompression and flags f1, f2 and f3 which represent attributes are stored in the compression image memory 610. Next, the data after the recompression and flags f1, f2 and f3 are read from the compression image memory 610 and expanded to the original compression image data (gradation width index LD, average information LA and coded data $\phi_{ij}$) in the read signal processor 106. When an image is formed, the recompressed data are decoded, and edition/operation such as automatic exposure or color change is performed according to the gradation data width index LD and the average information LA (step S7000, refer to FIGS. 34A and 34B). Then, coded data are decoded by reading from the compression image memory 610 and by decoding then to 256-level gradation data of lightness component L* and chromaticity components a* and b*. Further, inverse conversion in color space is performed to obtain image data of red, green and blue (step S8000). Next, the printer 200 is controlled to form an image on a paper sheet according to the image data of red, green and blue obtained by the

TABLE 3

| | Mode Flags | | | | | |
|---|---|---|---|---|---|---|
| | Mode selection | Black uniform image | Color uniform image | Black bi-level image | Black multi-level image | Full color image |
| Black change | MF1 = 1 | | | | | MF51 = 1 |
| Color change | MF2 = 1 | | | MF32 = 1 | | MF52 = 1 |
| Erase | MF3 = 1 | MF13 = 1 | MF23 = 1 | MF33 = 1 | MF43 = 1 | MF53 = 1 |
| Neg/pos | MF4 = 1 | MF14 = 1 | MF24 = 1 | MF34 = 1 | MF44 = 1 | MF54 = 1 |
| Underground deletion | MF5 = 1 | MF15 = 1 | MF25 = 1 | | | |
| dpi conversion | MF6 = 1 | | | | MF46 = 1 | MF56 = 1 |
| Sharpness | MF7 = 1 | | | MF37 = 1 | MF47 = 1 | MF57 = 1 |
| Gradation curve correction | MF8 = 1 | | | | MF48 = 1 | MF58 = 1 |
| Bordering/ hollowing | MF9 = 1 | | | MF39 = 1 | | | decoding (step S9000). Then, processing such as removing of remanent toners on the photoconductor drum 204 for maintain conditions of image forming is performed (step S10000). Finally, processing which is not related to image forming such as temperature control of the fixing rollers and communication control is performed (step S11000). Then, the flow returns to step S2000. In the main flow, processings on coding and decoding are performed by controlling the read signal processor 106.

Figure 10:
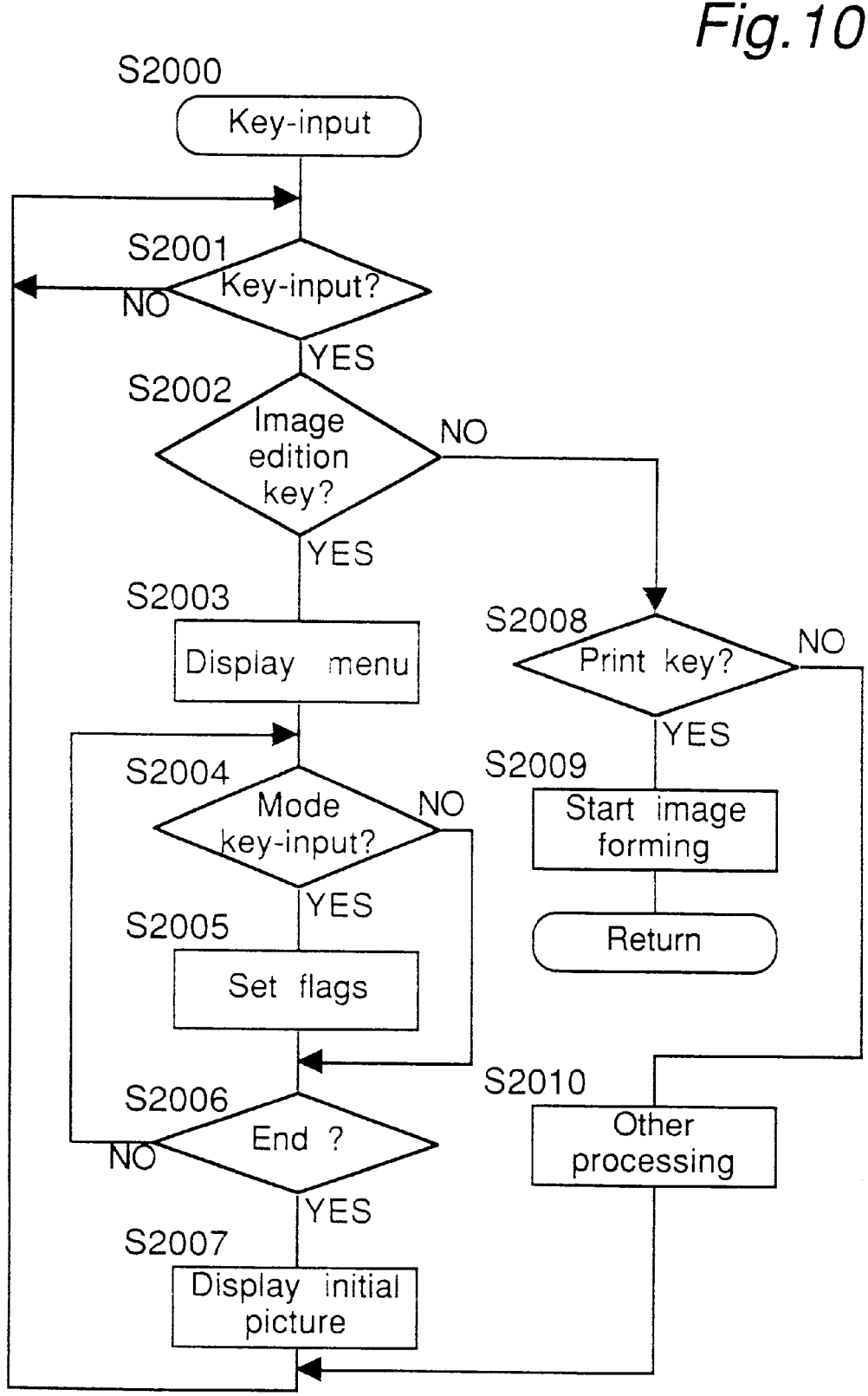
FIG. 10 is a flowchart of key-input routine.

FIG. 10 shows the key-input processing (step S2000 in FIG. 9). If an key-input in the operational panel 300 is received (YES at step S2001), the flow branches according to the key-input. If a key-input of the image edition key 306 is received (YES at step S2002), the display of the edition menu is displayed in the display device 300 as shown in FIG. 8 (step S2003). An edition mode is selected by the cursor key 304. When a key-input of the enter key 305 for setting an edition mode is received (YES at step S2004), mode flags are set as shown in Table 3 (step S2005). On the other hand, if a key-input of end for stopping to set an edition mode is received (YES at step S2006), the display image on the display device 303 is returned to the initial image (step S2007), and the flow returns to step S2001. If a key-input other than end is received (NO at step S2006), the flow returns to step S2004.

If a key-input of the start key 302 is received (YES at step S2008), image forming in the printer 200 is started (step S2009) and the flow returns to step S2001.

If a key-input other than that of the image edition key 306 or the print key 302 is received (NO at step S2008), processing for the key-input is performed (step S2010), and the flow returns to step S2001.

PROCESSING OF CODED DATA

Figure 11:
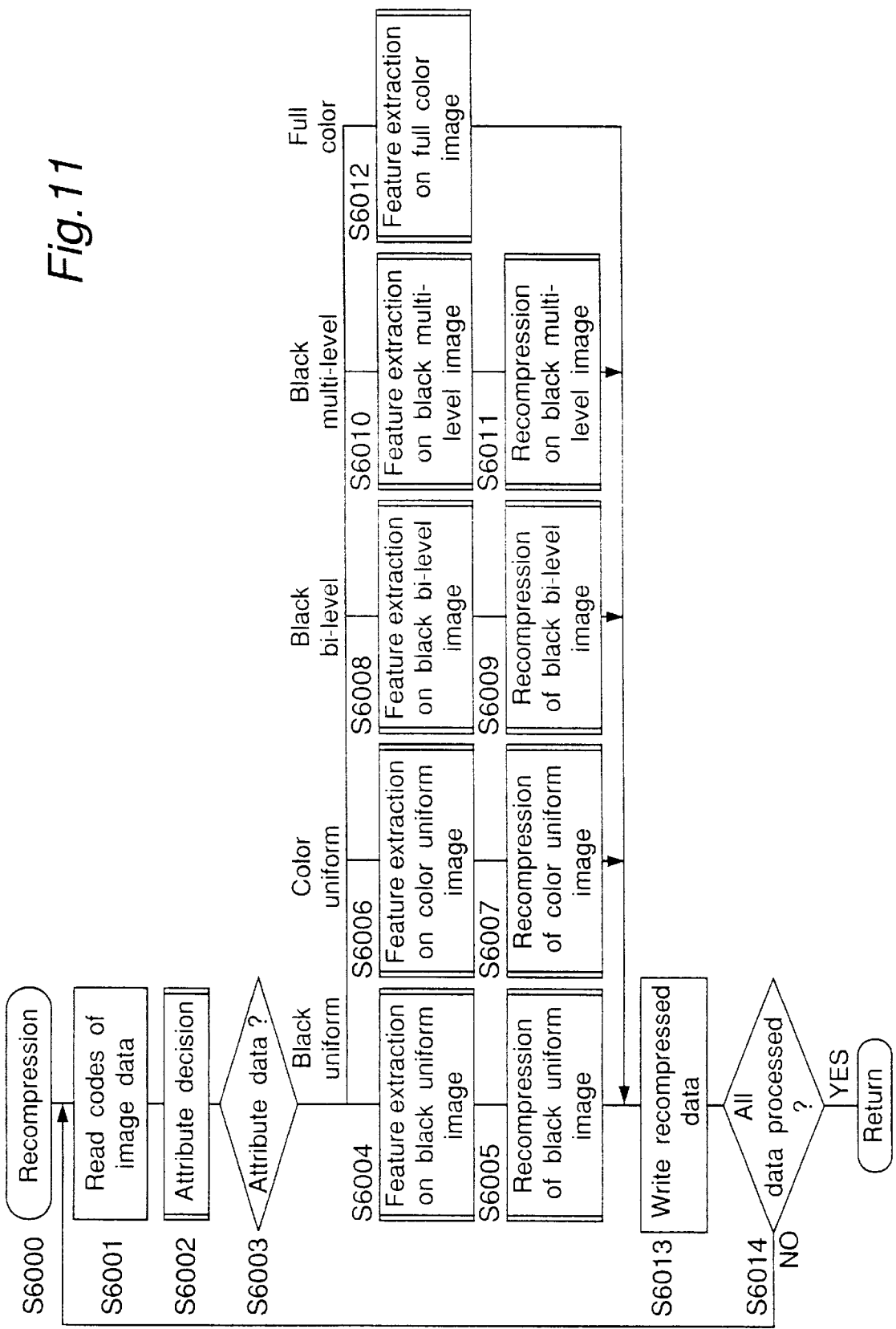
FIG. 11 is a flowchart of recompression processing for data subjected to generalized block truncation coding.

FIG. 11 shows a flowchart of the data recompression on the data subjected to generalized block truncation coding (step S6000 in FIG. 9). In this processing, attributes of an image of a 4*4 block including a pixel of interest are determined according to the data stored in the compression image data (gradation width index LD, average information LA and coded data $\phi_{ij}$). Then, the data is compressed further according to the attributes. In the compression, data which can be specified always according to the attributes of image are deleted. Therefore, a compression rate of image data can be improved further without sacrificing reproducibility. Even if a bit number of coded data $\phi_{ij}$ for each pixel is increased to improve reproducibility, a decrease in compression rate of image data can be prevented by the recompression.

Figure 12:
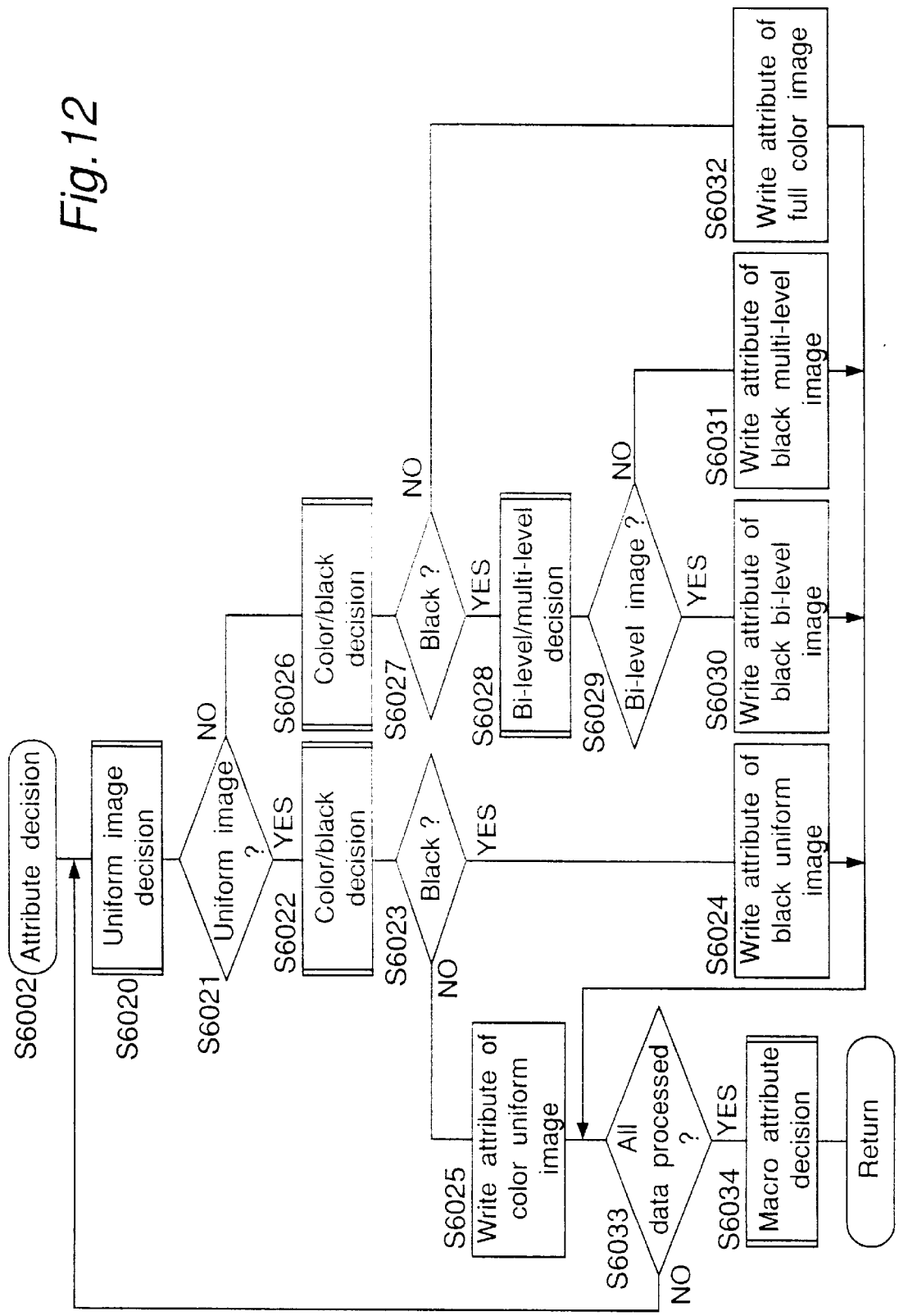
FIG. 12 is a flowchart of attribute decision.

In the recompression flow shown in FIG. 11, first, code data stored in the compression image data memory 610 is read (step S6001), and attributes of the code data for the 4*4 pixel blocks are decided (step S6002, refer to FIG. 12). In the attribute decision, attributes are decided for each code data $\phi_{ij}$ according as an image of a 4*4 pixel block relevant to the code data is a black uniform image, a color uniform image, a black bi-level image, a black multi-level image or a full color image. Further, a uniform image flag f1, a color/monochromatic color flag f2 and a bi-level/multi-level flag f3 are decided according to the results of attribute decision. The flags f1, f2, and f3 are stored in the compression image memory 610 as attribute information. Then, the attribute decision is checked and if an erroneous decision is found in a block, the attribute information on the block is corrected. The result of attribute decision is stored in the compression image memory 610 in an area different from that for storing the attribute information.

Then, the flow branches according to the attributes or image type decided above (step S6003). If the block is a black uniform image (flag f1=1 and flag f2=1), feature quantities for the image are extracted (step S6004, refer to FIG. 21), wherein a histogram of average data LA of the lightness component L* is obtained. Then, recompression of the black uniform image is performed (step S6005, refer to FIG. 27).

If the block is a color uniform image (flag f1=1 and flag f2=0), feature quantities for the image are extracted (step S6006, refer to FIG. 22), wherein histograms of average data LA of the lightness component L* and chromaticity components a* and b* are obtained. Then, recompression of the color uniform image is performed (step S6007, refer to FIG. 27).

If the block is a black b-level image (flag f1=0, flag f2=1 and flag f3=1), feature quantities for the image are extracted (step S6008, refer to FIG. 23), wherein a ratio of black pixels to the white pixels in the block is obtained. Then, recompression of the black bi-level image is performed (step S6009, refer to FIG. 28).

If the block is a black multi-level image (flag f1=0, flag f2=1 and flag f3=1), feature quantities for the image are extracted (step S6010, refer to FIG. 24), wherein histograms of average data LA and gradation width index LD of the lightness component L* are obtained. Then, recompression of the black multi-level image is performed (step S6011, refer to FIG. 29).

If the block is a full color image (flag f1=0, flag f2=0 and flag f3=1), feature quantities for the image are extracted (step S6012, refer to FIG. 25), wherein histograms of average data LA and gradation width indices of the lightness component L* and the chromaticity components a* and b* are obtained.

After the above-mentioned processing according to the attribute of the image, compression data obtained by the recompression are stored in the compression image memory 610 (step S6013). However, for the full color image, the as-received compression data are stored in the compression code data. If the above-mentioned processing is performed on all the 4*4 pixel blocks (YES at step S6014), the flow returns to the main flow, otherwise the flow returns to step S6001.

ATTRIBUTE DECISION

FIG. 12 is a flowchart of the attribute decision (step S6002 in FIG. 11). First, it is checked if the image in a 4*4 pixel block is a uniform image or not (step S6020, refer to FIG. 13). The flag f1 is set to be "1" if the image in the 4*4 pixel block is decided to be a uniform image, otherwise it is set to be "0". Then, the flag f1 is checked (step S6021). If the flag f1 is decided to be "1" (YES at step S6021), it is checked if the image is a color image or a black image (step S6022, refer to FIG. 14). If the image is decided to be a black image, the flag f2 is set to be "1", otherwise it is set to be "0". Then, the flag f2 is checked (step S6023). Next, if the flag f2 is decided to be "1" (black uniform image) (YES at step S6023), an attribute signal which represents black uniform image is written to the hard disk 614 so as to be related to the code data (step S6024). On the other hand, if the flag f2 is decided to be "0" (color uniform image ( (NO at step S6023), an attribute signal which represents color uniform image is written to the hard disk 614 so as to be related to the code data (step S6025).

If the flag f1 is decided to be "0" (NO at step S6021), the image has gradation levels of two or more. Next, it is checked if the image is a color image or a black image (step S6026, refer to FIG. 14). If the image is decided to be a black image (YES at step S6027), it is further checked if the image is a bi-level image or multi-level image (step S6028, refer to FIG. 15). If the image is decided to be a bi-level image, the flag f3 is set to be "1", otherwise it is set to be "0". Then, the flag f3 is checked (step S6029). If the flag f3 is decided to be "1" (bi-level image) (YES at step S6029), an attribute signal which represents black bi-level image is written to the hard disk 614 so as to be related to the code data (step S6030). On the other hand, if the flag f3 is decided to be "0" (multi-level image) (NO at step S6029), an attribute signal which represents black multi-level image is written to the hard disk 614 so as to be related to the code data (step S6031). Further, if the image is decided not to be a black image (NO at step S6027), an attribute signal which represents full color image is written to the hard disk 614 so as to be related to the code data (step S6032).

If the above-mentioned processing is decided not to be performed on all the blocks (NO at step S6033), the flow returns to step S6020. IF all the blocks are decided to be processed (YES at step S6033), attribute macro decision is performed (step S6034, refer to FIG. 16), wherein the attributes decided above are checked for each block according to the attributes of the block and adjacent blocks within a predetermined range (say 7*7 blocks), and if an error is found, the attribute is corrected.

Figure 13:
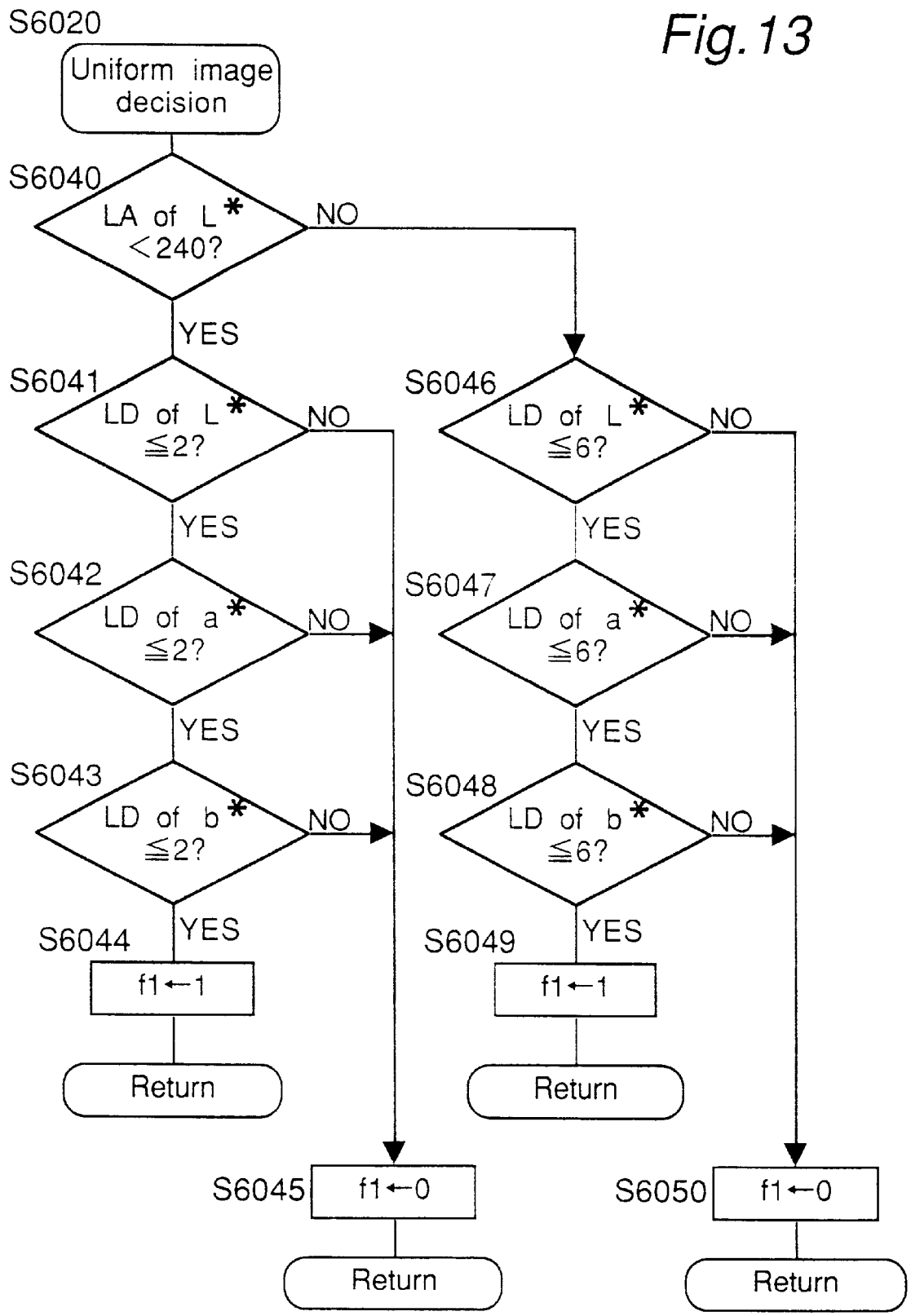
FIG. 13 is a flowchart of uniform image decision.

FIG. 13 is a flowchart of the uniform image decision (step S6020, in FIG. 12). A uniform image means a monochromatic image having a certain lightness component L* and the chromaticity components a* and b*. One can recognize a uniform image if the gradation width indices of lightness component L* and the chromaticity components a* and b* are smaller than particular values. However, if the average data LA of the lightness component L* is large to some degree (for example larger than 240), one can recognize a uniform image if the gradation width indices of lightness component L* and the chromaticity components a* and b* are larger than the particular values. In the embodiment, the image of the block is decided to be a uniform image if the average information LA of the lightness component L* is smaller than 240 (YES at step S6040), and if the gradation width indices of the lightness component L* and the chromaticity components a* and b* are equal to or smaller than 2 (YES at steps S6041, S6042 and S6043). Then, the flag f1 is set to be "1" (step S6044). Further, even if the average data LA of the lightness component L* is not smaller than 240 (NO at step S6040), the image of the block is decided to be a uniform image if the gradation width indices of the lightness component L* and the chromaticity components a* and b* are equal to or smaller than 6 (YES at steps S6046, S6047 and S6048). Then, the flag f1 is set to be "1" (step S6049). Otherwise, the image is decided not to be a uniform image, and the flag f1 is set to be "0" (steps S6044 and S6050).

Figure 14:
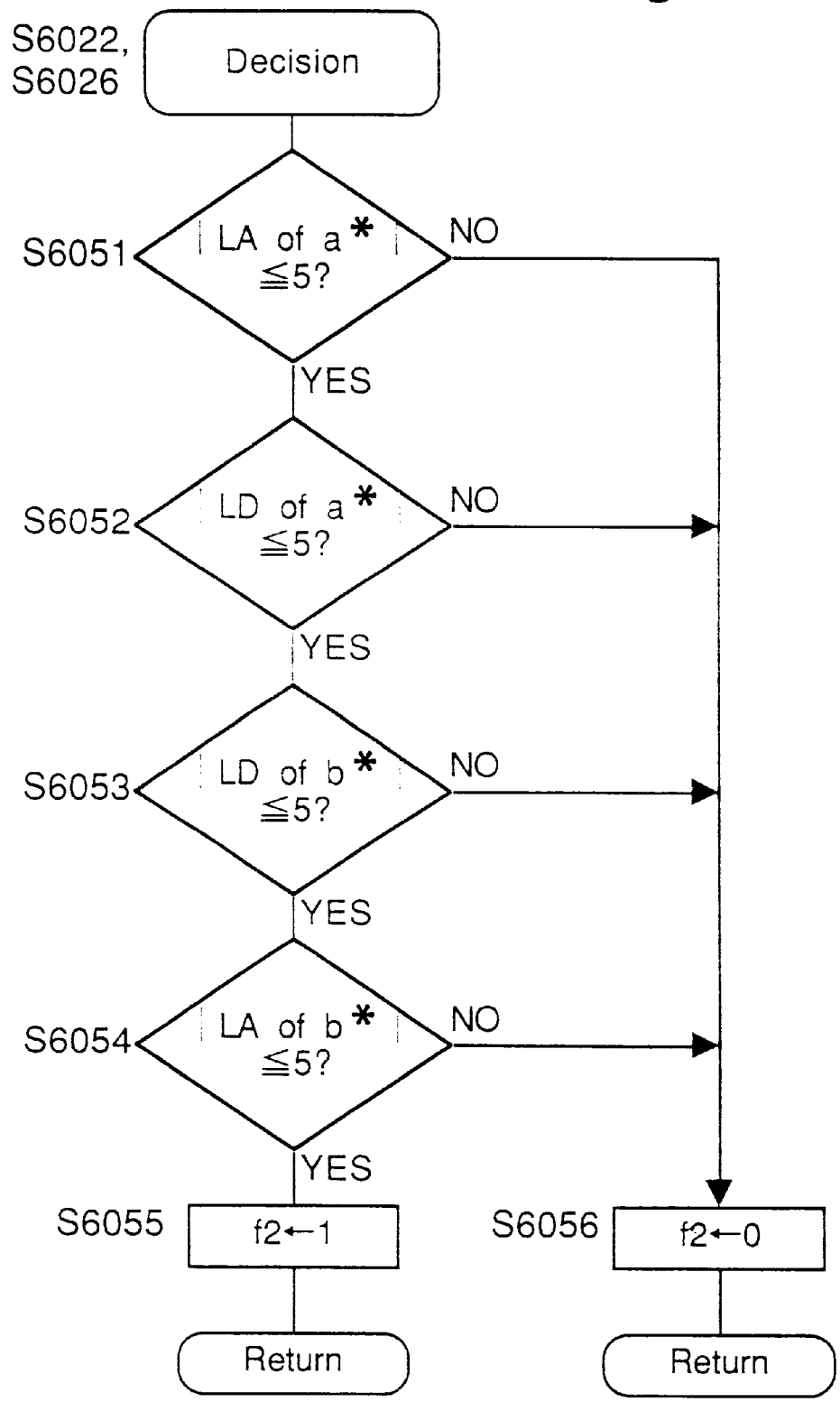
FIG. 14 is a flowchart of color/monochromatic image decision.

FIG. 14 is a flowchart of the color/black image decision (steps S6022 and S6026 in FIG. 12). A black image has achromatic colors having chromaticity components a* and b* of about zero. For example, if the average data LA of the chromaticity components a* and b* are within ±5, the image is decided to have achromatic colors. However, if only this criterion is used, the decision is erroneous, for example, in a case that the average information LA a* is −120 and b* is 125. Then, in the embodiment, the gradation width indices LD of a* and b* are also considered for the color/black image decision. In concrete, the image is decided to be a black image if the average data LA of the chromaticity components a* and b* and gradation width indices LD of the chromaticity components a* and b* are all within ±5 (YES at steps S6051, S6052, S6053 and S6054). Then, the flag f2 is set to be "1" (step S6055). Otherwise the flag f2 is set to be "0" (color image) (step S6056).

Figure 15:
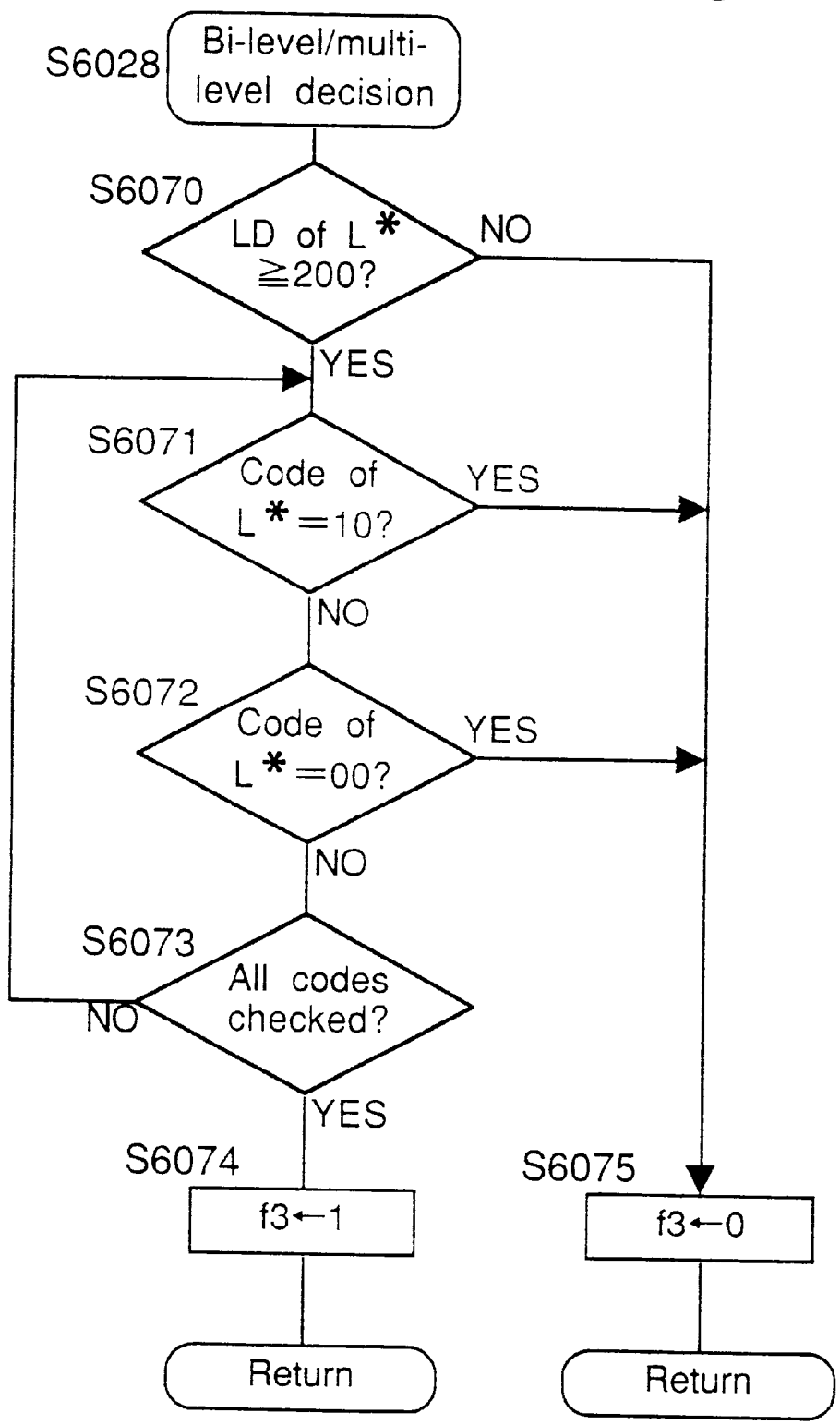
FIG. 15 is a flowchart of bi-level/multi-level decision.

FIG. 15 is a flowchart of the bi-level/multi-level decision (step S6028 in FIG. 12). Coded data of a 4*4 pixel block of a bi-level image has a large gradation width index LD of lightness component L*, and the code data $\phi_{ij}$ do not have values of "10" and "00" which represent half-tone data. On the other hand, code data $\phi_{ij}$ of 4*4 pixel block of a multi-level image have values of "10" and "00" which represent half-tone data. Then, in the bi-level/multi-level decision, if the gradation width index LD of lightness L* of a 4*4 pixel block is equal to or larger than 200 (YES at step S6070) and if all the code data $\phi_{ij}$ in the block are neither "10" nor "00" (NO at steps S6071 and S6072, and YES at step S6073), the block is decided to belong to a bi-level image, and the flag f3 is set as "1" (step S6074). On the contrary, if the gradation width index LD of lightness L* of a 4*4 pixel block is smaller than 200 (NO at step S6070), or if at least one of all the code data $\phi_{ij}$ in the block is "10" or "00" (YES at step S6071 or S6072), the block is decided to belong to a multi-level image and the flag f3 is set as "0" (step S6074).

MACRO ATTRIBUTE DECISION

Macro attribute decision is performed on attributes decided by the attribute decision explained above which decides the attribute of image of each block precisely. Because the attribute is decided in the attribute decision without considering any relation between adjacent blocks, the attribute may be decided erroneously. For example, if a document includes a photograph image of a person as a black multi-level image, for example a block in a hair may be decided erroneously as a black uniform image. Further, the resolution of an image may be deteriorated due to precision of a reading mechanism for reading a document image. Still further, read data of a color image may include a blur at an edge of a character image which does not exist actually in the document. Then, the attribute of the image may not be decided correctly according to such causes. Then, the attribute decision a block is checked by considering decisions of attributes in a certain area of blocks including the block of interest at its center, say 7*7 blocks. This decision is called as macro attribute decision. The size of the block area is not limited to 7*7 blocks. For example, the area has 10*10 blocks. The size of the area may be changed according to the attribute of the block of interest. For example, if the attribute of the block of interest is full color image, attribute data in an area of 10*10 blocks are read, while if the attribute of the block of interest is not full color image, attribute data in an area of 7*7 blocks are read. Thus, macro attribute decision can be performed more appropriately.

Figure 16:
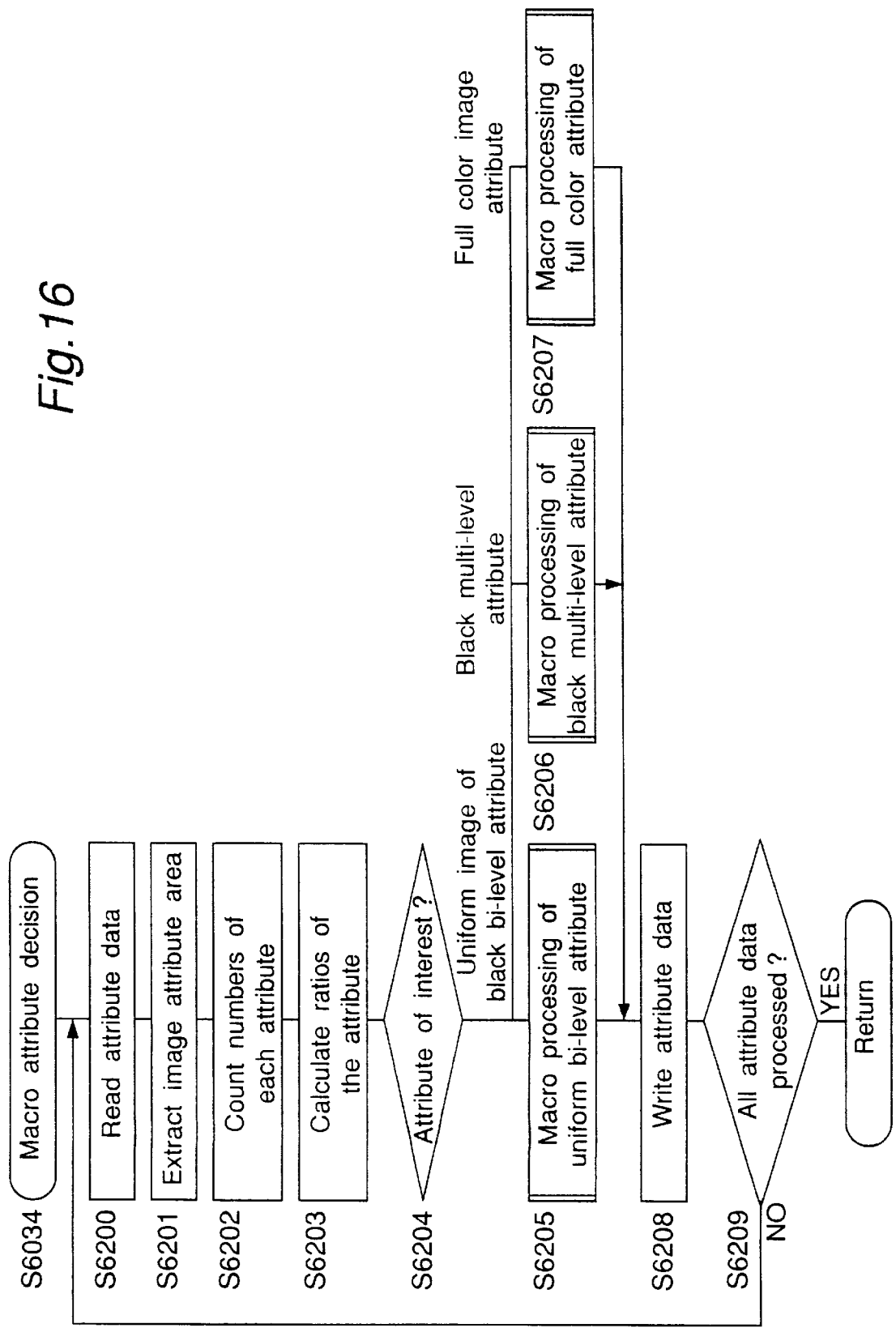
FIG. 16 is a flowchart of macro attribute decision.

FIG. 16 is a flowchart of the macro attribute decision (step S6034 in FIG. 12). First, attribute data (uniform image flag f1, color/black image flag f2 and bi-level/multi-level image flag f3) of a block of interest to be subjected to macro attribute decision are read from the compression image memory 610 (step S6200). Similarly, attribute data of blocks in an area of 7*7 blocks including the block of interest at its center are read (step S6201).

Figure 17:
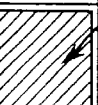
FIG. 17 is a diagram of an example of results of attribute decisions for an area of 7*7 blocks including a block of interest.

Returning to FIG. 16, numbers of blocks of each attribute in the 7*7 blocks are counted (step S6202). Then, a ratio $B_p$ of black uniform image attribute, a ratio $S_p$ of black bi-level image attribute, a ratio $M_p$ of black multi-level image attribute and a ratio $F_p$ of full color image attribute are calculated according to following relations (step S6203):

$$B_p = B/T * 100, \quad (13)$$

$$S_p = S/(T-B) * 100, \quad (14)$$

$$M_p = M/(T-B) * 100, \quad (15)$$

and $$F_p = F/(T-B) * 100, \quad (16)$$

wherein T denotes a number of blocks in the area for macro attribute decision, S denotes a number of blocks of black and color uniform image attributes in the area for macro attribute decision, M denotes a number of blocks of black multi-level image attribute in the area, F denotes a number of blocks of full color image attribute in the area. In the example shown in FIG. 17, T=49, B=5, S=14, M=14 and F=16, so that $B_p$=10.2, $S_p$=31.8, $M_p$=31.8 and $F_p$=36.4.

After calculating the ratios, the flow branches according to the attribute of the block of interest for macro attribute decision (step S6204). If the attribute of the block of interest is uniform image or bi-level black image, uniform and bi-level macro processing is performed (step S6205, FIG. 18); if the attribute of the block of interest is black multi-level image, black multi-level macro processing is performed (step S6206, FIG. 19); if the attribute of the block of interest is full color image, full color macro processing is performed (step S6207, FIG. 20). Then, the attribute information of the block determined by the macro attribute decision is stored in the compression image memory 610 in an area different from the area for storing the above-mentioned attribute decision (step S6208). Then, if all the attribute data of the image blocks are not yet processed (NO at step S6209), the flow returns to step S6200, otherwise the flow returns to the main flow.

Figure 18:
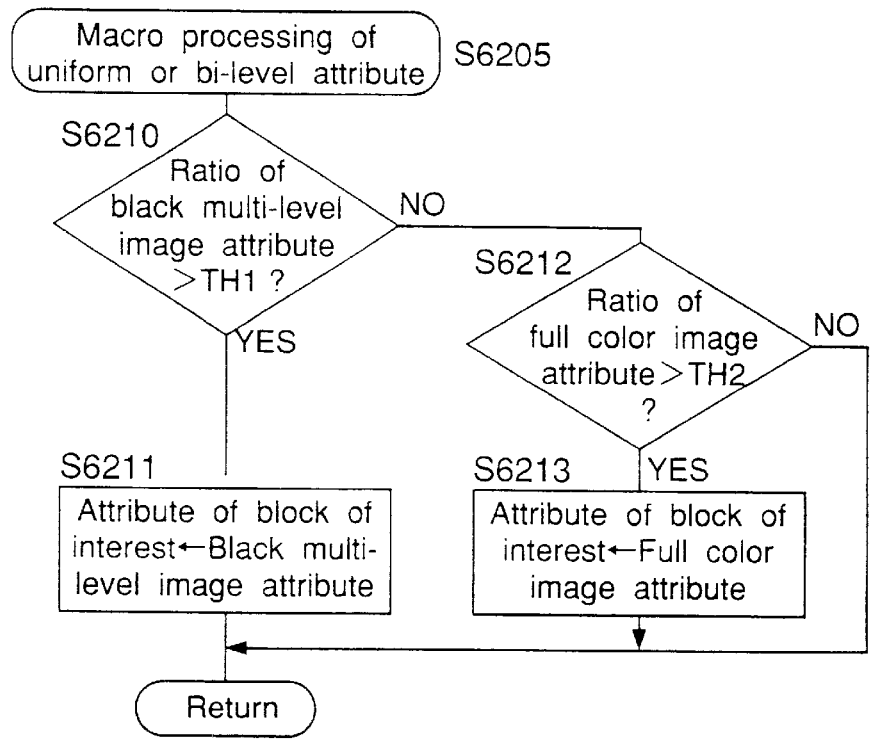
FIG. 18 is a flowchart of macro attribute decision of uniform bi-level image.

FIG. 18 is a flowchart of the macro attribute decision of uniform and bi-level image (step S6205 in FIG. 16). In the attribute decision described previously, a block of black bi-level image is not decided erroneously as uniform image, and a block of uniform image is also not decided erroneously as black bi-level image. However, a block in a black multi-level image or in a full color image may be decided erroneously as uniform image or black bi-level image. In the macro processing of uniform or black bi-level image, it is decided first if the ratio $M_p$ of black multi-level image attribute is larger than a threshold value TH1 (step S6210). The threshold value TH1 is determined experimentally beforehand, and it is set as 70 in this example. If the ratio $M_p$ of black multi-level image attribute is larger than the threshold value TH1 (YES at step S6210), the attribute of the block of interest is corrected as black multi-level image (step S6211). Otherwise it is checked if the ratio $F_p$ of full color image attribute is larger than another threshold value TH2 (step S6212). The threshold value TH2 is determined experimentally beforehand, and it is set as 50 in this example. If the ratio $F_p$ of full color image attribute is larger than the threshold value TH2 (YES at step S6212), the attribute of the block of interest is corrected as full color image (step S6213). Otherwise the attribute is not changed because the result of attribute decision is decided to be correct. As explained above, the attribute decided according to data only of the block of interest is checked by taking attributes of adjacent blocks into account, and the precision of the attribute decision is improved.

It is to be noted that the ratio $M_p$ of black multi-level image is checked before the ratio $F_p$ of full color image. A full color image can include a black multi-level image. Therefore, a full color image includes an image in a broader range than the black multi-level image. Then, the full color image attribute is considered before an attribute which can be decided more precisely. This situation is similar to the macro attribute decisions explained below.

Figure 19:
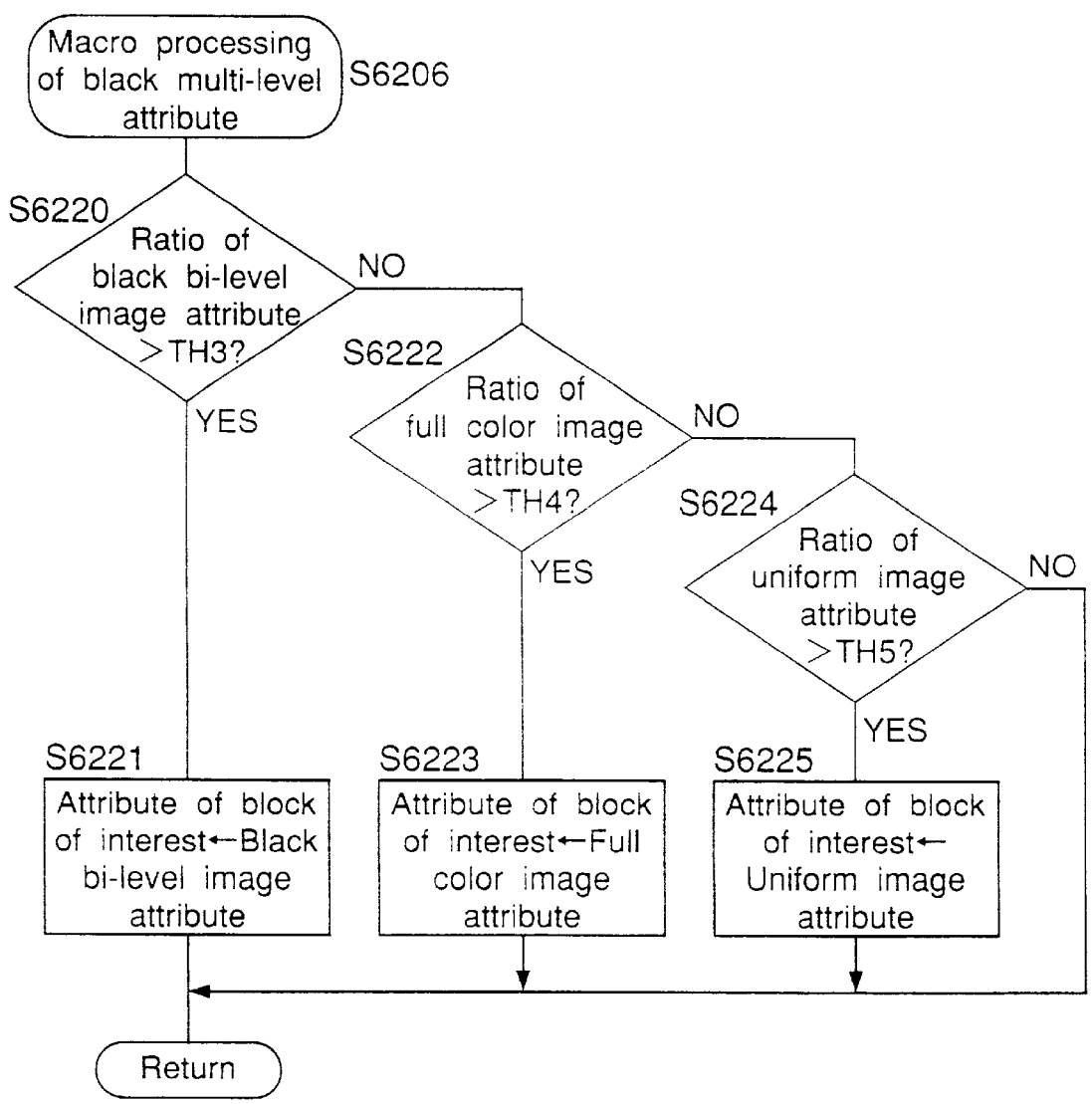
FIG. 19 is a flowchart of macro attribute decision of black multi-level image.

FIG. 19 is a flowchart of the macro attribute decision of black multi-level image (step S6206 in FIG. 16). A block of black bi-level image, full color image or uniform image may be decided erroneously as multi-level image in the attribute decision. The block is decided erroneously as black multi-level image, for example, if gradation is deteriorated locally in a block in a character image due to read resolution or the like and the codes $\phi_{ij}$ assigned to the block do not have two-peak distribution. In the macro processing of black multi-level image, it is decided first if the ratio $S_p$ of black bi-level image attribute is larger than a threshold value TH3 (step S6220). The threshold value TH3 is determined experimentally beforehand, and it is set as 70 in this example. If the ratio $S_p$ of black bi-level image attribute is larger than the threshold value TH3 (YES at step S6220), the attribute of the block of interest is corrected as black bi-level image (step S6221). Otherwise it is checked if the ratio $F_p$ of full color image attribute is larger than another threshold value TH4 (step S6222). The threshold value TH4 is determined experimentally beforehand, and it is set as 50 in this example. If the ratio $F_p$ of full color image attribute is larger than the threshold value TH4 (YES at step S6222), the attribute of the block of interest is corrected as full color image (step S6223). Otherwise it is checked if the ratio $B_p$ of uniform image attribute is larger than a further threshold value TH5 (Step S6224). The threshold value TH5 is determined experimentally, and it is set as 80 in this example. If the ratio $B_p$ of full color image attribute is larger than the threshold value TH5 (YES at step S6224), the attribute of the block of interest is corrected as uniform image (step S6225). Otherwise the attribute is not changed because the result of attribute decision is decided to be correct. As explained above, the attribute decided according data in a block is checked by taking attributes of adjacent blocks into account, and the precision of the attribute decision is improved.

Figure 20:
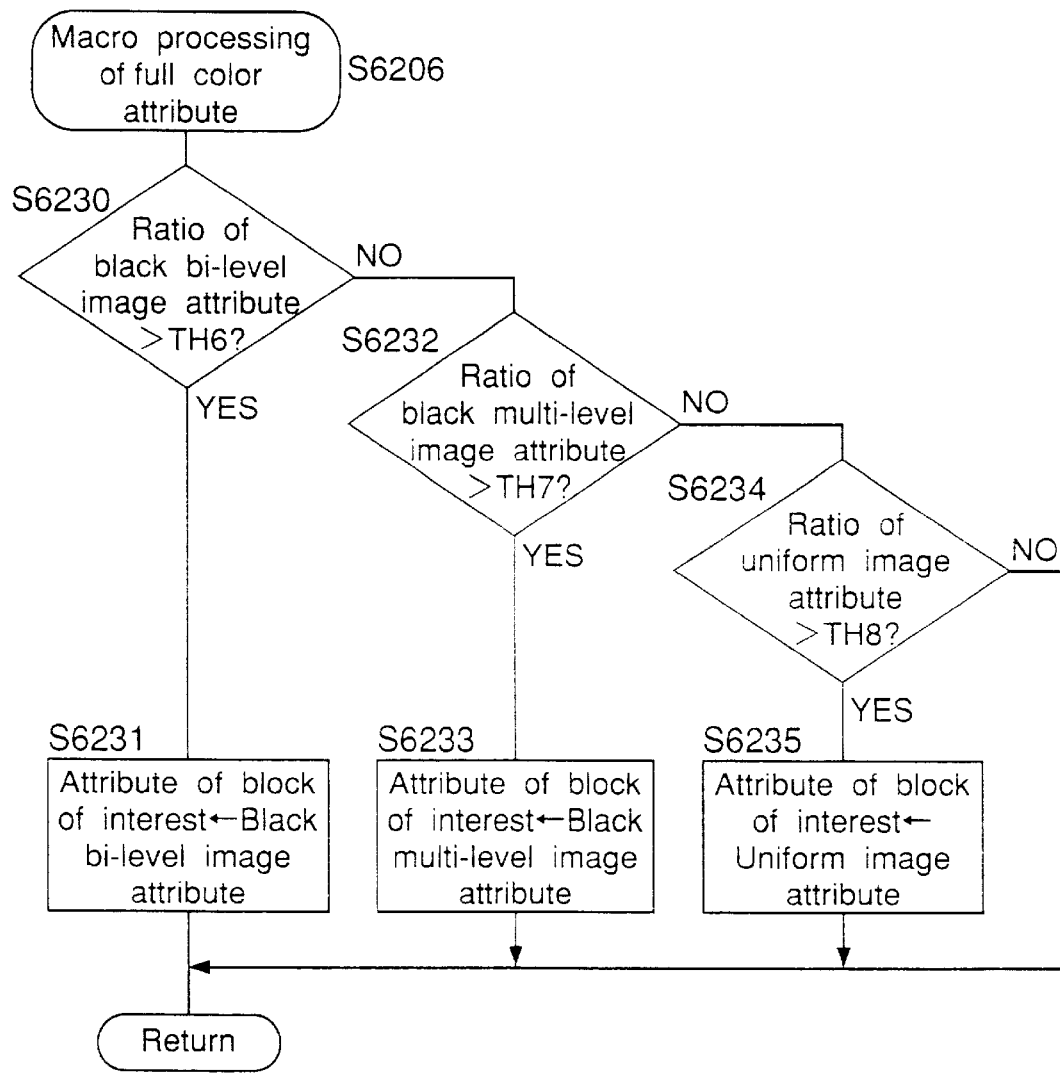
FIG. 20 is a flowchart of macro attribute decision of full color image.

FIG. 20 is a flowchart of the macro attribute decision of full color image (step S6206 in FIG. 16). A block of black bi-level image, black multi-level image or uniform image may be decided erroneously as full color image in the attribute decision. In the attribute decision described above, a block which does not belong to any of uniform image, black bi-level image or black multi-level image is decided as full color image. Therefore, a block of uniform image, black bi-level image or black multi-level image may be decided erroneously as full color image due to deterioration of precision of image read.

In the macro processing of full color image, it is decided first if the ratio $S_p$ of black bi-level image attribute is larger than a threshold value TH6 (step S6230). The threshold value TH6 is determined experimentally beforehand, and it is set as 70 in this example. If the ratio $S_p$ of black bi-level image attribute is larger than the threshold value TH6 (YES at step S6230), the attribute of the block of interest is corrected as black bi-level image (step S6231). Otherwise it is checked if the ratio $M_p$ of black multi-level image attribute is larger than another threshold value TH7 (step S6232). The threshold value TH7 is determined experimentally beforehand, and it is set as 70 in this example. If the ratio $M_p$ of black bi-level image attribute is larger than the threshold value TH7 (YES at step S6232), the attribute of the block of interest is corrected as multi-level image (step S6233). Otherwise it is checked if the ratio $B_p$ of uniform image attribute is larger than a further threshold value TH8 (step S6234). The threshold value TH8 is determined experimentally beforehand, and it is set as 80 in this example. If the ratio $B_p$ of full color image attribute is larger than the threshold value TH8 (YES at step S6234), the attribute of the block of interest is corrected as uniform image (step S6235). Otherwise the attribute is not changed because the result of attribute decision is decided to be correct. As explained above, the attribute decided according data in a block is checked by taking attributes of adjacent blocks into account, and the precision of the attribute decision is improved.

EXTRACTION OF FEATURE QUANTITIES

The average data LA and the gradation width index LD determined in the generalized block truncation coding represent an average information on all the image data and a representative value of gradation width data in a block, and each of them uses a memory capacity of 1/16 of the original image data. Then, information similar to that obtained on the lightness component L* and the chromaticity components a* and b* of the original image data can be obtained from the data of an amount of 1/8 of the original data. Then, an operation circuit for extracting feature quantities can be simplified, and a time for the extraction can be shortened. In the embodiment, the feature quantities are stored in the hard disk 614, and they can be read later for automatic exposure, image edition/operation or the like. Thus, a capacity for storing feature quantities can be reduced, and that a time needed for the processing can be shortened.

Figure 21:
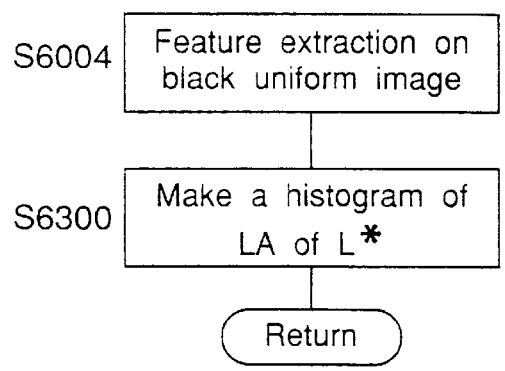
FIG. 21 is a flowchart of determining a feature of a black uniform image.

FIG. 21 is a flowchart of extracting feature quantities of a black uniform image (step S6004 in FIG. 11). In the flow, a histogram of the average data LA of the lightness component L is made on all the blocks (step S6300), and the histogram is stored in the hard disk 614. Then, the flow returns. The histogram is sued for underground deletion which is one of edition/operation processing.

Figure 22:
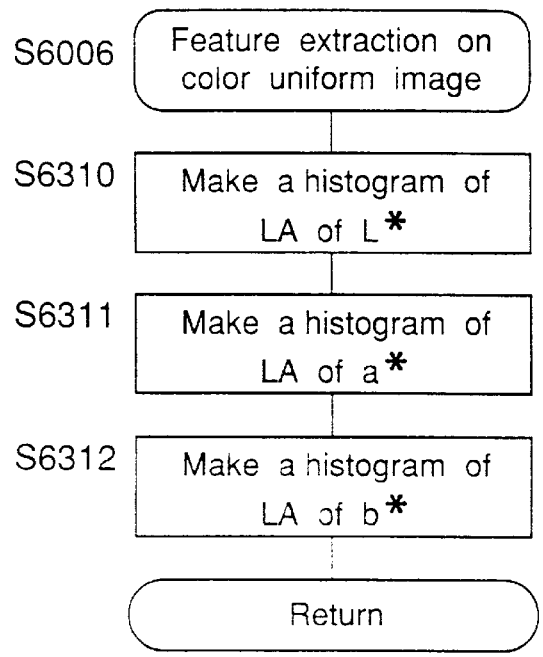
FIG. 22 is a flowchart of determining feature quantities of a color uniform image.

FIG. 22 is a flowchart of extracting feature quantities of a color uniform image (step S6006 in FIG. 11). In the flow, a histogram of the average data LA of the lightness component $L_*$ is made on all the blocks (step S6310). Next, a histogram of the chromaticity component a* is made on all the blocks (step S6311), and a histogram of the chromaticity component b* is made on all the blocks (step S6312). These histograms are stored in the hard disk 614. Then, the flow returns. The histograms are used for underground deletion which is one of edition/operation processing.

Figure 23:
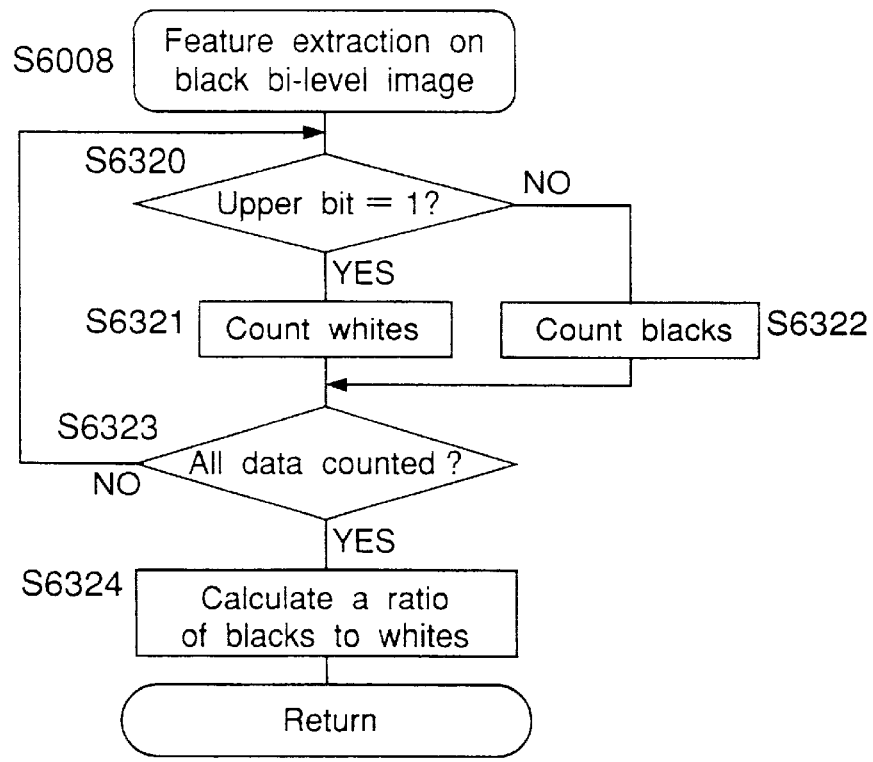
FIG. 23 is a flowchart of determining feature quantities of a black bi-level image.

FIG. 23 is a flowchart of extracting feature quantities of a black bi-level image (step S6008 in FIG. 11). In the flow, a ratio of black pixels to white ones is determined. If the upper bit of a code of each pixel is decided to be "1" (YES at step S6320), the pixel is decided to be a white pixel, and a count on the number of white pixels is incremented (step S6321). On the other hand, if the upper bit of the code is decided not to be "1" (NO at step S6320), the pixel is decided to be a black pixel, and a count on the number of black pixels is incremented (step S6322). As to step S6320, it is to be noted that the code data $\phi_{ij}$ or "11" or "10" is assigned if the image data in 256 gradation level is larger than the average data LA while the code data $\phi_{ij}$ of "00" or "01" is assigned if it is smaller than LA. This count is repeated on all the code data. After the count is performed on all the pixel data (YES at step S6324), a ratio of black pixels to white pixels is calculated (step S6324). The ratio is stored in the hard disk 614. Then, the flow returns.

Figure 24:
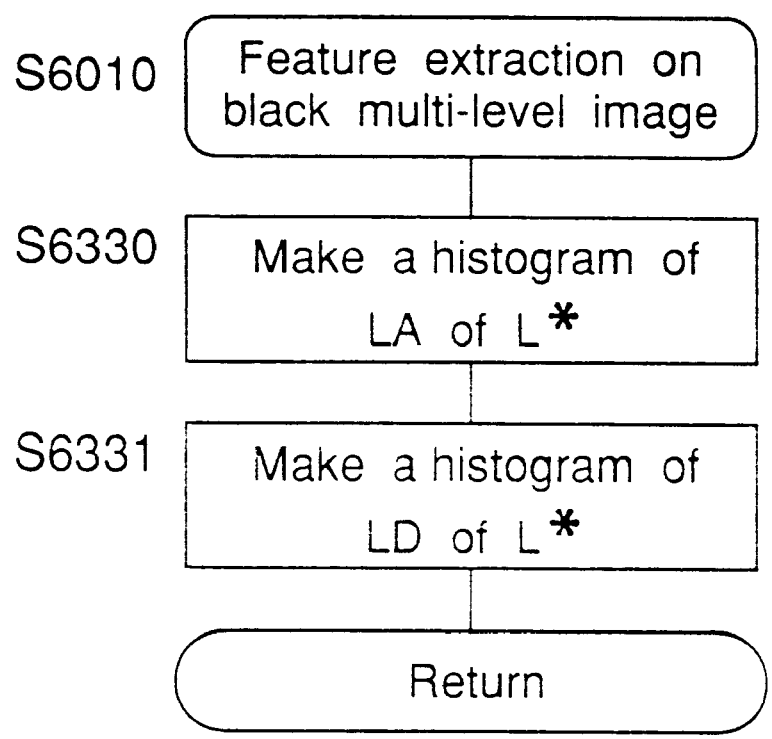
FIG. 24 is a flowchart of determining feature quantities of a black multi-level image.

FIG. 24 is a flowchart of extracting feature quantities of a black multi-level image (step S6010 in FIG. 11). In the flow, a histogram of the average data LA of the lightness component $L_*$ is made on all the blocks (step S6330). Next, a histogram of the gradation width index LD of the lightness component $L_*$ is made on all the blocks (step S6331). The histogram is stored in the hard disk 614. Then, the flow returns. The histogram is used later for automatic exposure.

Figure 25:
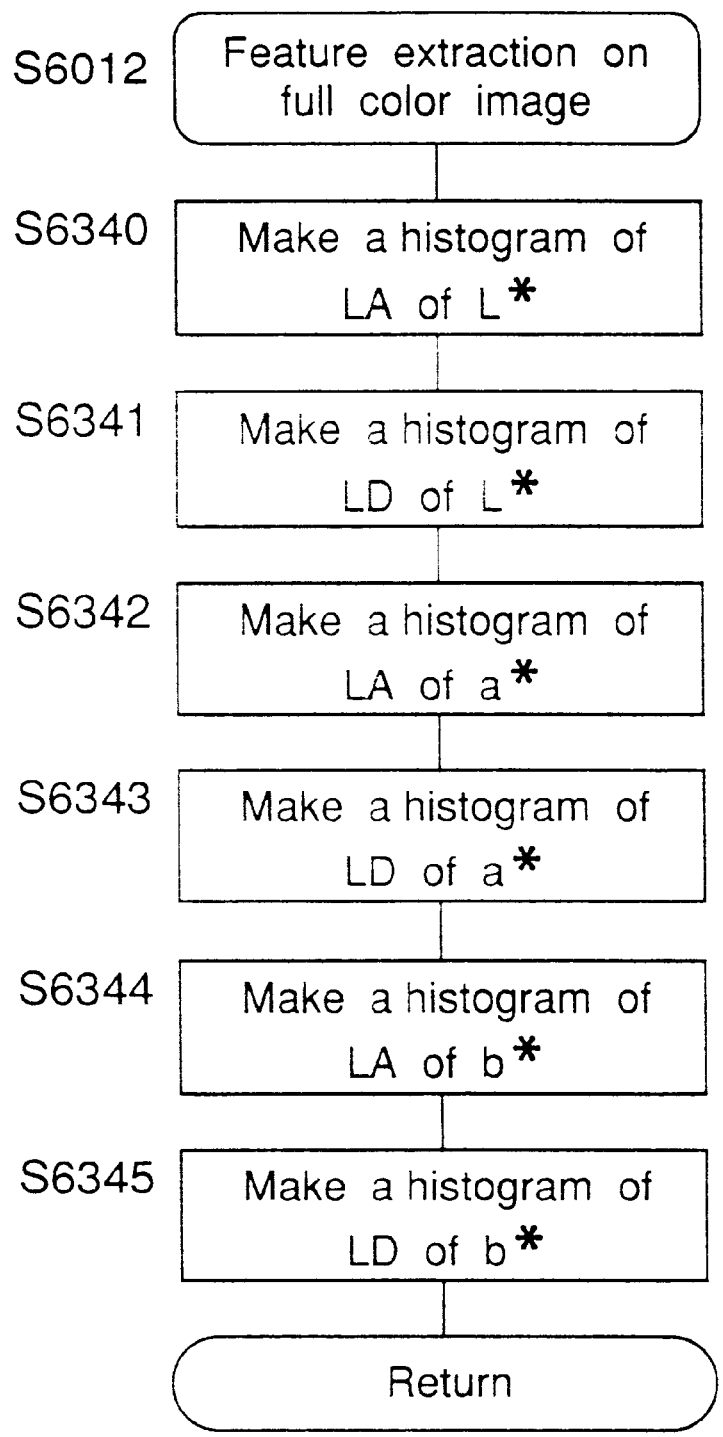
FIG. 25 is a flowchart of determining feature quantities of a full color image.

FIG. 25 is a flowchart of extracting feature quantities of a full color image (step S6012 in FIG. 11). In the flow, a histogram of the average data LA of the lightness component $L_*$ is made on all the blocks (step S6340), and a histogram of the gradation width index LD of the lightness component $L_*$ is made on all the blocks (step S6341). Further, a histogram of the average data LA of the chromaticity component $a_*$ is made on all the blocks (step S6342), and a histogram of the gradation width index LD of the chromaticity component $a_*$ is made on all the blocks (step S6343). Still further, a histogram of the average data LA of the chromaticity component $b_*$ is made on all the blocks (step S6344), and a histogram of the gradation width index LD of the chromaticity component $b_*$ is made on all the blocks (step S6345). These histograms are stored in the hard disk 614. Then, the flow returns. The histograms are used later for automatic exposure.

RECOMPRESSION

The recompression (steps S6005, S6007, S6009 and S6011) is performed on the data obtained by generalized block truncation coding (that is, the average data LA, the gradation width index LD and code data $\phi_{ij}$ for the lightness component L* and the chromaticity components a* and b*), in order to reduce an amount of data further, by deleting data which can be identified according to the attribute data decided in the attribute decision (step S6002). Data obtained by the recompression are stored in the compression image memory 610. Recompression is explained below one each attribute.

Figure 26:
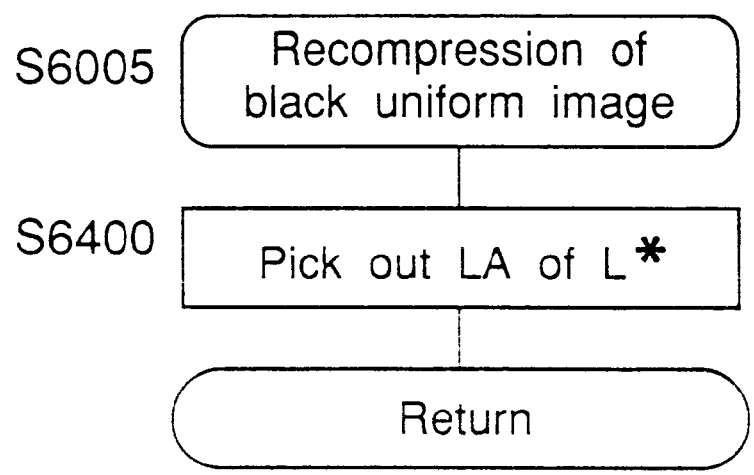
FIG. 26 is a flowchart of recompression for a black uniform image.

FIG. 26 is a flowchart of the recompression for a black uniform image (step S6005 in FIG. 11). A black uniform image is an achromatic image having a particular lightness component L* with zero values of the chromaticity components a* and b*. That is, the black uniform image can be reproduced from the lightness component L*. Because the lightness component L* has the particular value, the codes $\phi_{ij}$ assigned to each pixel in the block has the same sign. Further, the gradation width index LD is zero. Then, only the average data LA of the lightness component L* is picked out, and it is stored as recompression data in the compression image memory 610 (step S6400). Then, the flow returns.

Figure 27:
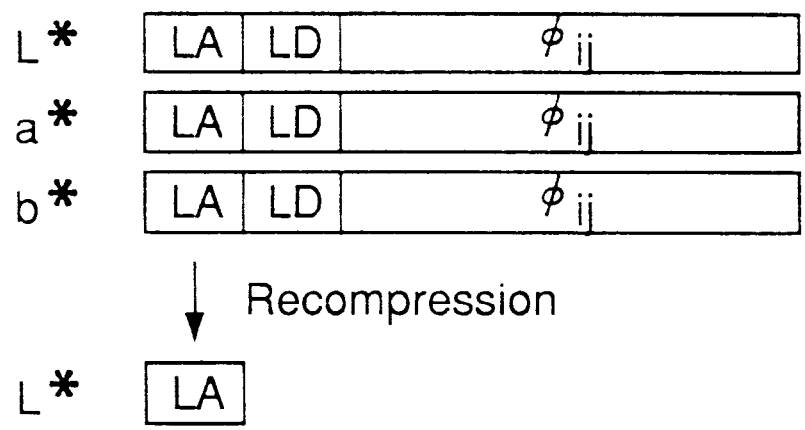
FIG. 27 is a diagram for illustrating a relation between coded data and recompression data obtained by the recompression of a black uniform image.

FIG. 27 illustrates a relation between the coded data obtained by generalized block truncation coding and the recompression data obtained by the above-mentioned recompression. An amount of the data after the recompression is reduced to 1/18 of that of the coded data. Because a compression rate of generalized block truncation coding is 3/8, the compression rate after recompression becomes 1/48.

Figure 28:
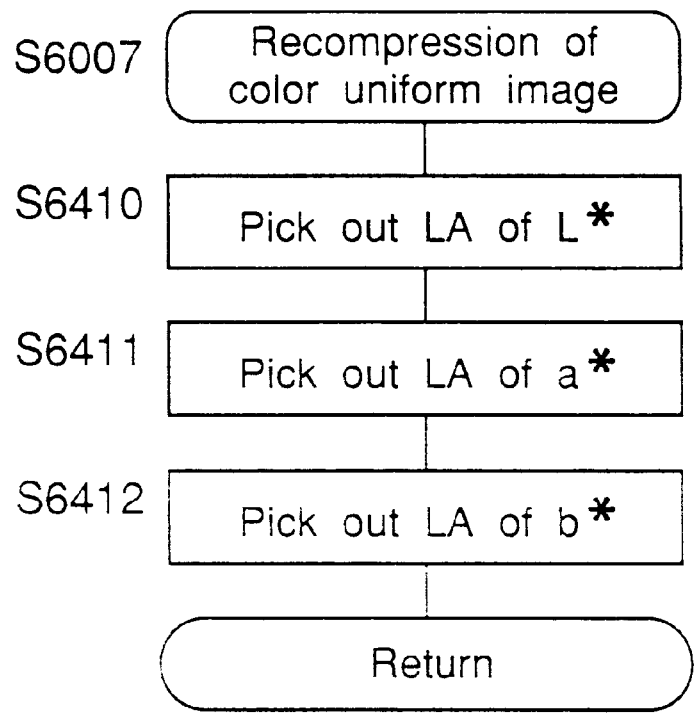
FIG. 28 is a flowchart of recompression for a color uniform image.

FIG. 28 is a flowchart of the recompression for a color uniform image (step S6007 in FIG. 11). A color uniform image is a monochromatic image having a particular lightness component L* and particular values of the chromaticity components a* and b*. That is, the color uniform image can be reproduced from three average data LA of the lightness component L* and the chromaticity components a* and b*. Then, only the three average data LA of the lightness component L* and the chromaticity components a* and b* are picked out, and they are stored as recompression data in the compression image memory 610 (steps S6410, S6411 and S6412). Then, the flow returns.

Figure 29:
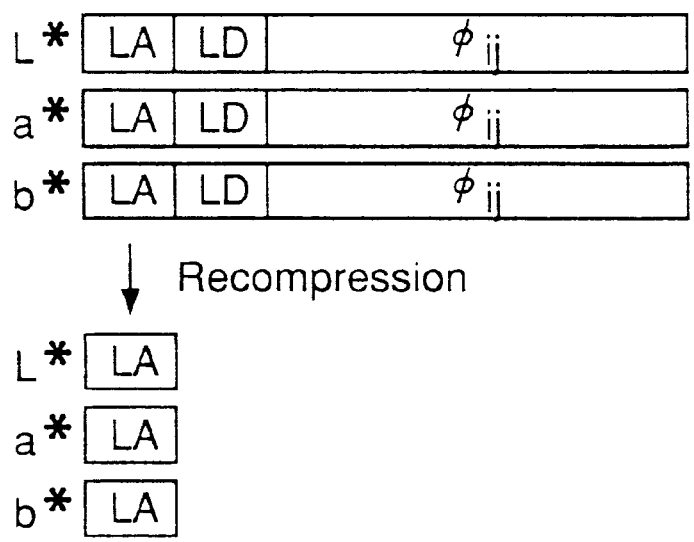
FIG. 29 is a diagram for illustrating a relation between coded data and recompression data obtained by the recompression processing of color uniform image.

FIG. 29 illustrates a relation between the coded data obtained by generalized block truncation coding and the recompression data obtained by the above-mentioned recompression. An amount of the data after recompression is reduced to 1/6 of that of the coded data. Because a compression rate of generalized block truncation coding is 3/8, the compression rate after recompression becomes 1/16.

Figure 30:
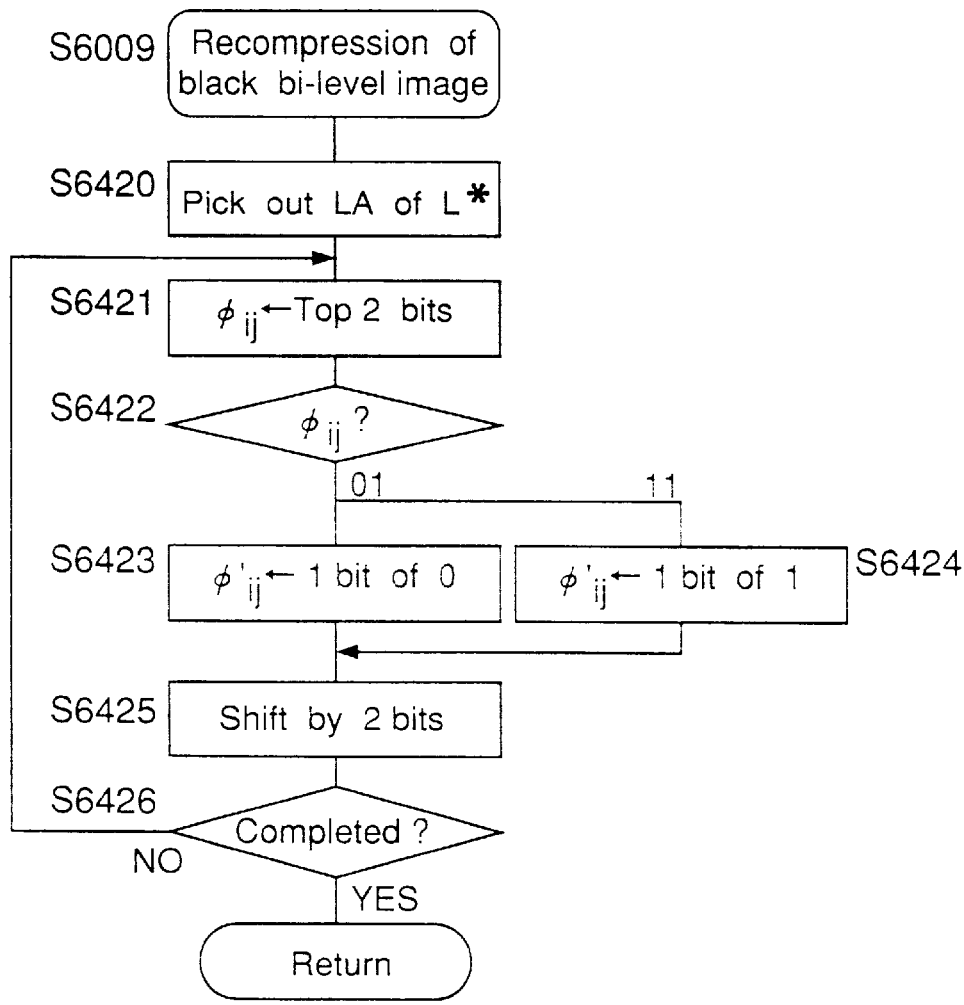
FIG. 30 is a flowchart of recompression for a black bi-level image.

FIG. 30 is a flowchart of the recompression for a black bi-level image (step S6009 in FIG. 11). A black bi-level image is an achromatic image of black (the lightness component L*=0) or black (the lightness component L*=255) with zero values of the chromaticity components a* and b*. That is, the black bi-level image can be reproduced from the code data $\phi_{ij}$. Further, the code data $\phi_{ij}$ has a value of "11" or "01". Then, only the code data $\phi_{ij}$ of the lightness component L* is picked out, and the data is converted to 1-bit data $\phi_{ij}$, and the data is stored as recompression data in the compression image memory 610. The 1-bit data $\phi_{ij}$ is 1 or 0 according as $\phi_{ij}$ is "11" or "01". In the flow, 6-byte data of the lightness component L* are read from the compression image memory 610, and 2-byte data of the average data LA and the gradation width index LD are deleted therein (step S6420), so that 4-byte data of the code data assigned to each pixel are remained. Next, top 2 bits of the 4-byte data are read as code data $\phi_{ij}$ (step S6421). For a bi-level image, the code data $\phi_{ij}$ is "11" or "01". Then, the flow branches according to the code data $\phi_{ij}$ (step S6422). If the code data $\phi_{ij}$ is "01", the 1-bit data $\phi'_{ij}$ is assigned to be 0 (step S6423). If the code data $\phi_{ij}$ is "11", the 1-bit data $\phi'_{ij}$ is assigned to be 1 (step S6424). Then, the data is shifted by 2 bits so that the next 2 bits are arranged at the top (step S6425). The above-mentioned processing is performed until all the code data are processed (YES at step S6426). Then, the flow returns.

Figure 31:
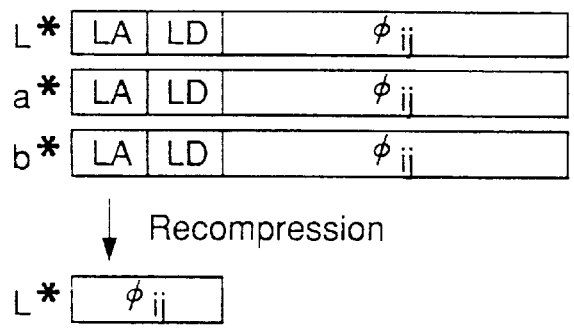
FIG. 31 is a diagram for illustrating a relation between coded data and recompression data obtained by the recompression of a black bi-level image.

FIG. 31 illustrates a relation between the coded data obtained by generalized block truncation coding and the recompression data obtained by the above-mentioned recompression. Data after the recompression comprises 1-bit data $\phi_{ij}$ of 16 pixels or 16-bit data. Then, an amount of the data after recompression is reduced to 1/3 of that of the coded data. Because a compression rate of generalized block truncation coding is 3/8, the compression rate after recompression becomes 1/24.

Figure 32:
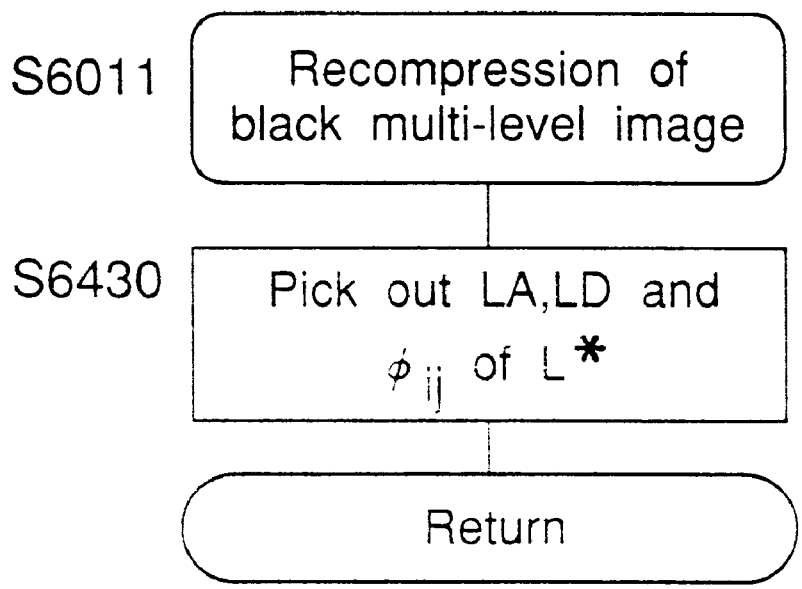
FIG. 32 is a flowchart of recompression for a black multi-level image.

FIG. 32 is a flowchart of the recompression for a black multi-level image (step S6011 in FIG. 11). A black multi-level image is an achromatic image with zero values of chromaticity components a* and b*, wherein the chromaticity component is changed from 0 to 255. That is, a black multi-level image can be reproduced only with the lightness component L*. Then, all the information (average data LA, gradation width index LD and code data $\phi_{ij}$) on the lightness component L* are picked out, and they are stored as recompression data in the compression image memory 610 (steps S6430). Then, the flow returns.

Figure 33:
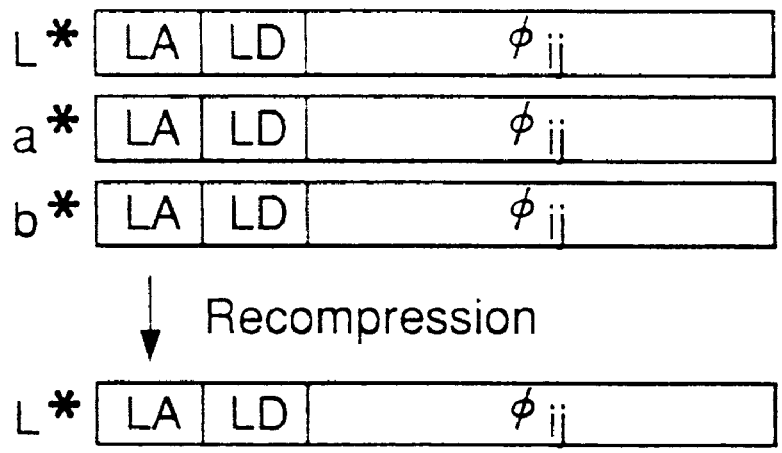
FIG. 33 is a diagram for illustrating a relation between coded data and recompression data obtained by the recompression of a black multi-level image.

FIG. 33 illustrates a relation between the coded data obtained by generalized block truncation coding and the recompression data obtained by the above-mentioned recompression. An amount of the data after the recompression is reduced to 1/3 of that of the coded data. Because a compression rate of generalized block truncation coding is 3/8, the compression rate after recompression becomes 1/8.

DECODING AFTER RECOMPRESSION AND IMAGE EDITION/OPERATION

In the processing of the decoding on recompressed data after recompression (step S7000 in FIG. 9), when an image is formed on a sheet of paper, the recompressed data which have stored in the compression image memory 610 are read, and the attribute data relevant to the data are also read from the hard disk 614. Then, the recompressed data are decoded according to the attribute of the recompressed data to data which can be decoded further to image data by generalized block truncation.

Figure 34A:
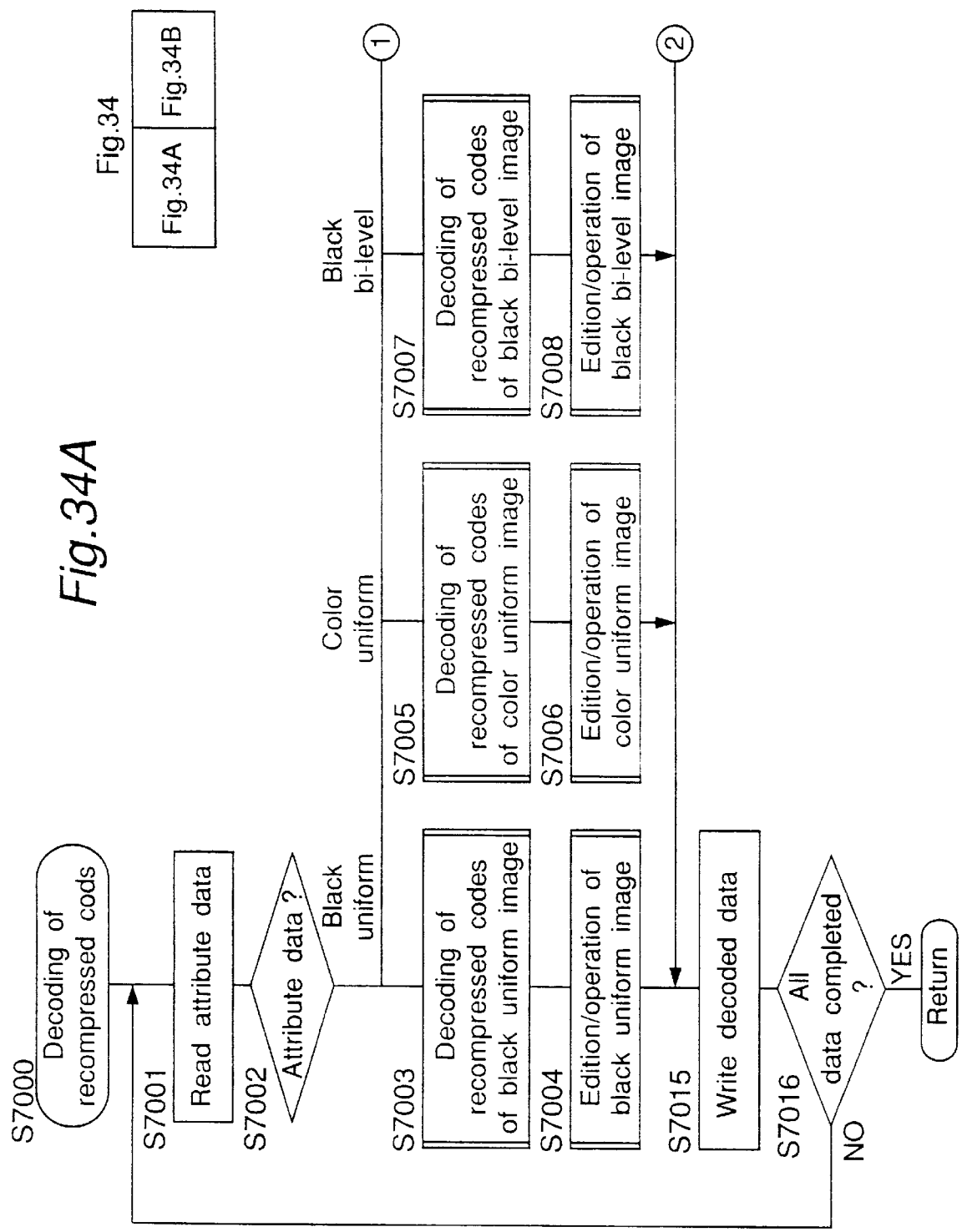
FIGS. 34A and 34B are flowcharts of decoding after recompression.
Figure 34B:
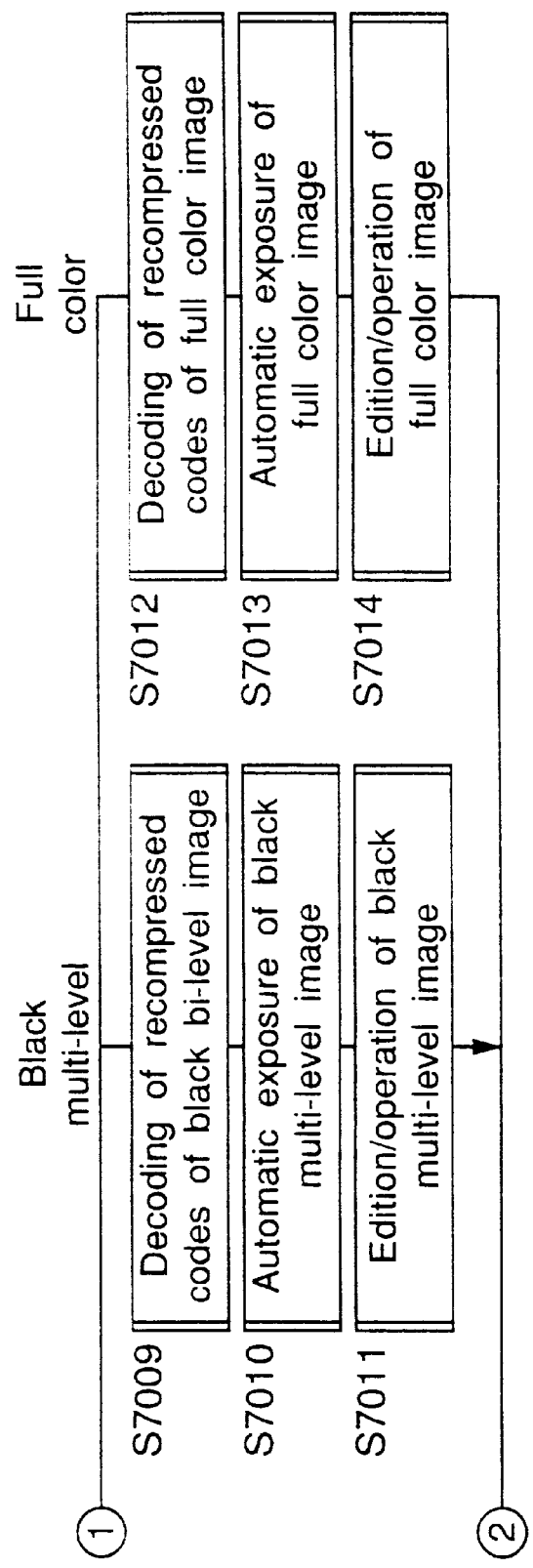

FIGS. 34A and 34B are flowcharts of the decoding on recompressed data (step S7000 in FIG. 11). First, attribute flags (uniform image flag f1, color/black image flag f2 and bi-level/multi-level image flag f3) of a 4*4 pixel block of interest are read from the hard disk 614 (step S7001). Then, an image among a black uniform image, a color uniform image, a black bi-level image, a black multi-level image or a full color image is specified according to the three attribute flags f1, f2 and f3, and the flow branches according to flags or the image type (step S7002).

If the data on the 4*4 pixel block is a black uniform image (f1=1 and f2=1), recompressed data of the black uniform image of the block are decided to coded data which can be decoded by generalized block truncation coding (step S7003). Then, edition/operation on the decoded data is performed according to an instruction by a user (step S7004). Then, the decoded data are stored in the compression image memory 610 (step S7016).

IF the data on the 4*4 pixel block is a color uniform image (f1=1 and f2=0), recompressed data of the color uniform image are decoded to coded data which can be decoded by generalized block truncation coding (step S7005). Then, edition/operation on the decoded data is performed according to an instruction by a user (step S7006). Then, the decoded data are stored in the compression image memory 610 (step S7016).

IF the data on the 4*4 pixel block is a black bi-level image (f1=0, f2=1 and f3=1), recompressed data of the black bi-level image of the block are decoded to coded data which can be decoded by generalized block truncation coding (step S7007). Then, edition/operation on the decoded data is performed according to an instruction by a user (step S7008). Then, the decoded data are stored in the compression image memory 610 (step S7016).

IF the data on the 4*4 pixel block is a black multi-level image (f1=0, f2=1 and f3=0), recompressed data of the black multi-level image of the block are decoded to coded data which can be decoded by generalized block truncation coding (step S7009). Then, automatic exposure processing is performed on the decoded data appropriate for a black multi-level image (step S7010), and edition/operation on the decoded data is performed according to an instruction by a user (step S7011). Then, the decoded data are stored in the compression image memory 610 (step S7016).

If the data on the 4*4 pixel block is a full color image (f1=0 and f2=0), data of the full color image stored in the compression image memory 610 are not recompressed (refer to FIG. 11), so that the compressed data are read from the compression image memory 610 (step S7012). Then, automatic exposure processing is performed on the data appropriate for a full color image (step S7103), and edition/operation on the data is performed according to an instruction by a user (step S7014). Then, the data are stored in the compression image memory 610 (step S7015).

The above-mentioned processing is repeated on all the blocks. When all the blocks are not yet processed (NO at step S7106), the flow returns to step S7001, otherwise the flow returns to the main flow.

Figure 35:
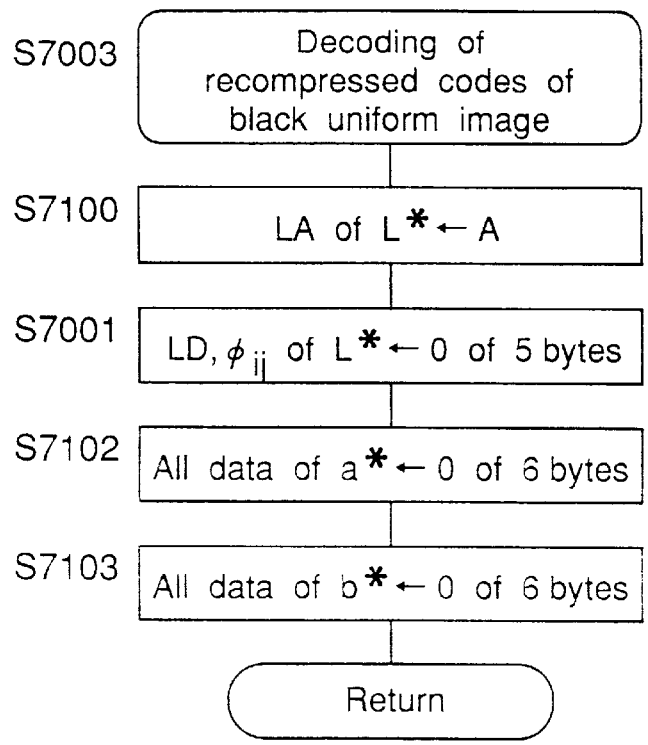
FIG. 35 is a flowchart of decoding from recompression of a black uniform image.

FIG. 35 is a flowchart of the decoding after the recompression of a black uniform image (step S7003 in FIG. 34A).

Figure 36:
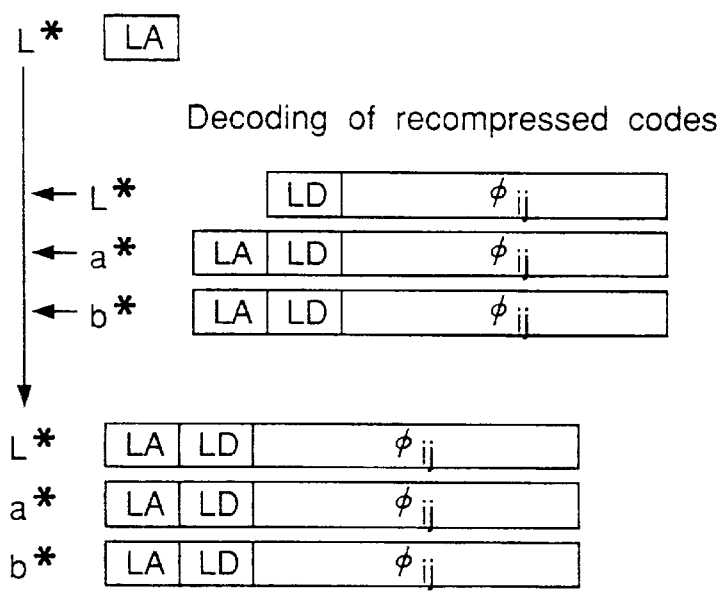
FIG. 36 is a diagram for illustrating recompression data (above) and decoded data (below) for a black uniform image.

As shown in an upper part in FIG. 36, decoded data for a black uniform image comprises only 1-bit (8-bit) data of average data LD of the lightness component L*. First, the recompressed data is read from the compression image memory 610 as data "A", and the data "A" is set as the average data LA of the lightness component L* (step S7100). On the other hand, the gradation width index LD and code data $\phi_{ij}$ of the lightness component L* of 5 bytes are all set as "0" (step S7100). Because a black uniform image is an achromatic image, the chromaticity components a* and b* are zero. Then, the average data LA, the gradation width indices LD and the code data $\phi_{ij}$ of the chromaticity components a* and b* of 6 bytes are all set to be zero (steps S7102 and 7103). A lower part in FIG. 36 shows code data obtained by the above-mentioned decoding. Code data in a central portion in FIG. 36 show data recovered in the decoding.

Figure 37:
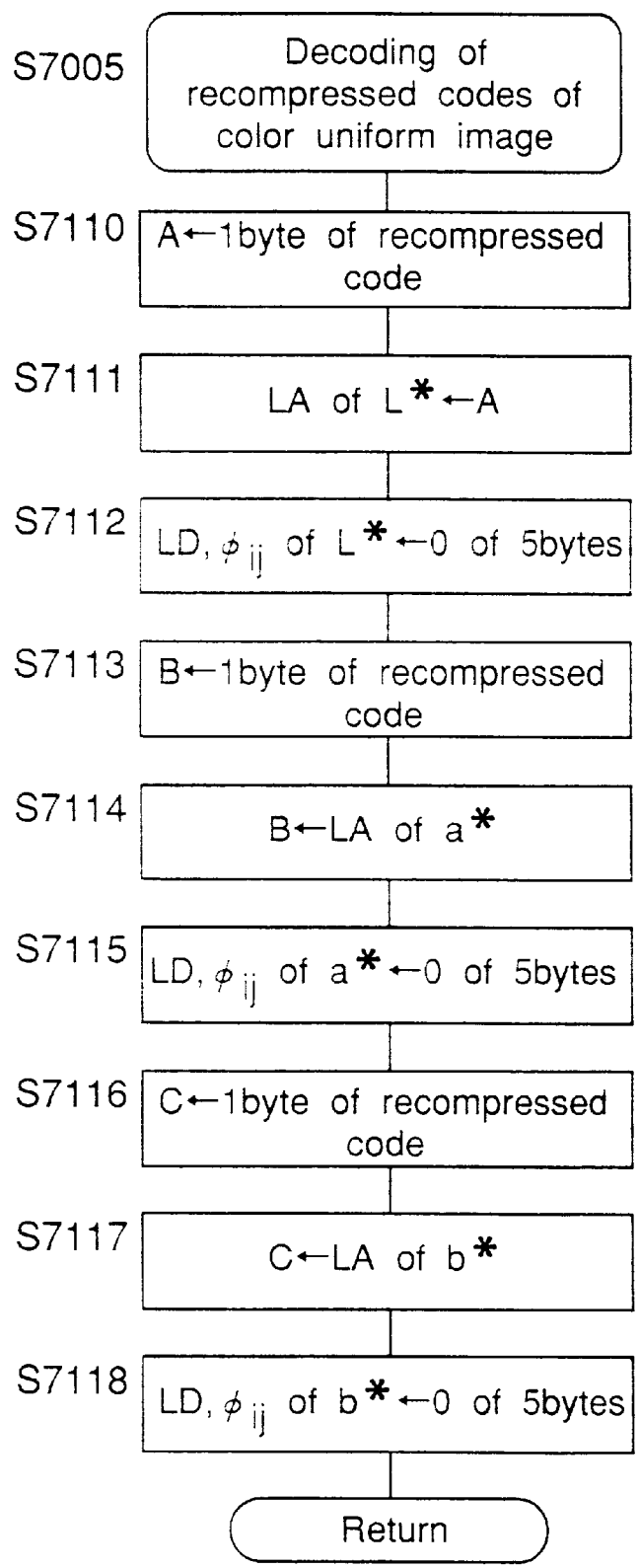
FIG. 37 is a flowchart of decoding from recompression of a color uniform image.
Figure 38:
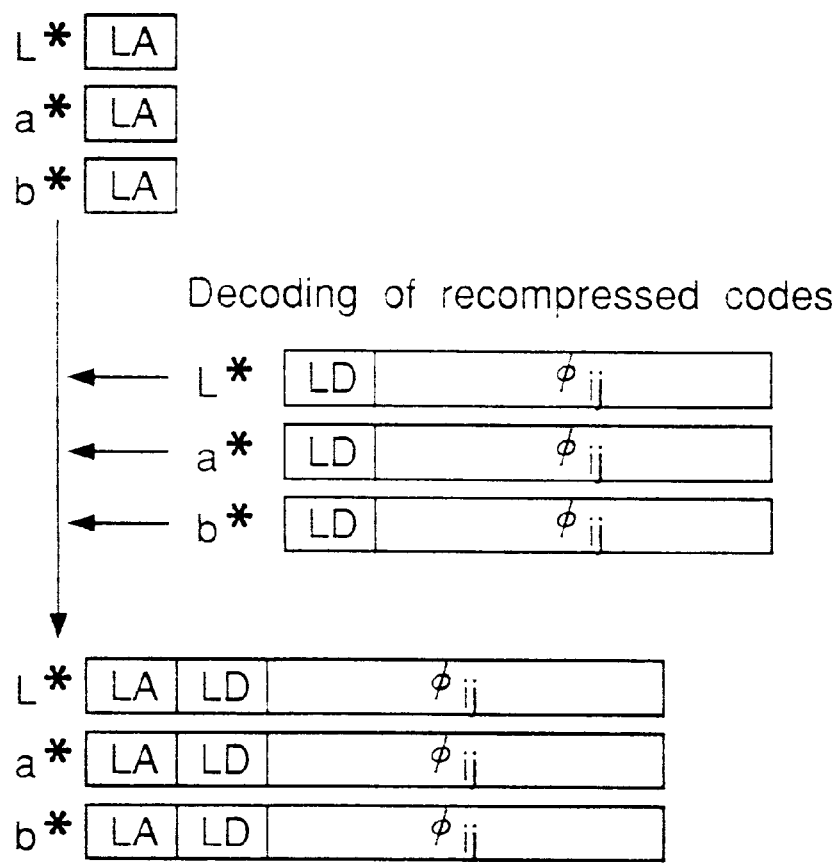
FIG. 38 is a diagram for illustrating recompression data (above) and decoded data (below) for a color uniform image.

FIG. 37 is a flowchart of the decoding after the recompression of a color uniform image (step S7005 in FIG. 34A). As shown in an upper part in FIG. 38, decoded data for a color uniform image comprises only three 1-bit (8-bit) data of average data LD of the lightness component L* and the chromaticity components a* and b* stored successively in the compression image memory 610. First, a top 1 byte of the recompressed data is read from the compression image memory 610 as data "A" (step S7110), and the data "A" is set as the average data LA of the lightness component L* (step S7111). On the other hand, the gradation width index LD and code data $\phi_{ij}$ of the lightness component L* of 5 bytes are all set as "0" (step S7112). Next, a successive 1 byte of the recompensed data is read from the compression image memory 610 as data "B" (step S7113), and the data "B" is set as the average data LA of the chromaticity component a* (step S7114). On the other hand, the gradation width index LD and code data $\phi_{ij}$ of the lightness component a* of 5 bytes are all set as "0" (step S7115). Similarly, a successive 1 byte of the recompressed data is read from the compression image memory 610 as data "C" (step S7116), and the data "C" is set as the average data LA of the chromaticity component b* (step S7117). On the other hand, the gradation width index LD and code data $\phi_{ij}$ of the lightness component b* of 5 bytes are all set as "0" (step S7118). A lower part in FIG. 38 shows code data obtained by the above-mentioned decoding. Code data in a central portion in FIG. 38 show data recovered in the decoding.

Figure 39:
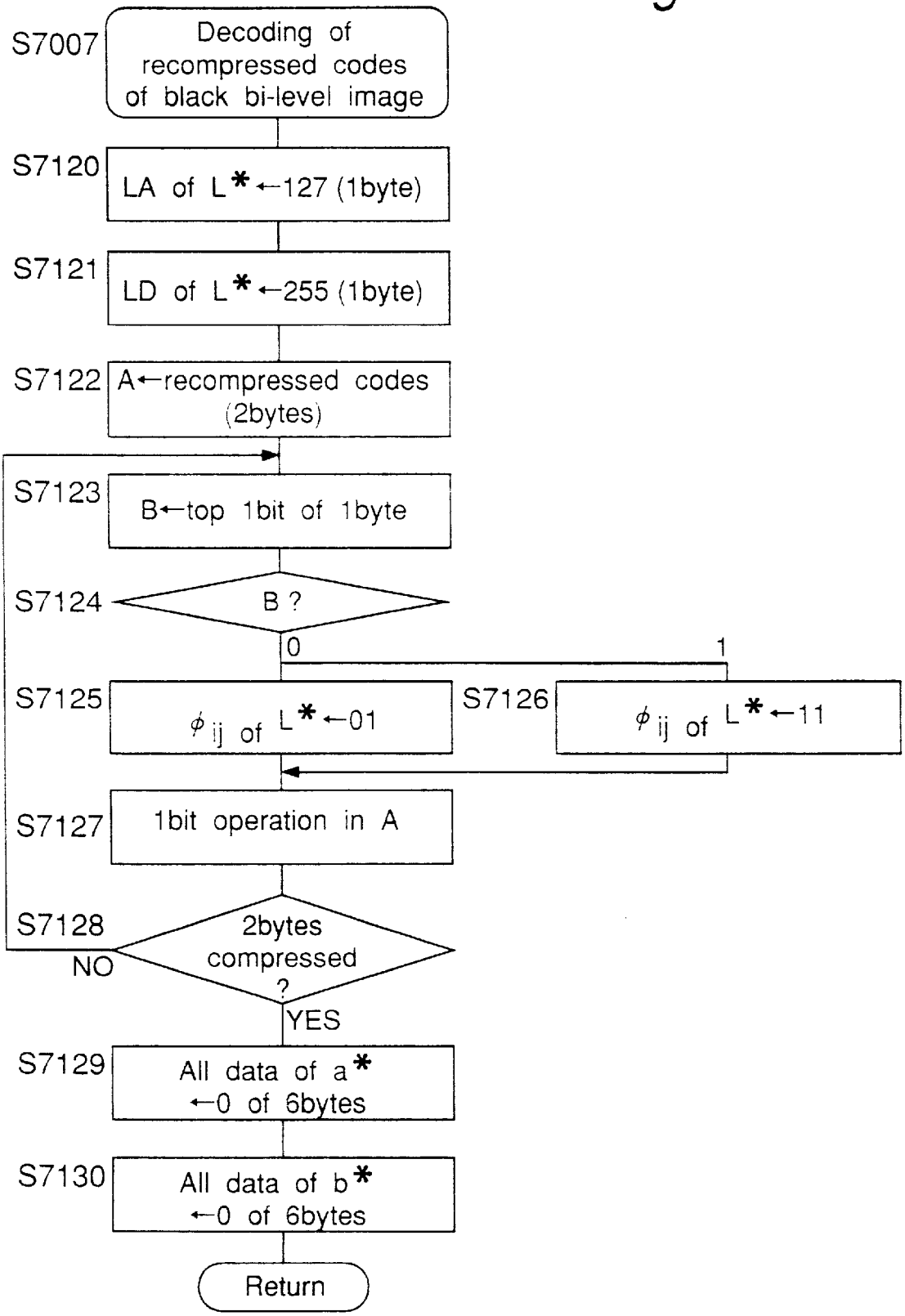
FIG. 39 is a flowchart of decoding form recompression of a black bi-level image.

FIG. 39 is a flowchart of the decoding after recompression of a color uniform image (step S7005 in FIG. 34A). A black bi-level image comprises achromatic pixel of lightness component L* of 255 or 0. Because it is an achromatic image, the chromaticity components a* and b* are zero. As shown in an upper part in FIG. 40, decoded data for a black bi-level image comprises 2-byte recompressed data $\phi'_{ij}$ of the lightness component L*, and each 1 bit shows that a pixel is white (L*=255) or black (L*=0).

Figure 40:
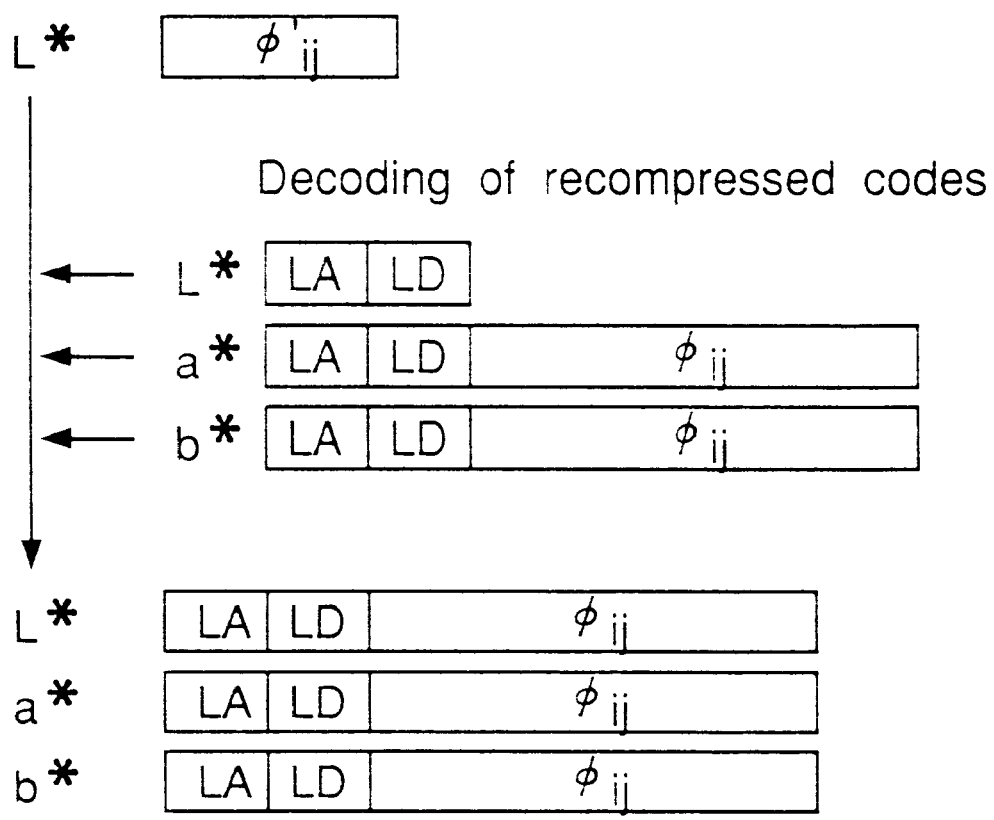
FIG. 40 is a diagram for illustrating recompression data (above) and decoded data (below) for a black bi-level image.

The decoding of the recompressed data is performed as follows: First, a 1-byte data of 127 is set as the average data LA of the lightness component L* (step S7120), and a 1-byte data of 255 is set as the gradation width index LD of the lightness component L* (step S7121). Then, 2-byte data of the recompressed data are rad from the compression image memory 610 as data "A" (step S71222). Then, a top 1-bit data is read from the data A as data "B" (step S7123), and the flow branches according to the data "B" (step S7124). If "B"=1, "01" is set in codes $\phi_{ij}$ of the lightness component L* (step S7125), while if "B"=0, "11" is set in codes $\phi_{ij}$ of the lightness component L* (step S7126). Then, the top 1-bit of the data "A" is shifted by one bit to the last, and the next top 1-bit data is shifted at the top (step S7127), and the flow returns to step S7123 to repeat the above-mentioned processes. If all 2-byte data are processed (YES at step S7128), the flow proceeds to step S7129. Because a black uniform image is an achromatic image, the chromaticity components a* and b* are zero. Then, the average data LA, the gradation width indices LD and the code data $\phi_{ij}$ of the chromaticity components a* and b* of 6 bytes are all set to be zero (steps S7129 and 7130). A lower part in FIG. 40 shows code data obtained by the above-mentioned decoding. Code data in a central portion in FIG. 40 show data recovered in the decoding.

Figure 41:
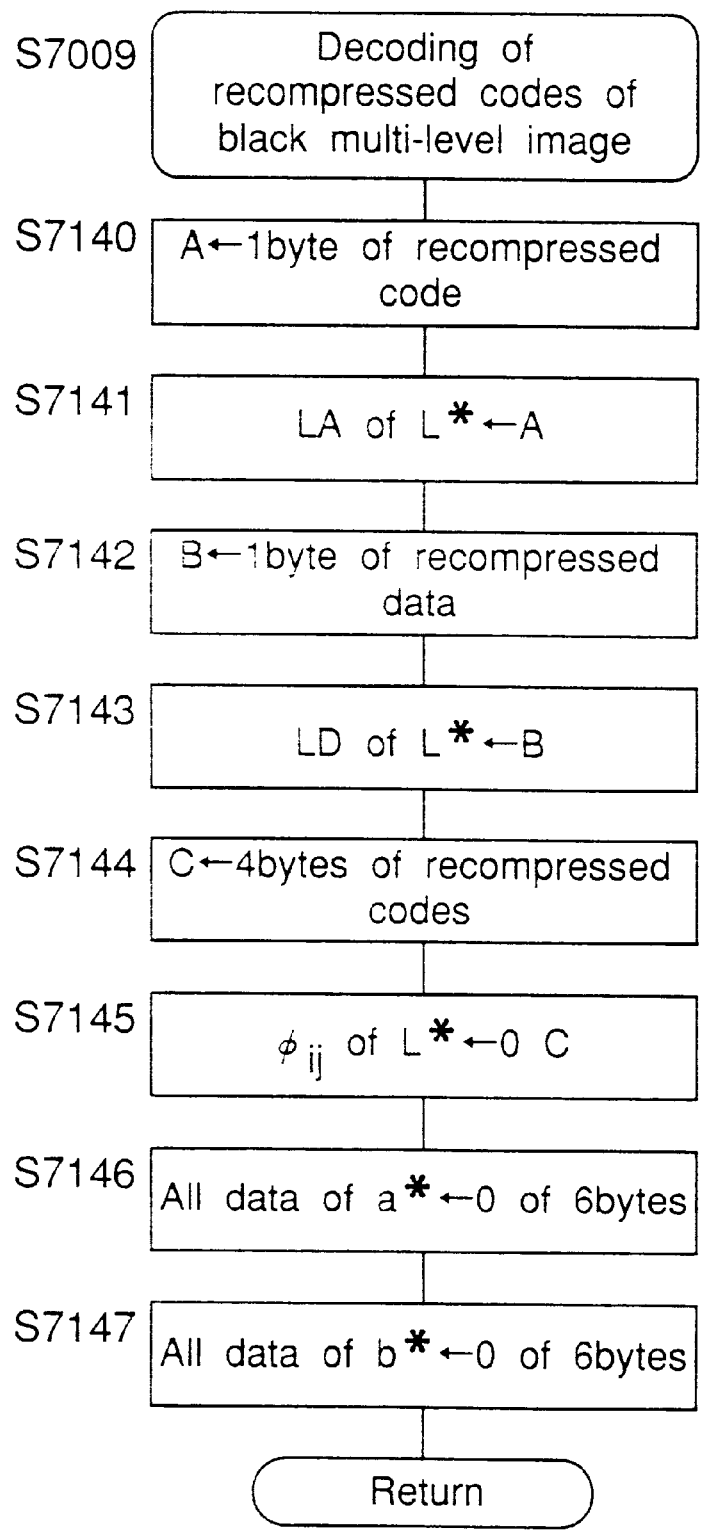
FIG. 41 is a flowchart of decoding from recompression of a black multi-level image.
Figure 42:
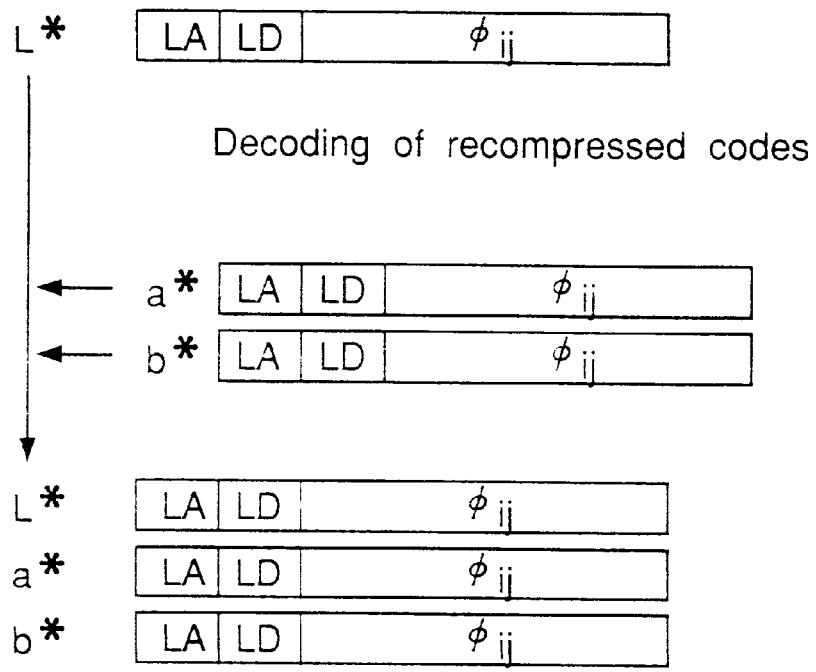
FIG. 42 is a diagram for illustrating recompression data (above) and decoded data (below) for a black multi-level image.

FIG. 41 is a flowchart of the decoding after the recompression of a black multi-level image (step S7009 in FIG. 34A). A black multi-level image comprises achromatic pixels. As shown in an upper part in FIG. 42, the decoded data for a black multi-level image comprises 6-byte data of the lightness component L* stored in the compression image memory 610. In detail, the decoded data include the average data LA (1 byte), the gradation width index LD (1 byte) and code data $\phi_{ij}$ (4 bytes). First, a top 1 byte of the recompressed data is read from the compression image memory 610 as data "A" (step S7140), and the data "A" is set as the average data LA of the lightness component L* (step S7141). Next, a next 1 byte of the recompressed data is read from the compression image memory 610 as data "B" (step S7142), and the data "B" is set as the gradation width index LD of the lightness component L* (step S7143). Next, remaining 4 byte of the recompressed data are read from the compression image memory 610 as data "C" (step S7144), and the data "C" are set as code data $\phi_{ij}$ of the lightness component L* (step S7145). Because a black uniform image is an achromatic image, the chromaticity components a* and b* are zero. Then, all data of the average data LA, the gradation width indices LD and the code data $\phi_{ij}$ of the chromaticity components a* and b* of 6 bytes are set to be zero (steps S7146 and S7147). A lower part in FIG. 42 shows code data obtained by the above-mentioned decoding. Code data in a central portion in FIG. 42 show data recovered in the decoding.

If data on a 4*4 pixel block is a full color image (f1=0 and f2=0), each as-received 6-byte data of the lightness component L* and the chromaticity components a* and b* has been stored in the compression image memory 610. Then, if decoding of recompressed data is performed (step S7012 in FIG. 34B), a set of 6 bytes of 1 byte, 1 byte and 4 bytes is read successively from the compression image memory 610. The first 1 byte data in the first set is set as average data LA of the lightness component L*, the second 1-byte data is set as gradation width index LD and the 4-byte data are set as code data $\phi_{ij}$. Further, the first 1 byte data in the second set is set as average data LA of the chromaticity component a*, the second 1-byte data is set as gradation width index LD and the 4-byte data are set as code data $\phi_{ij}$. Similarly, the first 1 byte data in the third set is set as average data LA of the chromaticity component b*, the second 1-byte data is set as gradation width index LD and the 4-byte data are set as code data $\phi_{ij}$.

AUTOMATIC EXPOSURE

Figure 43:
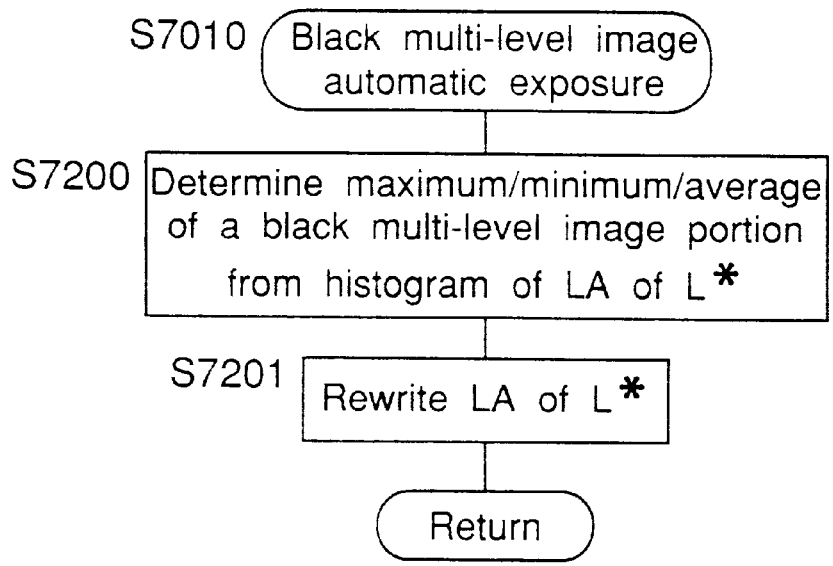
FIG. 43 is a flowchart of automatic exposure/color control for a black multi-level image.

FIG. 43 is a flowchart of the automatic exposure control for a black multi-level image (step S7010 in FIG. 34B). In this processing, the density distribution of an image is corrected suitably by converting the average data LA of the lightness component L* of each block to an appropriate value according to the histogram of the average data LA of all the pixel blocks in a black multi-level image. First, the histogram data of the average data LA of the lightness component L* are read from the hard disk 614, and a maximum Max, a minimum Min and an average Ave are determined from the histogram data (step S7200). The maximum Max is defined as a density value where the accumulated value becomes larger than 98% of the total of the frequencies when frequencies are accumulated from the high density side successively, while the minimum Min is defined as a density value where the accumulated value becomes larger than 2% of the total of the frequencies when frequencies are accumulated from the high density side. The definitions remove irregular data distribution. The average Ave is defined as a quotient of the total frequencies divided with the total density range. Next, the average data LA of the lightness component L* is rewritten (step S7201), as will be explained below in detail. The average data LA is rewritten by using a table shown in FIG. 44 for correcting the average data LA in a range between the minimum Min and the maximum Max to a range between 0 and 255. In concrete, the average data LA is converted to or rewritten as LA' obtained with Eq. (17).

$$LA'=255/(Max-Min)*(LA-Min). \tag{17}$$

Figure 45:
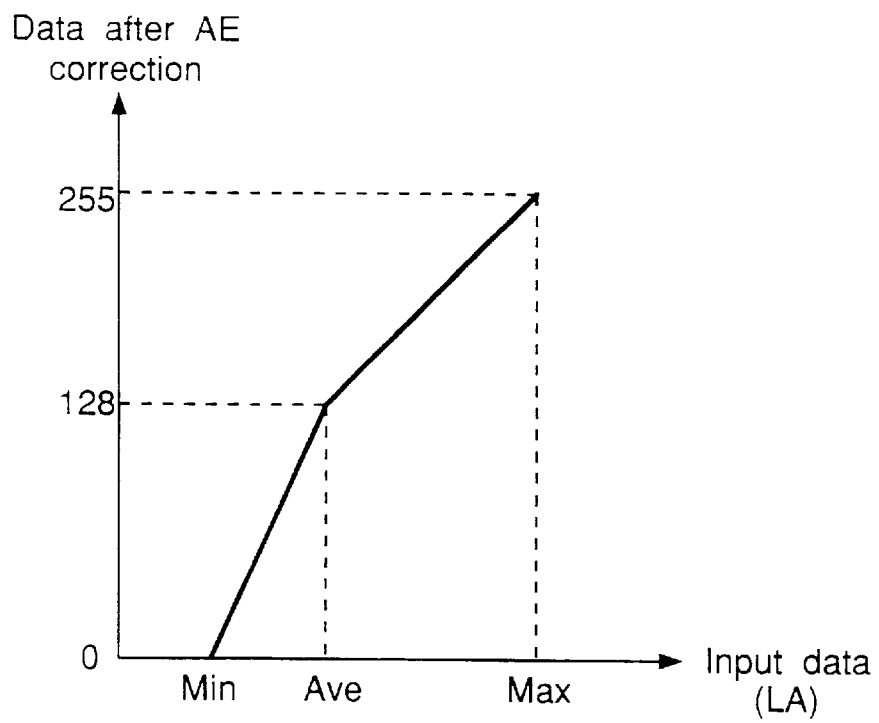
FIG. 45 is a diagram of a table for correcting the minimum Min, the average and the maximum Max to 0, 128 and 255.

Further, FIG. 45 shows a different table for correcting the minimum Min, the average and the maximum Max to 0, 128 and 255. That is, the average data LA is converted to or rewritten as LA" obtained with Eq. (18)

$$LA''=128*(Ave-Min)*(LA-Min), \tag{18}$$

wherein Min≦LA≦Ave, and $$LA''=128*(Max-Ave)*(LA-Ave)+128,$$

wherein Min≦La≦Ave.

Figure 44:
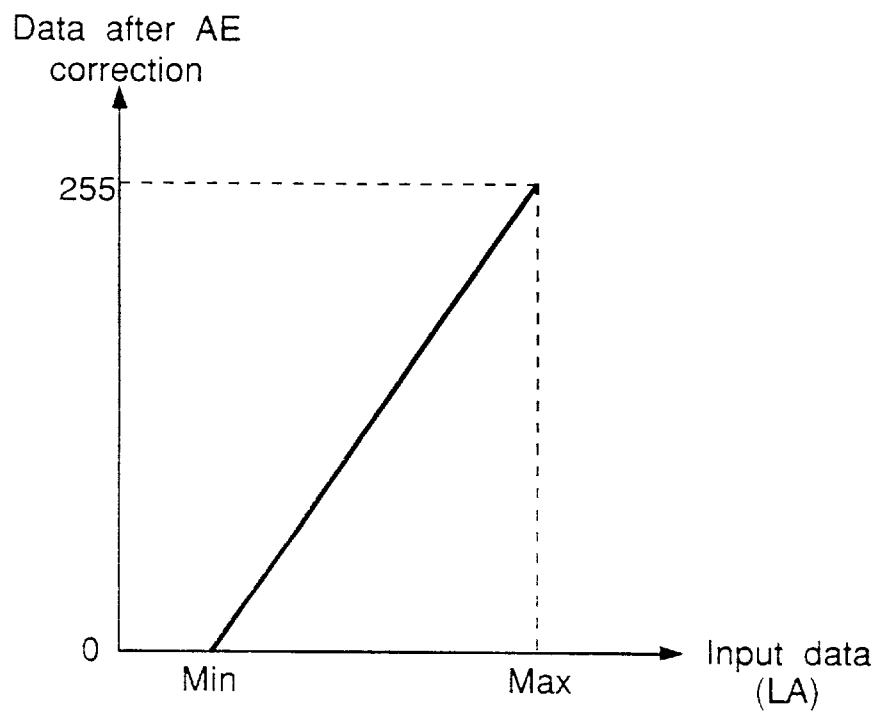
FIG. 44 is a diagram of a table for correcting the minimum Min and the maximum Max to 0 and 255.

This conversion based on FIG. 45 improves reproducibility in a half-tone range than that based on FIG. 44.

Figure 46A:
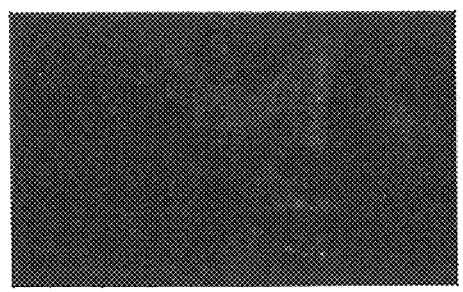
FIG. 46A is a diagram of a half-tone document image.
Figure 47A:
FIG. 47A is a diagram of the half-tone document image after automatic exposure.
Figure 46B:
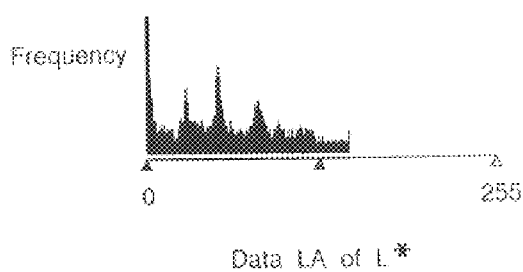
FIG. 46B is a histogram for an average information LA of lightness component L* of the image.
Figure 47B:
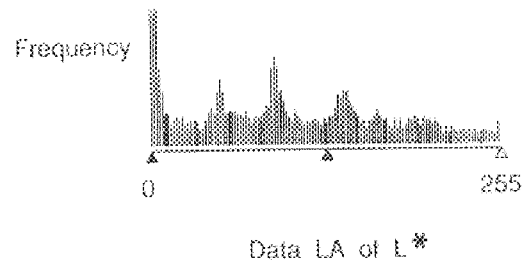
FIG. 47B is a histogram for an average information LA of lightness component L* of the image.

FIG. 46A shows a half-tone document image before the automatic exposure, and FIG. 46B is a histogram for an average data LA of lightness component L* of the image. The automatic exposure corrects a tendency of the original image having a image density distribution at lower densities shown in FIG. 46B. On the other hand, FIG. 47A shows the half-tone document image subjected to the automatic exposure, and FIG. 47B is a histogram for an average information LA of lightness component L* of the image. If FIG. 46A is compared with FIG. 47A, it will be understood that biasing to the low density side in the original image is corrected.

Figure 48:
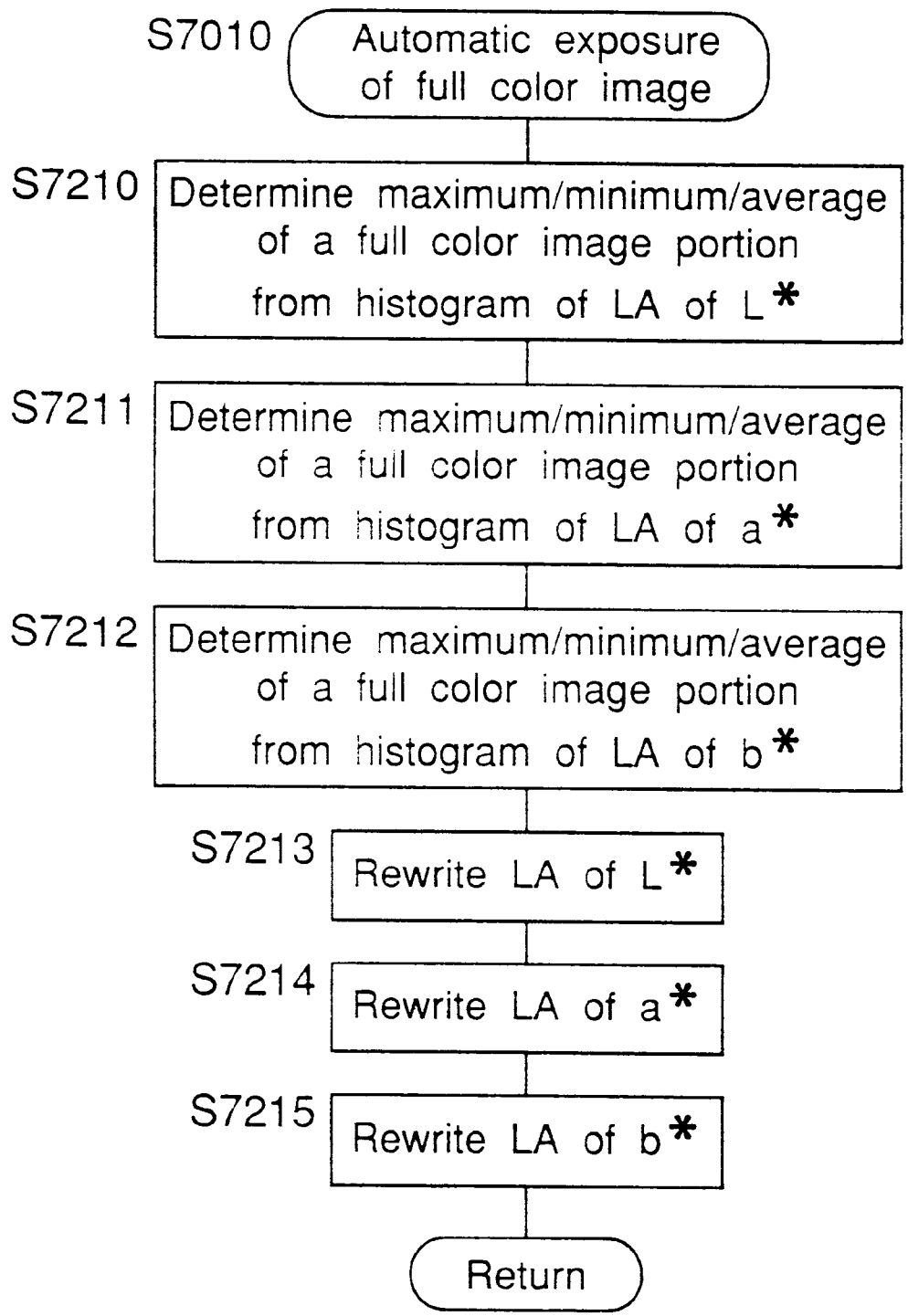
FIG. 48 is a flowchart of automatic exposure/color control for a full color image.

FIG. 48 is a flowchart of automatic exposure/color control for a full color image (step S7013 in FIG. 34B). In this processing, the density distribution of a full color image is connected suitably by converting the average data LA of the lightness component L* and the chromaticity components a* and b* of each block to appropriate values according to the histograms of the average data LA of all the pixel blocks in the full color image. First, the histogram data of the average data LA of the lightness component L* are read from the hard disk 614, and a maximum Max, a minimum Min and an average Ave are determined from the histogram data (step S7210). Next, the histogram data of the average data LA of the chromaticity component a* are read from the hard disk 614, and a maximum Max, a minimum Min and an average Ave are determined from the histogram data (step S7211). Similarly, the histogram data of the gradation density data LD of the chromaticity component b* are read from the hard disk 614, and a maximum Max, a minimum Min and an average Ave are determined from the histogram data (step S7212). Then, the average data LA of the lightness component L* is rewritten by using a table shown in FIG. 45 or 46 (step S7213). Similarly, the average data LA of the chromaticity components a* and b* are also rewritten by using a table shown in FIG. 45 or 46 (steps S7214 and S7215).

EDITION/OPERATION

FIGS. 49–53 show the edition/operation (steps S7004, S7006, S7008, S7011 and S7014) on image attribute wherein the average data LA, gradation width index LD and code data $\phi_{ij}$ in each block are changed. The edition/operation is instructed by a user with a key-input (step S2000 in FIG. 9) and is performed if one or more mode flags are set to be "1".

First, black color change is explained. This is performed to convert a full color image to a black image. This conversion is realized by changing the chromaticity components a* and b* to zero. However, in generalized block truncation coding, it can be realized only by changing the average data LA and the gradation width indices of the chromaticity components a* and b* to zero. Therefore, only a block which is decided to be a full color image is converted to a black image without losing color information on the other blocks. Further, because not image data, but coded data are used in this conversion, an amount necessary for the conversion can be reduced to a large extent if compared with a case using 256-gradation image data.

Next, color change for a black bi-level image and a full color image is explained. Color change for a black bi-level image means conversion of black characters and white background to predetermined lightness and chromaticities. This can be realized by changing the average data LA and the gradation width index LD of the lightness component L* and the chromaticity components a* and b*. Thus, only a block which is decided to be a black bi-level image is converted to a color image without losing color information on the other blocks. Color change for a full color image is performed similarly.

Next, erase of image is explained. In this processing, the average data LA and the gradation width index LD of the lightness component L* and the chromaticity components a* and b* of a selected block are all changed to zero for conversion to white. Further, trimming is also possible by converting data of blocks on attributes except selected attributes to data of white.

Next, dpi (dots per inch) conversion of image for a black multi-level image and a full color image is explained. In this processing, code data $\phi_{ij}$ of 4*4 pixels are thinned out to data of 2*2 pixels or 1*1 pixel. Then, the image resolution is decreased, and an amount of data to be processed becomes smaller.

Next, negative/positive reversal for a black multi-level image and a full color image is explained. In this processing, the lightness component L* of a 4*4 block is converted to 256−L*. Further, signs of the chromaticity components a* and b* are inverted. Thus, a positive image of a multi-level image is converted to a negative image, and vise versa.

Finally, underground deletion for a black or color uniform image is explained. The ground level is changed by rewriting the average information LA of the lightness component L* of a block. The histogram data obtained above (steps S6090 and S6100) on the lightness component L* are used.

Figure 49:
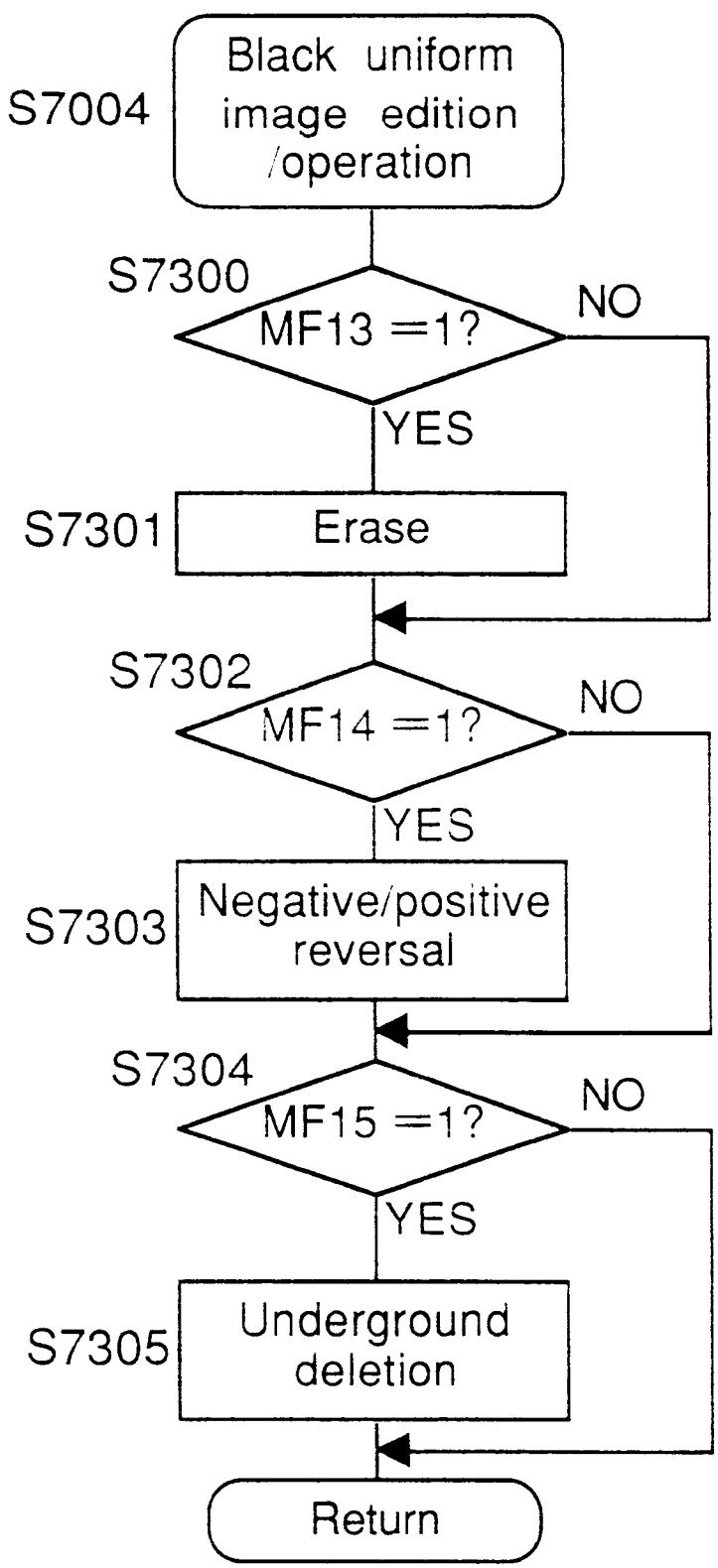
FIG. 49 is a flowchart of edition/operation for a black uniform image.

FIG. 49 is a flowchart of the edition/processing for a black uniform image (step S7004 in FIG. 34A). If mode flag MF13 is decided to be "1" (YES at step S7300), the erase processing is performed (step S7301). If mode flag MF14 is decided to be "1" (YES at step S7302), the negative/positive reversal is performed (step S7303). Finally, if mode flag MF15 is decided to be "1" (YES at step S7304), the underground deletion is performed (step S7305).

Figure 50:
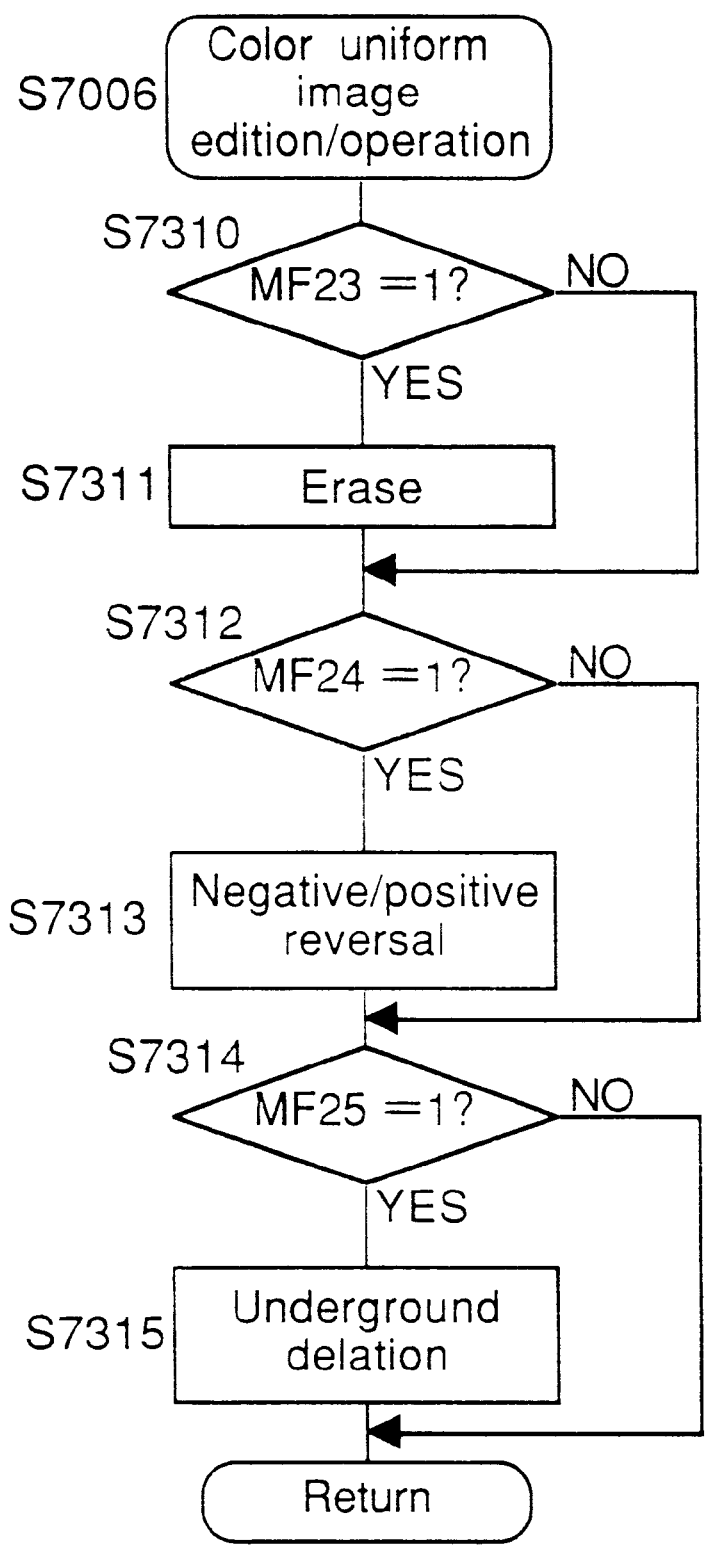
FIG. 50 is a flowchart of edition/operation for a color uniform image.

FIG. 50 is a flowchart of the edition/processing for a color uniform image (step S7006 in FIG. 34A). If mode flag MF23 is decided to be "1" (YES at step S7310), the erase processing is performed (step S7311). If mode flag MF24 is decided to be "1" (YES at step S7312), the negative/positive reversal is performed (step S7313). Finally, if mode flag MF25 is decided to be "1" (YES at step S7314), the underground deletion is performed (step S7315).

Figure 51:
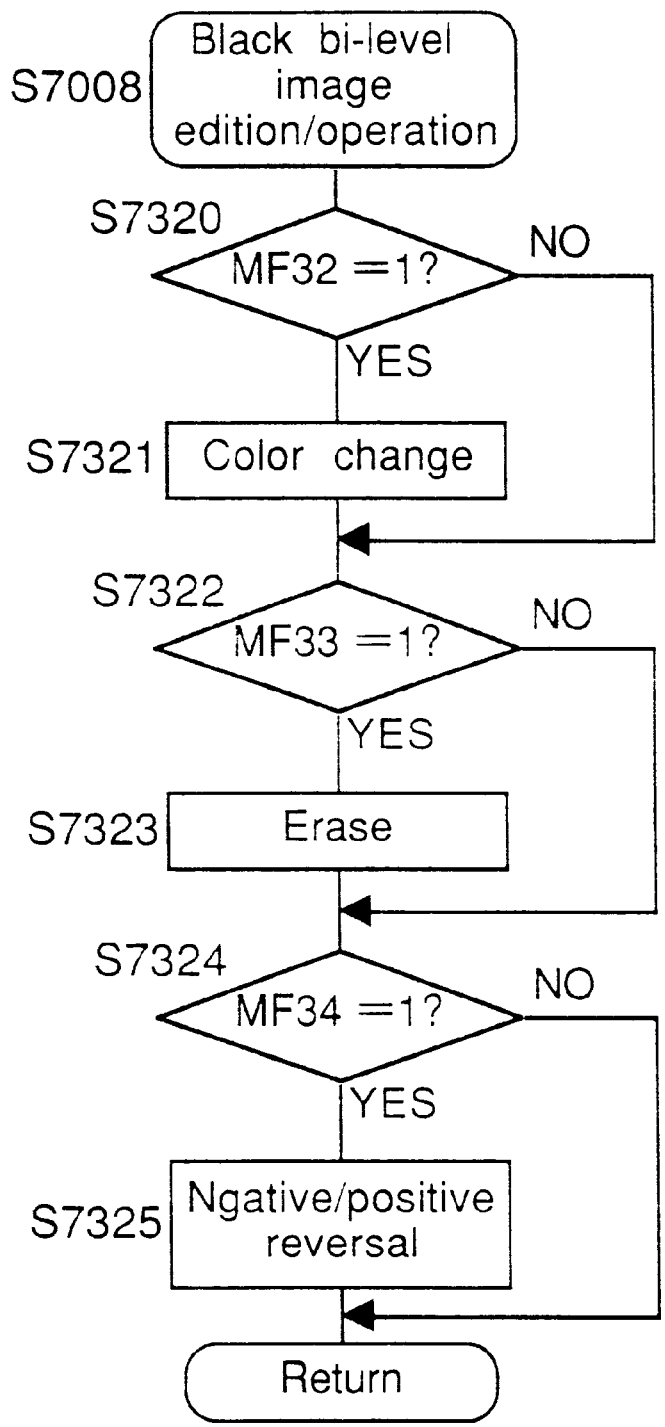
FIG. 51 is a flowchart of edition/operation for a black bi-level image.

FIG. 51 is a flowchart of the edition/processing for a black bi-level image (step S7008 in FIG. 34A). If mode flag MF32 is decided to be "1" (YES at step S7320), the color change is performed (step S7321). If mode flag MF33 is decided to be "1" (YES at step S7322), the erase processing is performed (step S7323). Finally, if mode flag MF34 is decided to be "1" (YES at step S7324), the negative/positive reversal is performed (step S7325).

Figure 52:
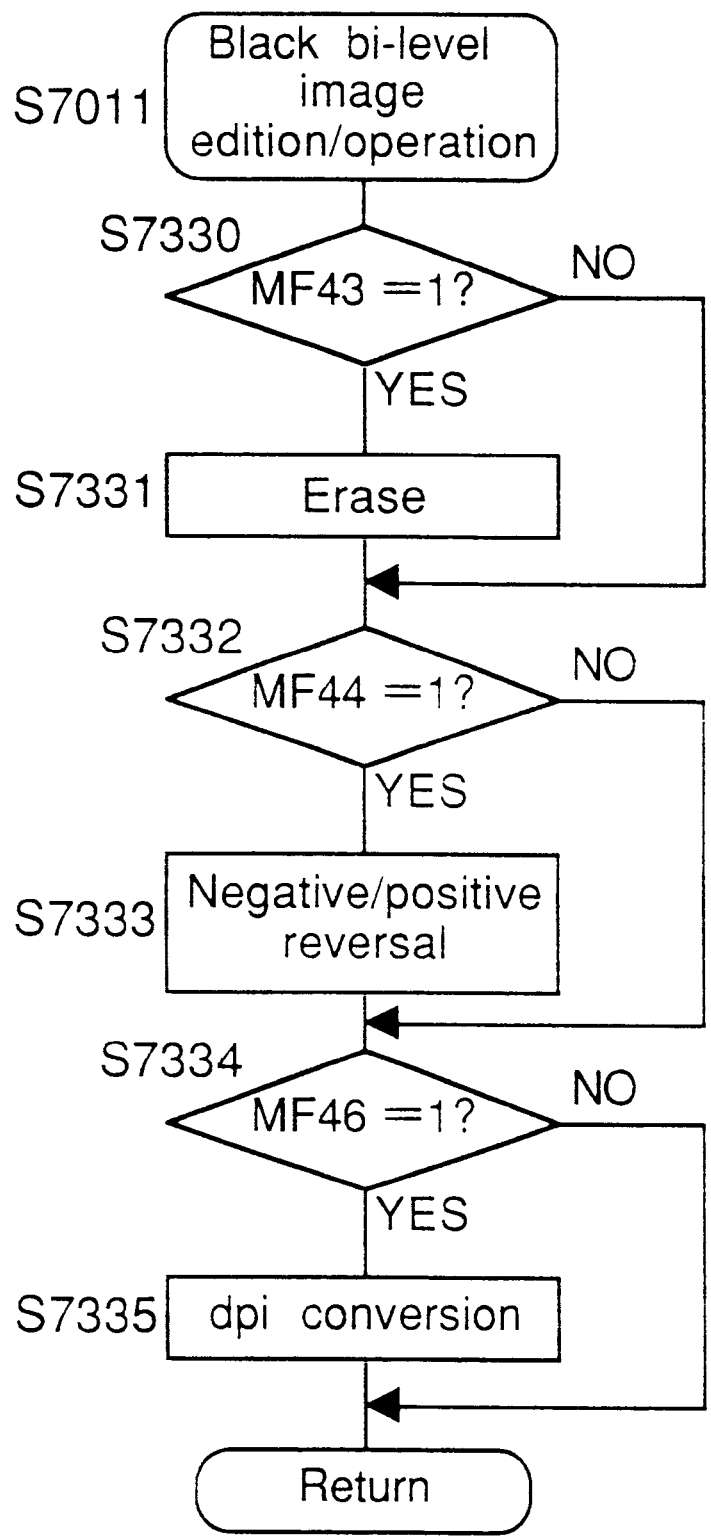
FIG. 52 is a flowchart of edition/operation for a black multi-level image.

FIG. 52 is a flowchart of the edition/processing for a black multi-level image (step S7011 in FIG. 34B). If mode flag MF43 is decided to be "1" (YES at step S7330), the erase processing is performed (step S7331). If mode flag MF44 is decided to be "1" (YES at step S7332), the negative/positive reversal is performed (step S7333). Finally, if mode flag MF46 is decided to be "1" (YES at step S7334), the dpi conversion is performed (step S7335).

Figure 53:
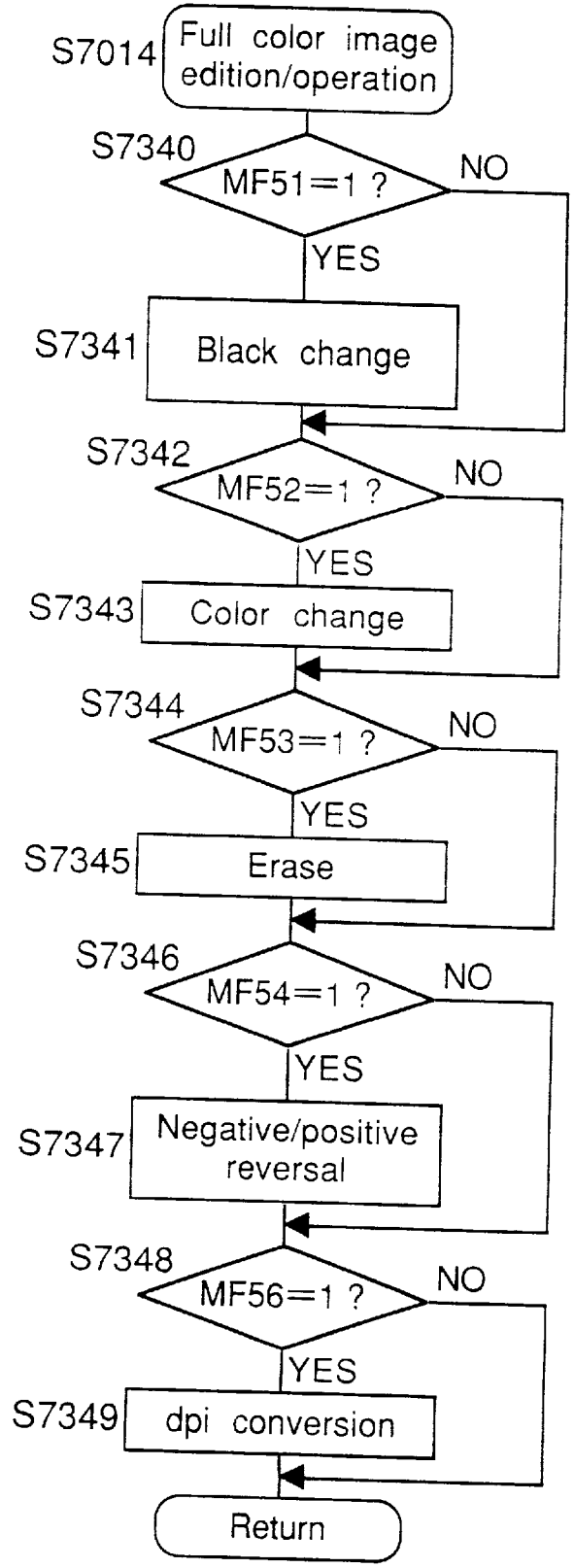
FIG. 53 is a flowchart of edition/operation for a full color image.

FIG. 53 is a flowchart of the edition/processing for a full color image (step S7014 in FIG. 34B). If mode flag MF51 is decided to be "1" (YES at step S7340), the black color change is performed (step S7341). If mode flag MF52 is decided to be "1" (YES at step S7342), the color change is performed (step S7343). If mode flag MF53 is decided to be "1" (YES at step S7344), the erase processing is performed (step S7345). If mode flag MF54 is decided to be "1" (YES at step S7346), the negative/positive reversal is performed (step S7347). Finally, if mode flag MF56 is decided to be "1" (YES at step S7348), the dpi conversion is performed (step S7349).

MODIFIED EXAMPLE OF STORAGE OF ATTRIBUTE DATA

Next, a modified example on the attribute write is explained. In the above-mentioned embodiment, after image type of image data of a block is decided, attributes on the block are written in the memory at step S6024, S6025, S6030, S6031 or S6032. In this modified example, attributes of an image for each block are converted to 1-bit attribute data α and β, and they are written to areas of lowest bits of the average data LA and the gradation width index LD of the lightness component L* and the chromaticity components a* and b*. This attribute write does not affect the 8-bit decoded data. In this example, the attributes of a black uniform image and a color uniform image are processed in the same way, and four types of attribute write are explained below.

Figure 54:
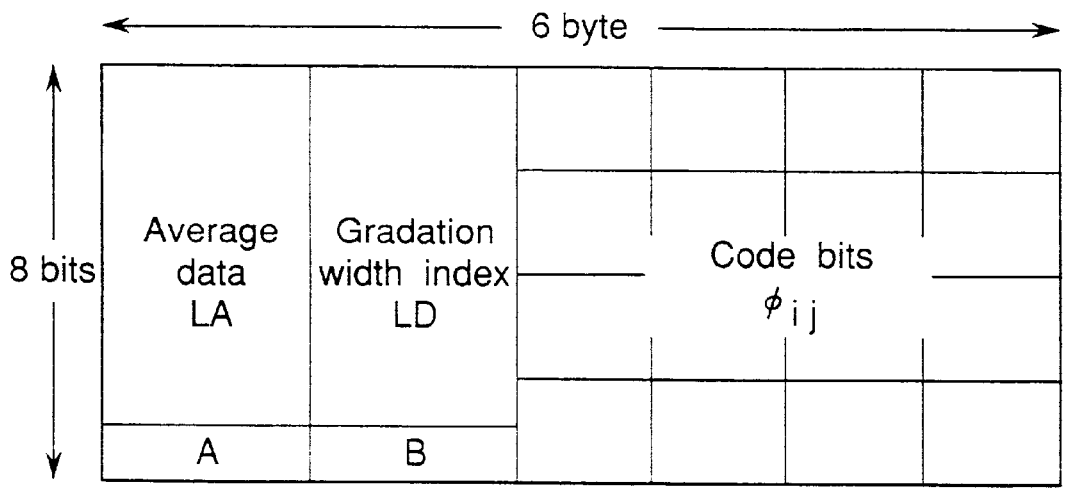
FIG. 54 is a diagram for illustrating a concept of writing attribute data.

FIG. 54 illustrates a concept of writing the attribute data in the example. The data coded by generalized block truncation coding comprise an average data LA, an gradation width index LD and coded data $\phi_{ij}$ of one of the lightness component L* and the chromaticity components a* and b*. The gradation width index LD is divided with 2 or 6 in coding and decoding. Therefore, the lowest bit thereof does not affect decoded data. Further, the average data LA is not subjected to division on decoding, but the lowest bit thereof does not affect the reproduction of the image practically.

Then, the 1-bit attribute data α and β are written to bit areas A and B of lowest bits of the average data LA and the gradation width index LD. The attribute data α and β are assigned as shown in Table 4.

TABLE 4

| Attribute data of 4*4 pixel block | | |
|---|---|---|
| | Attribute data | |
| | α | β |
| Black bi-level image | 0 | 0 |
| Black multi-level image | 0 | 1 |
| Uniform image | 1 | 0 |
| Full color image | 1 | 1 |

Figure 55:
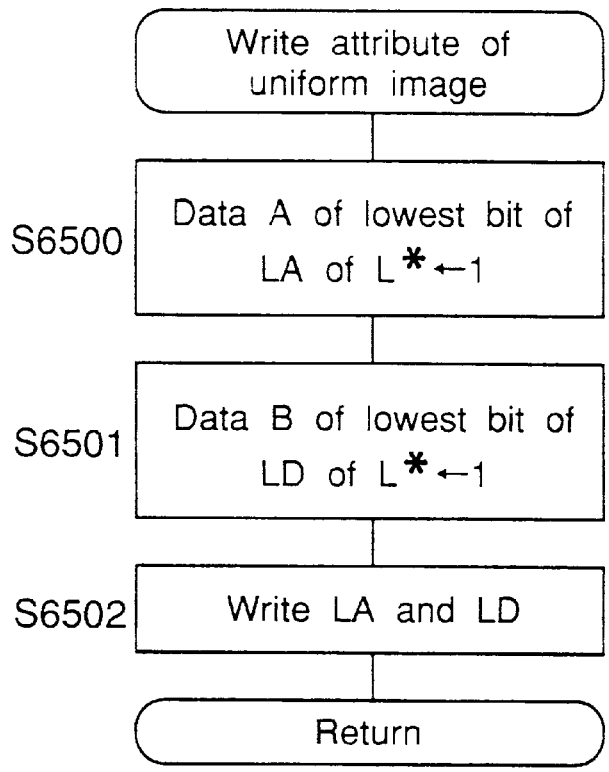
FIG. 55 is a flowchart of writing attribute of uniform image.

FIG. 55 is a flowchart of writing attribute of uniform image (in correspondence to steps S6024 and S6025). As shown in Table 4, the attribute data α and β are 1 and 0 for a uniform image. First, the lowest bit at the bit area A of the average data LA of the lightness component L* is changed to 1 (step S6500), and the lowest bit at the bit area B of the gradation width index LD of the lightness component L* is changed to 1 (step S6501). Then, the average data LA and the gradation width index LD of the lightness component L* including the data α and β are written to the compression image memory 610 (step S6502).

Figure 56:
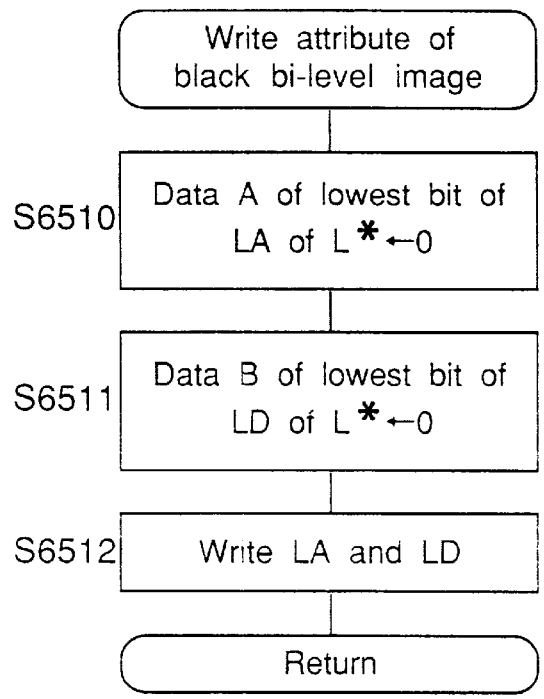
FIG. 56 is a flowchart of writing attribute of black bi-level image.

FIG. 56 is a flowchart of writing attribute of black bi-level image (in correspondence to step S6030 in FIG. 12). As shown in Table 4, the attribute data α and β are both 1 for a black bi-level image. First, the lowest bit at the bit area A of the average data LA of the lightness component L* is changed to 1 (step S6510), and the lowest bit at the bit area B of the gradation width index LD of the lightness component L* is changed to 1 (step S6511). Then, the average data LA and the gradation width index LD of the lightness component L* including the data α and β are written to the compression image memory 610 (step S6512).

Figure 57:
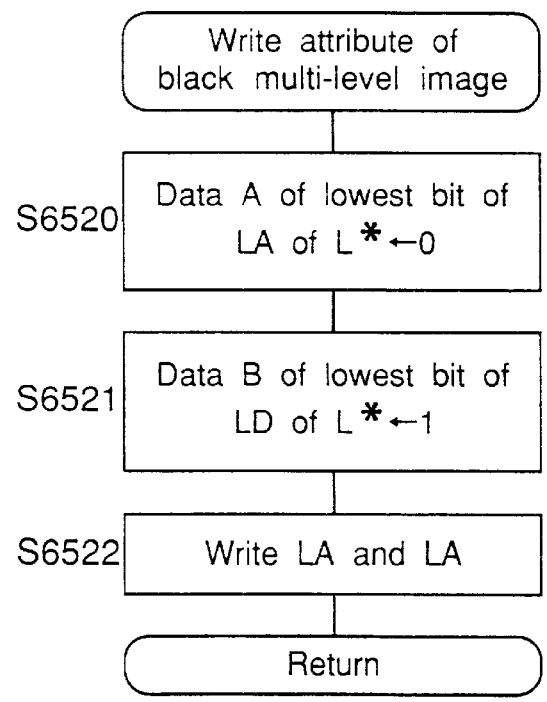
FIG. 57 is a flowchart of writing attribute of black multi-level image.

FIG. 57 is a flowchart of writing attribute of black multi-level image (in correspondence to step S6031 in FIG. 12). As shown in Table 4, the attribute data α and β are 0 and 1 for a black multi-level image. First, the lowest bit at the bit area A of the average data LA of the lightness component L* is changed to 0 (step S6530), and the lowest bit at the bit area B of the gradation width index LD of the lightness component L* is changed to 1 (step S6531). Then, the average data LA and the gradation width index LD of the lightness component L* including the data α and β are written to the compression image memory 610 (step S6532).

Figure 58:
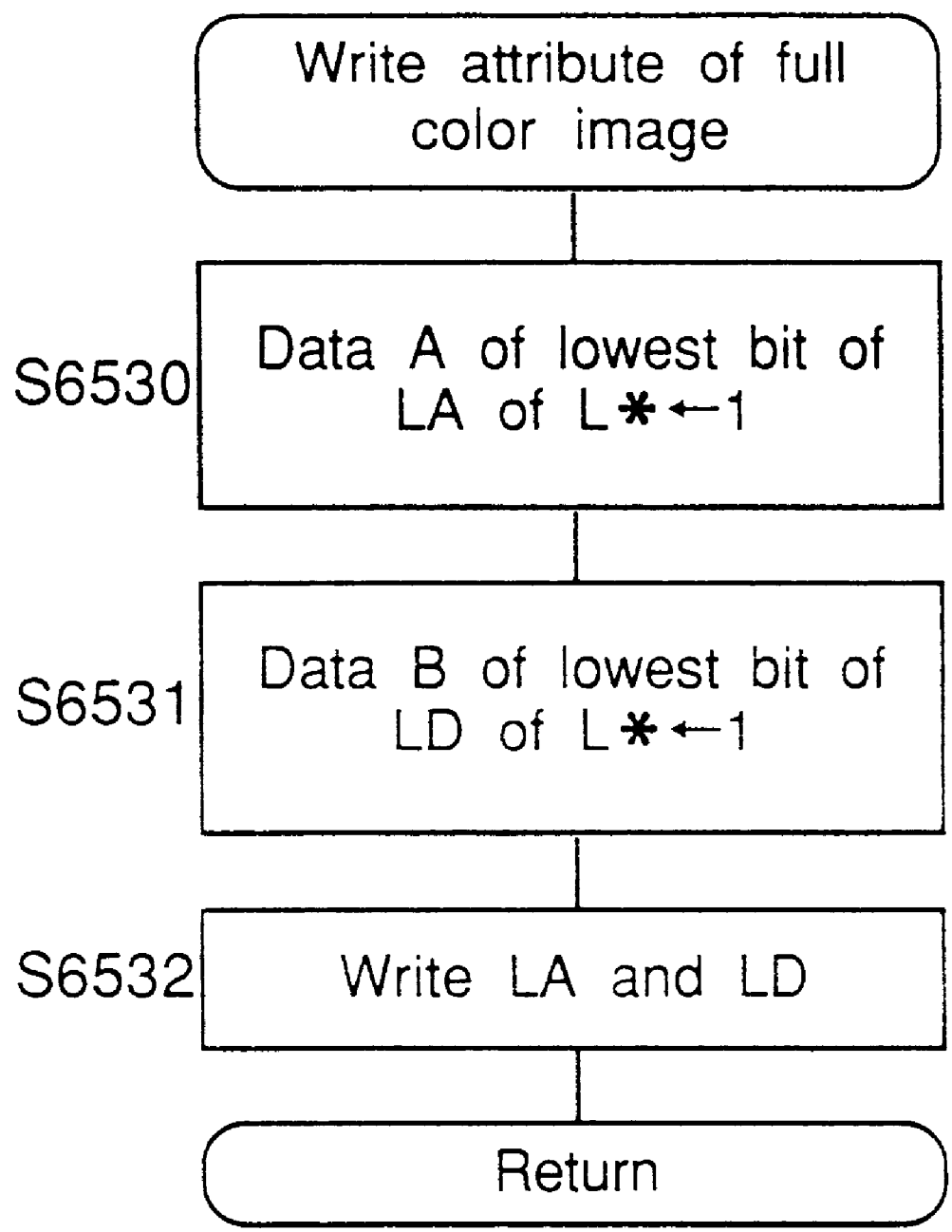
FIG. 58 is a flowchart of writing attribute of full color image.

FIG. 58 is a flowchart of writing attribute of full color image (in correspondence to step S6032 in FIG. 12). As shown in Table 4, the attribute data α and β are both 1 for a full color image. First, the lowest bit at the bit area A of the average data LA of the lightness component L* is changed to 1 (step S6530), and the lowest bit at the bit area B of the gradation width index LD of the lightness component L* is changed to 1 (step S6531). Then, the average data LA and the gradation width index LD of the lightness component L* including the data α and β are written to the compression image memory 610 (step S6532).

In the above-mentioned example, attribute data α and β are written to the average data LA and the gradation width index LD of the lightness component L*. However, they may be written to different positions in the data of generalized block truncation coding. For example, the average data LA and the gradation width index LD of the chromaticity component a* or b*. Then, the average data LA which are not subjected to division in decoding is not changed. Further, if the precision of the image data obtained by decoding is not required to be high, they may be written to lower two bits or the like of the average data LA or the gradation width index LD. Further, in a modified example where attributes of more than five are decided, three or more bits may be used to store the attribute data. For example, the lowest bits of three data or lower three bits or more of a data may be used for storing the image data.

Figure 59:
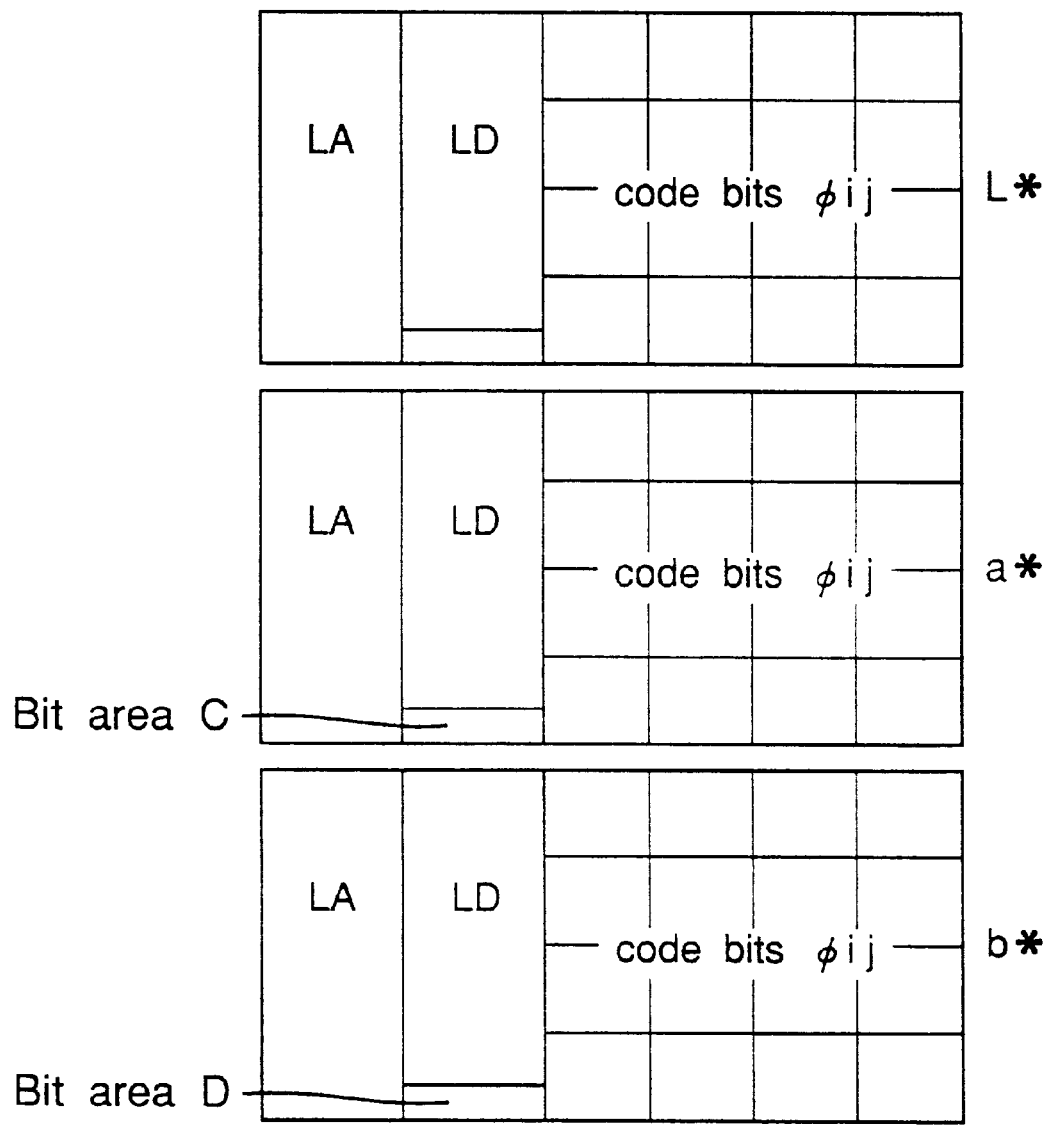
FIG. 59 is another diagram for illustrating a modified concept of writing attribute data.

FIG. 59 shows a different example of writing attribute data of the lightness component L* and the chromaticity component a* and b*. The attribute data α and β are assigned as shown in Table 4. In this example, the average data LA is not changed, while the lowest bits of the gradation width indices LD of the three components are used for writing attribute data α and β. For example, the attribute data α is written to the lowest bit of the chromaticity component a*, and the other attribute data β is written to the lowest bit of the chromaticity component b*.

For example, for a uniform image, the attribute data α and β are 1 and 0 for a uniform image, as shown in Table 4. Then, the lowest bit at the bit area C of the gradation width incex LD of the chromaticity component a* is changed to 1, and the lowest bit at the bit area D of the gradation width index LD of the other chromaticity component b* is changed to 0. Then, the gradation width indices LD of the chromaticity components a* and b* including the attribute data α and β are written to the compression image memory 610.

As explained above, attribute data α and β are written in coded data at positions which do not affect decoding. Therefore, it is not needed to provide a storage means for storing the attribute data beside the compression image memory.

Though the attribute data α and β are written in the coded data obtained by generalized block truncation coding in this embodiment, it is to be noted that if the recompression shown in the first embodiment (FIG. 11) is possible, the recompression may be adopted instead of the writing the attribute data in the coded data to reduce an amount of storage data.

DISCRIMINATION OF CHARACTER IMAGE AND RECOMPRESSION

In another embodiment of the copying machine of the invention, a character image in a document image is discriminated. A block in an image is discriminated to be in a character area if the gradation width index LD of the lightness component L* obtained with generalized block truncation coding is larger than a predetermined threshold value. However, when the coded data obtained with generalized block truncation coding are used for the discrimination, a change in gradation at an edge portion of a character may become smaller due to a decrease in read resolution of image data, aberration of a lens and the like, a blur of color around an edge portion of a character image or the like. In such a case, the discrimination of a character image on the block is liable to be erroneous, and a discriminated character area becomes narrower. In this embodiment, before a block is discriminated if it belongs to a character area, a maximum of gradation width index LD is detected in a range of 5*5 blocks including the block of interest, and the maximum is set at the gradation width index LD of the block. Thus, an area including an actual character area can be detected more correctly. Though a range of blocks of 5*5 matrix is used for the maximum detection, the range of blocks can be changed according to the gradation width index LD of the block of interest. The detection of the maximum may be omitted for certain values of the gradation width index LD.

Figure 60:
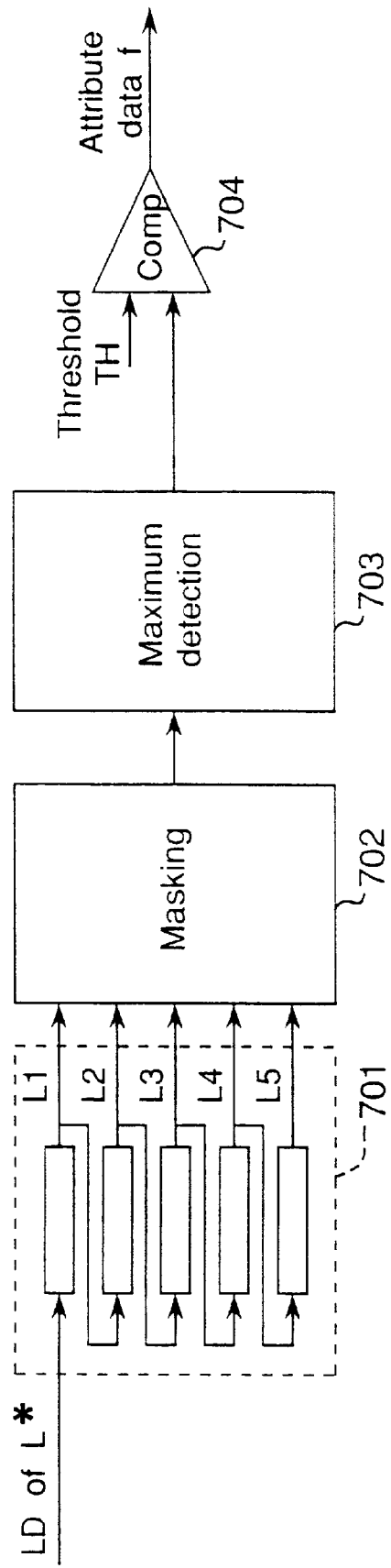
FIG. 60 is a block diagram of maximum detection.

FIG. 60 is a block diagram of an attribute detection circuit in the coding/decoding section of the read signal processor 106. A line buffer array 701 comprises five line buffers connected in series, and the first line buffer in the line buffer array 701 receives gradation width index LD of the lightness component L* of five blocks successively. because the line buffers 701 are connected in series, the line buffer array 701 can send gradation width indices LD of 5*5 blocks to a masking processor 702. The masking processor 702 masks data not needed for edge detection for the discrimination among the receive gradation width indices, as will be explained later. Then, a maximum detection circuit 703 receives the gradation width index LD of 5*5 blocks and detects a maximum among them to be sent to a comparator 704. The comparator 704 compares the maximum with a predetermined threshold value TH (say 100). Then, it outputs attribute flag f of 1 which means a character image if the maximum is larger than the threshold value TH, otherwise it outputs attribute flag f of 0 which means an image other than a character.

Figure 61:
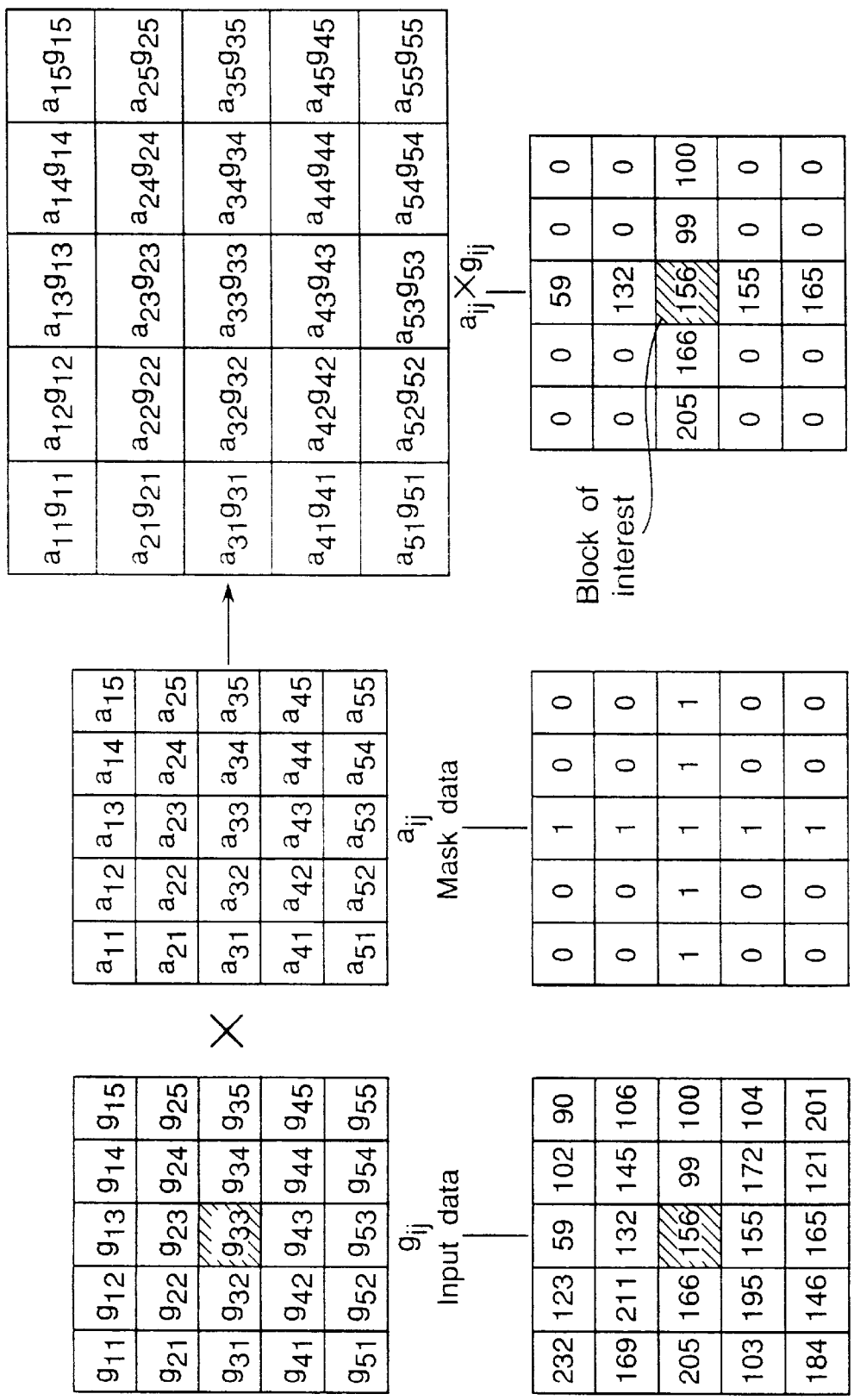
FIG. 61 is a diagram of an example of a mask processing performed by a masking processor.

FIG. 61 shows masking performed by the masking processor 702. Input data $g_{ij}$ of 5*5 blocks of gradation width indices LD ($1 \leq i, j \leq 5$) are shown at the top of the left side in FIG. 61, and they have values, for example, as shown at the bottom of the left side. For example, the gradation width index LD of the block of interest is expressed as $g_{33}$ and it has a value of 156. Mask data $a_{ij}$ are shown at the top at the center in FIG. 61. They have values, for example, as shown at the bottom of the center, wherein values in a cross including $a_{33}$ for the block of interest are 1, otherwise 0. Then, the input data $g_{ij}$ is multiplied with the mask data $a_{ij}$, as shown at the top at the right side in FIG. 61. The products are shown at the bottom at the right side in FIG. 61. For example, the product for the block of interest is 156*1=156. A maximum in this example is 205 obtained by $g_{31}*a_{31}$.

Figure 62A:
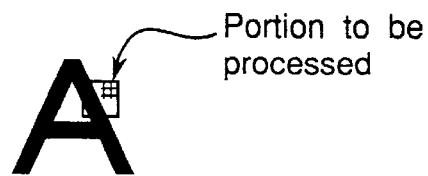
FIG. 62A is a diagram of an image.
Figure 62B:
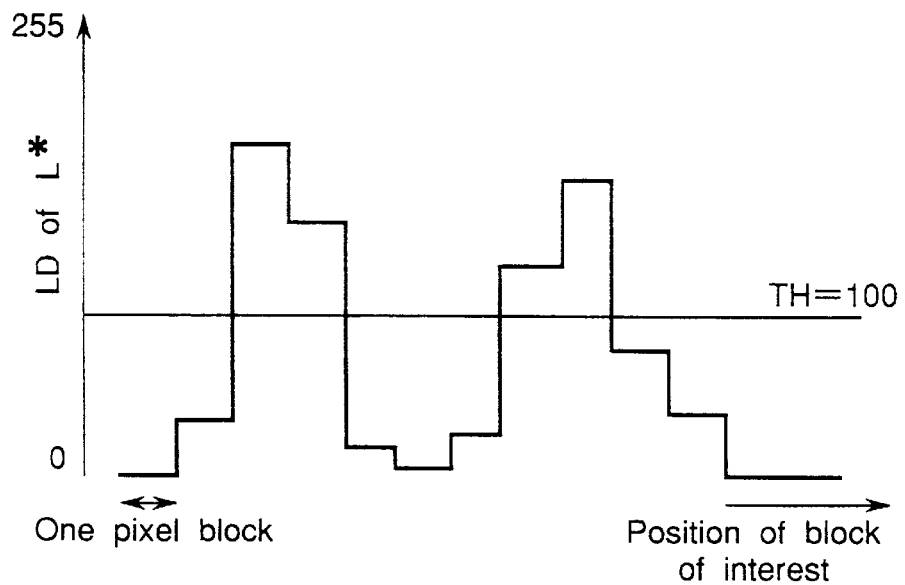
FIG. 62B is a graph of gradation width of chromaticity component L*.
Figure 62C:
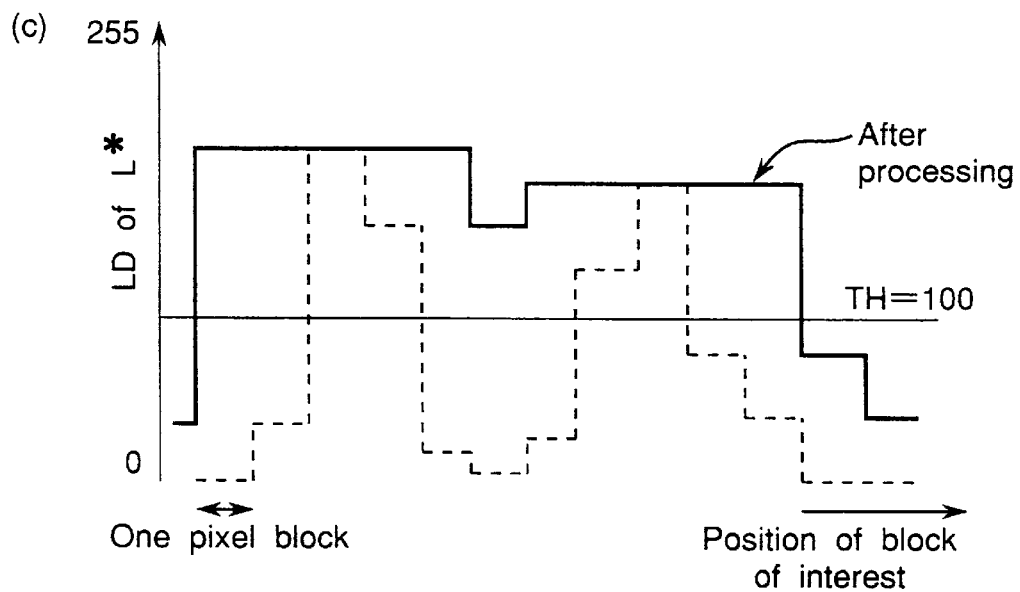
FIG. 62C is a graph of gradation width of chromaticity component L* after determining maximum.

FIGS. 62A–62C show an example of a change in gradation width index LD due to the maximum detection. Maximum detection is performed along a line in a portion of a character image of "A" shown in FIg. 62A. Gradation width index LD of the lightness component L* changes in thirteen blocks along a line in an example, as shown in FIG. 62B. After the maximum detection in 5*5 blocks by using the threshold TH of 100, the gradation width LD of the chromaticity component L* is increased as shown in FIG. 62C with a solid line. Thus, all the blocks belonging to the character "A" are decided correctly to belong to a character image.

Figure 63B:
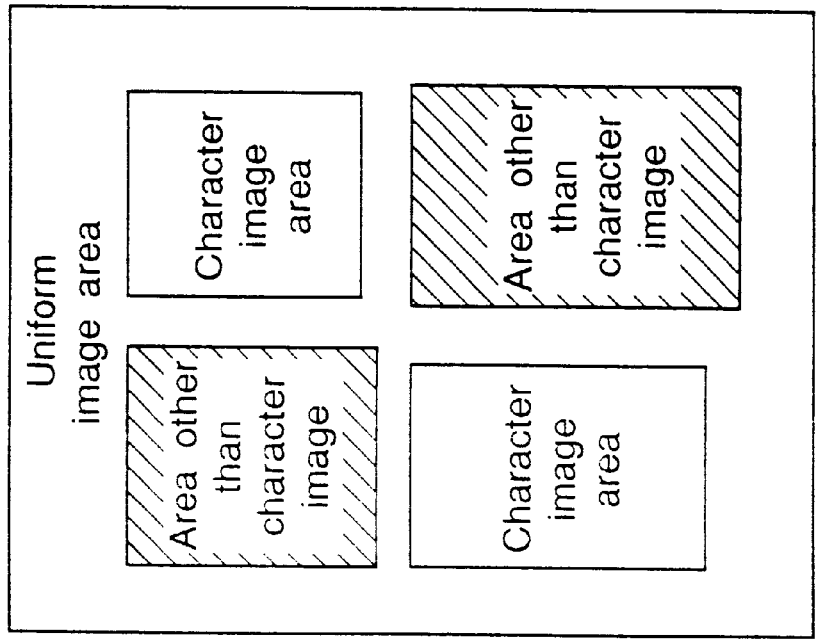
FIG. 63B is a diagram of results of character are discrimination on the document.
Figure 63A:
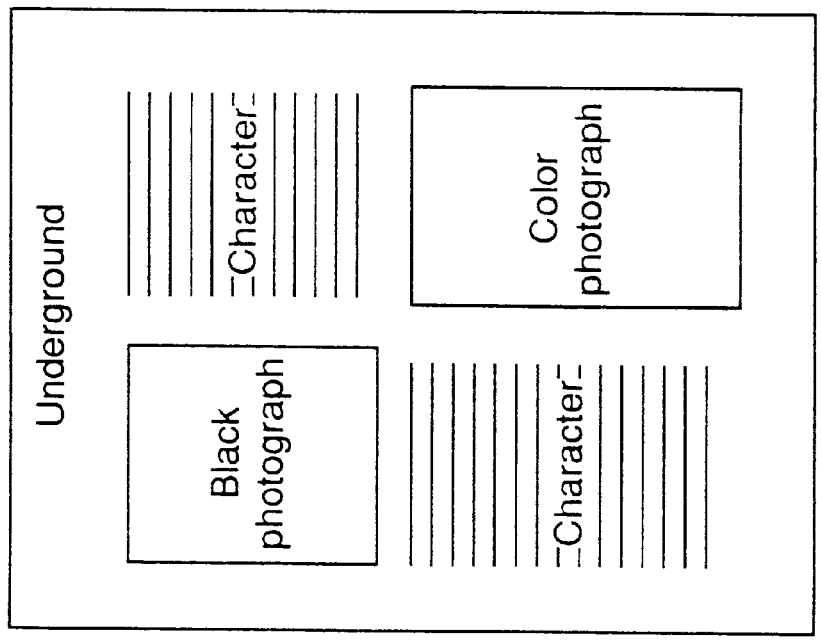
FIG. 63A is a diagram of a document.

FIG. 63A shows an example of discrimination on a document including two character areas, one block and white photograph and a color photograph. By performing the discrimination on the document, two character image areas and two areas other than character image area are discriminated correctly on the document, as shown in FIG. 63B.

Figure 64:
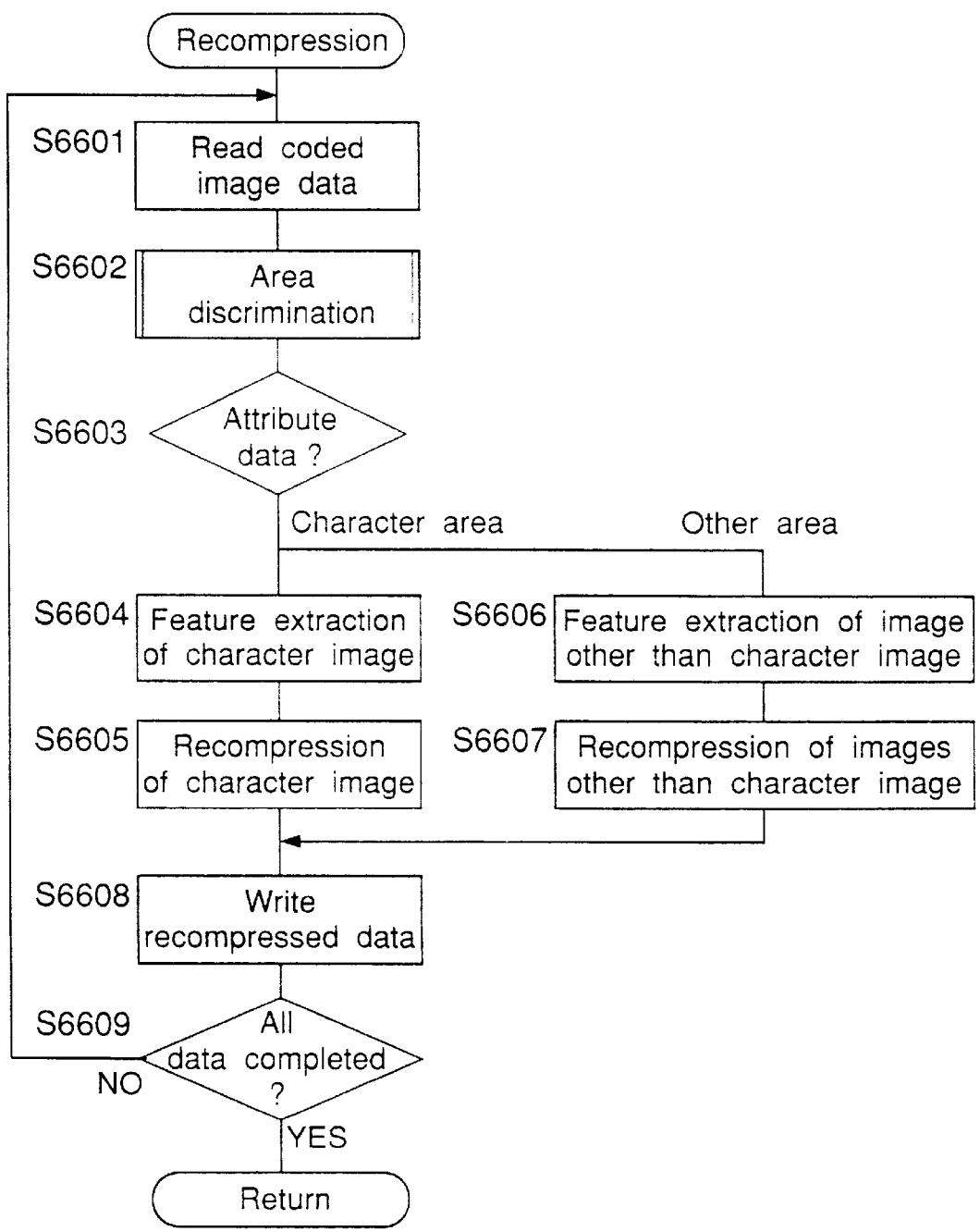
FIG. 64 is a flowchart of a modified example of recompression.

FIG. 64 is a flowchart of the recompression when character area is discriminated by using the attribute detection circuit shown in FIG. 62. First, average data LA, gradation width index LD and code data $\phi_{ij}$ of 5*5 blocks including a block of interest obtained by generalized block truncation coding area read from the compression image memory 610 (step S6601). Then, a character area is discriminated for the block (step S6602). That is, a maximum of gradation width index LD is detected in the 5*5 blocks, and the maximum is compared with the threshold value. The flag f is determined to be 1 for a character image area and 0 for an area other than a character image. Then, the flow branches according to the flag f (step S6603). If the flag f is 1 or if the block belongs to a character image area, feature quantities are extracted for the character image of the block (step S6604), and the coded data are compressed further be deleting data which can always be identified (step S6605). If the flag f is 0 or if the block does not belong to a character image area, feature quantities are extracted for the character image of the block (step S6606), and the coded data area compressed further be deleting data which can always be identified (step S6607). Then, the data compressed in step S6605 or S6607 are written to the compression image memory 614 (step S6608). After the above-mentioned processing is repeated on all the blocks (YES at step S6609), the flow returns to the main flow.

Figure 65:
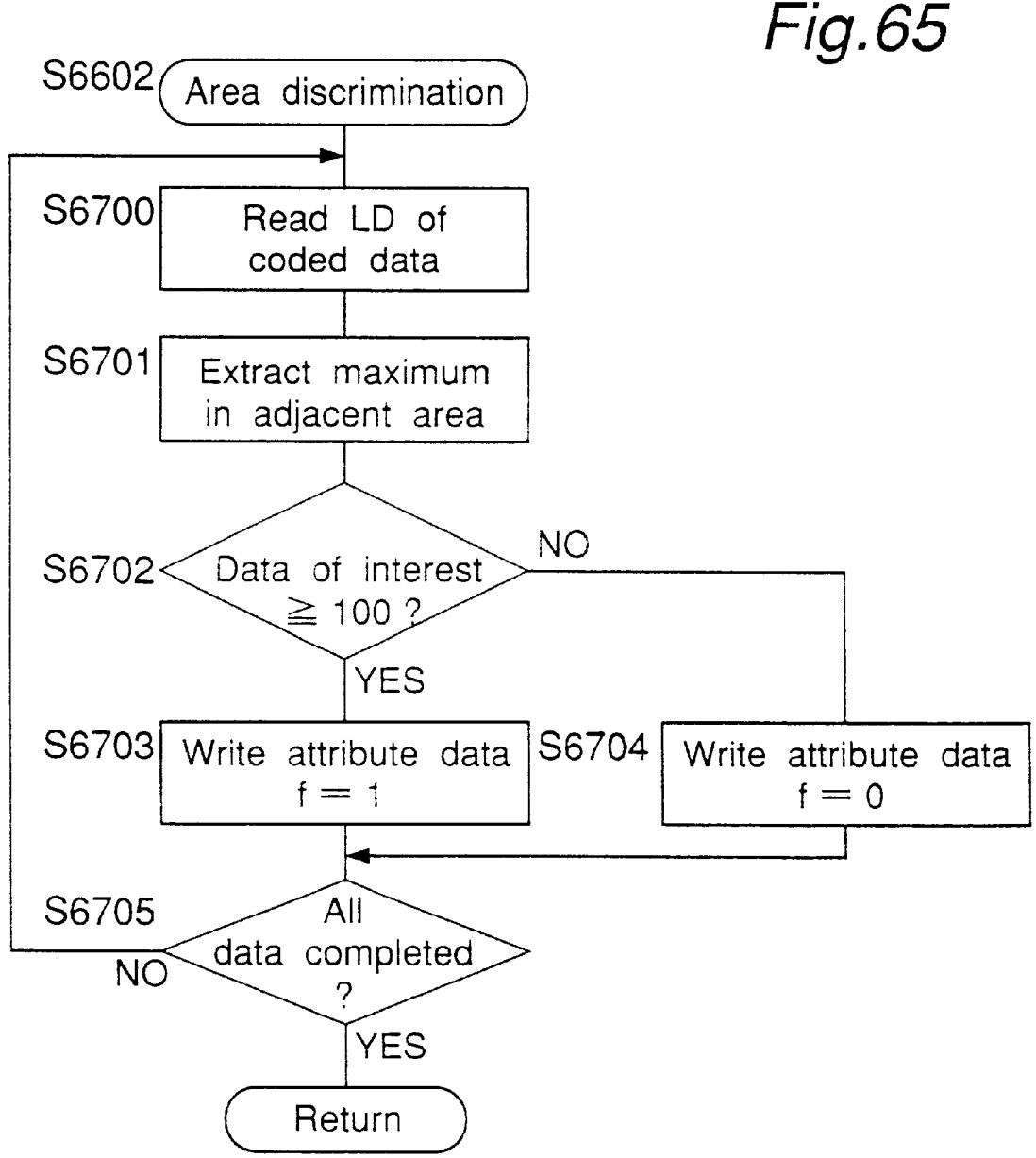
FIG. 65 is a flowchart of area discrimination.

FIG. 65 is a flowchart of the area discrimination (step S6602 in FIG. 11). First, the gradation width indices LD of 5*5 blocks including the block of interest are read (step S6700), and a maximum LD of the gradation width index in the blocks is determined (step S6701). Then, the maximum is compared with the threshold value 100. If the maximum is equal to or larger than 100, the block is decided to belong to a character image area, and the attribute data (flag f) of 1 is written to the hard disk 614 (step S6703), otherwise the attribute data (flag f) of 0 is written to the hard disk 614 (step S6704). After the above-mentioned processing is repeated on all the blocks (YES at step S6705), the flow returns to the main flow.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image processor comprising:

coding means for diving original image data into pixel blocks and for compressing the original image data for each block into compressed image data according to a first process;

decision means for deciding an attribute of the original image data in each block; and compression means for further compressing the compressed image data compressed by said coding means with a process determined according to the attribute decided by said decision means.

2. The image processor according to claim 1, wherein said compression means deletes data which can be specified according to the attribute.

3. The image processor according to claim 1, wherein the first process compresses the original image data into compressed image data having fewer gradation levels than the original image data.

4. The image processor according to claim 1, wherein the first process is generalized block truncation coding.

5. A method of image processing comprising the steps of:

dividing original image data into pixel blocks and compressing the original image data for each block into compressed image data according to a first process;

deciding an attribute of the original image data in each block; and further compressing the compressed image data with a process determined according to the decided attribute.

* * * * *